(12) United States Patent
Yamazaki et al.

(10) Patent No.: US 10,372,004 B2
(45) Date of Patent: Aug. 6, 2019

(54) DISPLAY DEVICE

(71) Applicant: Semiconductor Energy Laboratory Co., Ltd., Atsugi-shi, Kanagawa-ken (JP)

(72) Inventors: Shunpei Yamazaki, Setagaya (JP); Kei Takahashi, Isehara (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 15/860,059

(22) Filed: Jan. 2, 2018

(65) Prior Publication Data

US 2018/0196322 A1    Jul. 12, 2018

(30) Foreign Application Priority Data

Jan. 11, 2017 (JP) ................................. 2017-002866
Jan. 11, 2017 (JP) ................................. 2017-002870
Jan. 25, 2017 (JP) ................................. 2017-011395

(51) Int. Cl.
  *G02F 1/1343*  (2006.01)
  *G02F 1/1362*  (2006.01)

(52) U.S. Cl.
  CPC ...... *G02F 1/136286* (2013.01); *G02F 1/1343* (2013.01); *G02F 1/136213* (2013.01)

(58) Field of Classification Search
  CPC ............. G02F 1/136286; G02F 1/1343; G02F 1/136213
  See application file for complete search history.

(56) References Cited

U.S. PATENT DOCUMENTS

| 9,852,676 B2 | 12/2017 | Miyata et al. |
| 2006/0267909 A1 | 11/2006 | Hsu et al. |
| 2007/0030233 A1* | 2/2007 | Chai .................... G09G 3/3648 345/98 |
| 2007/0072439 A1 | 3/2007 | Akimoto et al. |

(Continued)

FOREIGN PATENT DOCUMENTS

| CN | 102906636 A | 1/2013 |
| CN | 102959462 A | 3/2013 |

(Continued)

OTHER PUBLICATIONS

International Search Report (Application No. PCT/IB2017/058407) dated May 1, 2018.

(Continued)

*Primary Examiner* — Jia X Pan
(74) *Attorney, Agent, or Firm* — Robinson Intellectual Property Law Office; Eric J. Robinson

(57) ABSTRACT

To achieve a display device that is suitable for increasing in size and to provide a high-resolution display device. In the display device, three or more adjacent gate lines are supplied with the same selection signal. Three or more pixels that adjoin in the column direction are connected to different source lines. In each of the pixels, a transistor including a semiconductor layer is disposed. An inner source line among three or more source lines is disposed to overlap with a conductive layer that functions as a pixel electrode. Part of the semiconductor layer of the transistor is provided between the outer source line and a source line adjacent to the outer source line.

14 Claims, 36 Drawing Sheets

(56) References Cited

U.S. PATENT DOCUMENTS

| | | | |
|---|---|---|---|
| 2007/0206011 A1* | 9/2007 | Han | G02F 1/134336 345/441 |
| 2008/0068524 A1* | 3/2008 | Kim | G02F 1/136286 349/38 |
| 2009/0033818 A1 | 2/2009 | Nakajima et al. | |
| 2011/0156992 A1* | 6/2011 | Moon | G09G 3/3607 345/84 |
| 2013/0069921 A1 | 3/2013 | Saitoh | |
| 2013/0070002 A1 | 3/2013 | Hisada et al. | |
| 2013/0093986 A1 | 4/2013 | Kesho et al. | |
| 2014/0092355 A1 | 4/2014 | Teranuma et al. | |
| 2015/0035741 A1* | 2/2015 | Lee | G02F 1/136227 345/103 |
| 2015/0042914 A1* | 2/2015 | Cho | G02F 1/136286 349/43 |
| 2015/0301372 A1* | 10/2015 | Mori | G02F 1/1339 349/33 |
| 2016/0026050 A1* | 1/2016 | Lin | G02F 1/136286 349/43 |
| 2017/0011680 A1 | 1/2017 | Miyata et al. | |
| 2017/0045794 A1* | 2/2017 | Lin | G02F 1/134336 |
| 2018/0203319 A1* | 7/2018 | Yamazaki | G02F 1/1368 |

FOREIGN PATENT DOCUMENTS

| | | |
|---|---|---|
| EP | 2579094 A | 4/2013 |
| EP | 2587306 A | 5/2013 |
| JP | 2001-053283 A | 2/2001 |
| JP | 2006-330682 A | 12/2006 |
| JP | 2007-096055 A | 4/2007 |
| JP | 2007-123861 A | 5/2007 |
| JP | 2012-014104 A | 1/2012 |
| JP | 2013-097049 A | 5/2013 |
| KR | 2013-0003038 A | 1/2013 |
| TW | 200641779 | 12/2006 |
| WO | WO-2012/002072 | 1/2012 |
| WO | WO-2012/005038 | 1/2012 |
| WO | WO-2012/090803 | 7/2012 |
| WO | WO-2015/114970 | 8/2015 |

OTHER PUBLICATIONS

Written Opinion (Application No. PCT/IB2017/058407) dated May 1, 2018.

* cited by examiner

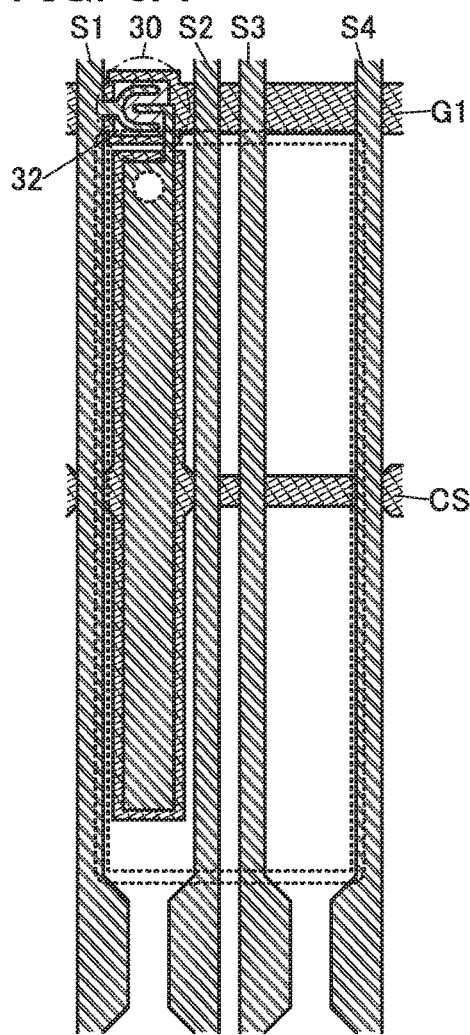
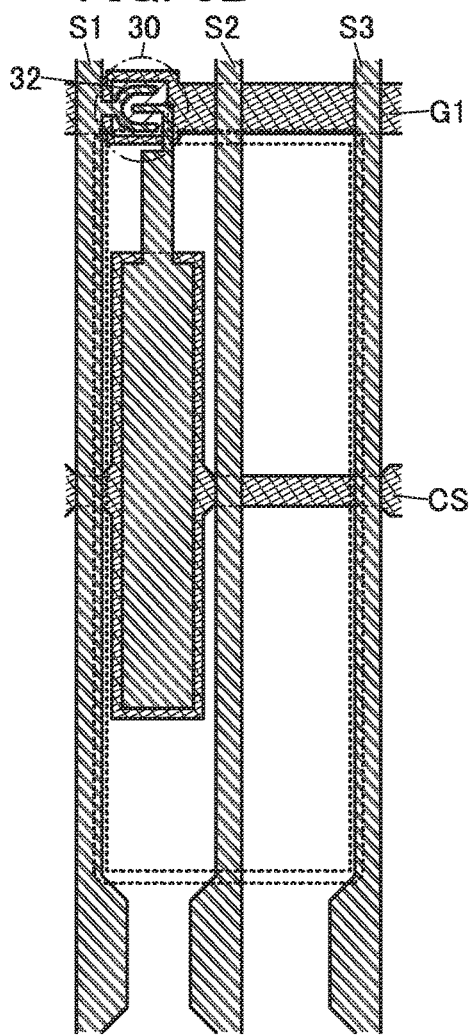

DISPLAY DEVICE

TECHNICAL FIELD

One embodiment of the present invention relates to a display device.

Note that one embodiment of the present invention is not limited to the above technical field. Examples of the technical field of one embodiment of the present invention disclosed in this specification and the like include a semiconductor device, a display device, a light-emitting device, a power storage device, a memory device, an electronic device, a lighting device, an input device, an input/output device, a driving method thereof, and a manufacturing method thereof.

In this specification and the like, a semiconductor device refers to any device that can function by utilizing semiconductor characteristics. A transistor, a semiconductor circuit, an arithmetic device, a memory device, and the like are each an embodiment of the semiconductor device. In addition, an imaging device, an electro-optical device, a power generation device (e.g., a thin film solar cell and an organic thin film solar cell), and an electronic device each may include a semiconductor device.

BACKGROUND ART

In recent years, a high-resolution display device has been required. For example, full high-definition (the number of pixels is 1920×1080) has been in the mainstream of home-use television devices (also referred to as televisions or television receivers), while high-resolution display devices such as a 4K (the number of pixels is 3840×2160) display and an 8K (the number of pixels is 7680×4320) display have been developed.

A liquid crystal display device is known as a kind of display devices. A transmissive liquid crystal display device adjusts the amount of light from a backlight to be transmitted and shows contrast to display an image by utilizing optical modulation action of a liquid crystal.

As a kind of field-effect transistors, a thin film transistor whose channel region is formed using a semiconductor film that is formed over a substrate having an insulating surface is known. Patent Document 1 discloses a technique in which amorphous silicon is used for a semiconductor film that is used in a channel region of a thin film transistor. For example, in a liquid crystal display device, a thin film transistor is used as a switching transistor in each pixel.

An active matrix liquid crystal display device, in which a transistor whose channel formation region includes a metal oxide is used as a switching element connected to a pixel electrode, is known (see Patent Document 2 and Patent Document 3).

REFERENCE

Patent Document

[Patent Document 1] Japanese Published Patent Application No. 2001-053283
[Patent Document 2] Japanese Published Patent Application No. 2007-123861
[Patent Document 3] Japanese Published Patent Application No. 2007-096055

DISCLOSURE OF INVENTION

A transistor including amorphous silicon or metal oxide (also referred to as an oxide semiconductor) has advantages over a transistor or the like including polycrystalline silicon in productivity and ease of being formed over a large substrate. On the other hand, the transistor including amorphous silicon or metal oxide has difficulty in having high field-effect mobility as compared with the transistor including polycrystalline silicon. In the case where a load connected to the transistor is heavy, it might be difficult to drive the transistor at a high frequency.

Particularly in display devices such as a television device and a monitor, the higher the resolution is or the larger the screen size is, the more significant an increase in load becomes.

An increase in size of television devices, monitors, digital signages, and the like is demanded. In addition, a higher frame frequency is required for smooth display of moving images. However, the higher the resolution is or the larger the screen size is, the more significant an increase in load becomes, which might make operation at a high frame frequency difficult.

An object of one embodiment of the present invention is to provide a high-resolution display device. An object is to achieve a display device that is suitable for increasing in size. An object is to provide a display device with high productivity. An object is to achieve a high-resolution display device without dividing a source line and a gate line. An object is to achieve a high-resolution display device by including amorphous silicon, an oxide semiconductor, or the like.

Note that the description of these objects does not disturb the existence of other objects. In one embodiment of the present invention, there is no need to achieve all the objects. Note that other objects can be derived from the description of the specification, the drawings, the claims, and the like.

One embodiment of the present invention is a display device including a first source line, a second source line, a third source line, a first gate line, a first transistor, and a first conductive layer. The first gate line extends in the first direction and intersects with the first to third source lines. The first to third source lines extend in the second direction that intersects with the first direction and are arranged in the first direction in this order. A gate of the first transistor is electrically connected to the first gate line, one of a source and a drain of the first transistor is electrically connected to the first source line, and the other of the source and the drain of the first transistor is electrically connected to the first conductive layer. The first conductive layer includes a portion overlapping with part of the second source line. The first to third source lines are supplied with respective signals, and the first gate line is supplied with a selection signal.

It is preferable that the display device of the above embodiment further include a second gate line, a second transistor, and a second conductive layer. In that case, the second gate line extends in the first direction and intersects with the first to third source lines. A gate of the second transistor is electrically connected to the second gate line, one of a source and a drain of the second transistor is electrically connected to the second source line, and the other of the source and the drain of the second transistor is electrically connected to the second conductive layer. The second conductive layer includes a portion overlapping with part of the second source line. A selection signal that is the same as the selection signal supplied to the first gate line is supplied to the second gate line.

It is preferable that the display device of the above embodiment further include a liquid crystal, a first coloring layer, and a second coloring layer, that the liquid crystal and the first coloring layer overlap with the first conductive layer, and that the liquid crystal and the second coloring layer overlap with the second conductive layer. In addition, the first coloring layer and the second coloring layer preferably transmit light of the same color.

It is preferable that the display device of the above embodiment further include a third gate line, a third transistor, and a third conductive layer. In that case, the third gate line extends in the first direction. A gate of the third transistor is electrically connected to the third gate line, one of a source and a drain of the third transistor is electrically connected to the third source line, and the other of the source and the drain of the third transistor is electrically connected to the third conductive layer. The third conductive layer includes a portion overlapping with part of the second source line. A selection signal that is the same as the selection signal supplied to the first gate line is supplied to the third gate line.

It is preferable that the display device of the above embodiment further include a fourth source line. In that case, the first to fourth source lines are arranged in the first direction in this order, and a signal different from the signals supplied to the first to third source lines is supplied to the fourth source line.

It is preferable that the display device of the above embodiment further include a fourth gate line, a fourth transistor, and a fourth conductive layer. In that case, the fourth gate line extends in the first direction. A gate of the fourth transistor is electrically connected to the fourth gate line, one of a source and a drain of the fourth transistor is electrically connected to the fourth source line, and the other of the source and the drain of the fourth transistor is electrically connected to the fourth conductive layer. Each of the first to fourth conductive layers includes a portion overlapping with part of the second source line and a portion overlapping with part of the third source line. A selection signal that is the same as the selection signal supplied to the first gate line is supplied to the fourth gate line.

In the display device of the above embodiment, it is preferable that the first transistor include a first semiconductor layer and the second transistor include a second semiconductor layer. In that case, each of the first semiconductor layer and the second semiconductor layer preferably includes a portion positioned between the first source line and the second source line. Furthermore, in that case, each of the first semiconductor layer and the second semiconductor layer preferably includes metal oxide. Alternatively, each of the first semiconductor layer and the second semiconductor layer preferably includes amorphous silicon. Alternatively, each of the first semiconductor layer and the second semiconductor layer preferably includes microcrystalline silicon or polycrystalline silicon.

It is preferable that the display device of the above embodiment further include a capacitor electrically connected to the first transistor. In that case, the capacitor preferably includes a portion positioned between the first source line and the second source line. Furthermore, the capacitor preferably includes a portion overlapping with the first conductive layer.

In the display device of the above embodiment, the capacitor preferably includes a fifth conductive layer and a sixth conductive layer. Each of the fifth conductive layer and the sixth conductive layer is configured to transmit visible light.

According to one embodiment of the present invention, a display device that is suitable for increasing in size can be provided. A high-resolution display device can be provided. A display device with high productivity can be provided. A high-resolution display device can be provided without dividing a source line and a gate line.

Note that the description of these effects does not preclude the existence of other effects. One embodiment of the present invention does not necessarily achieve all the effects listed above. Other effects can be derived from the description of the specification, the drawings, the claims, and the like.

BRIEF DESCRIPTION OF DRAWINGS

FIGS. 6A and 6B illustrate structure examples of a display device.

BEST MODE FOR CARRYING OUT THE INVENTION

Figure 1:
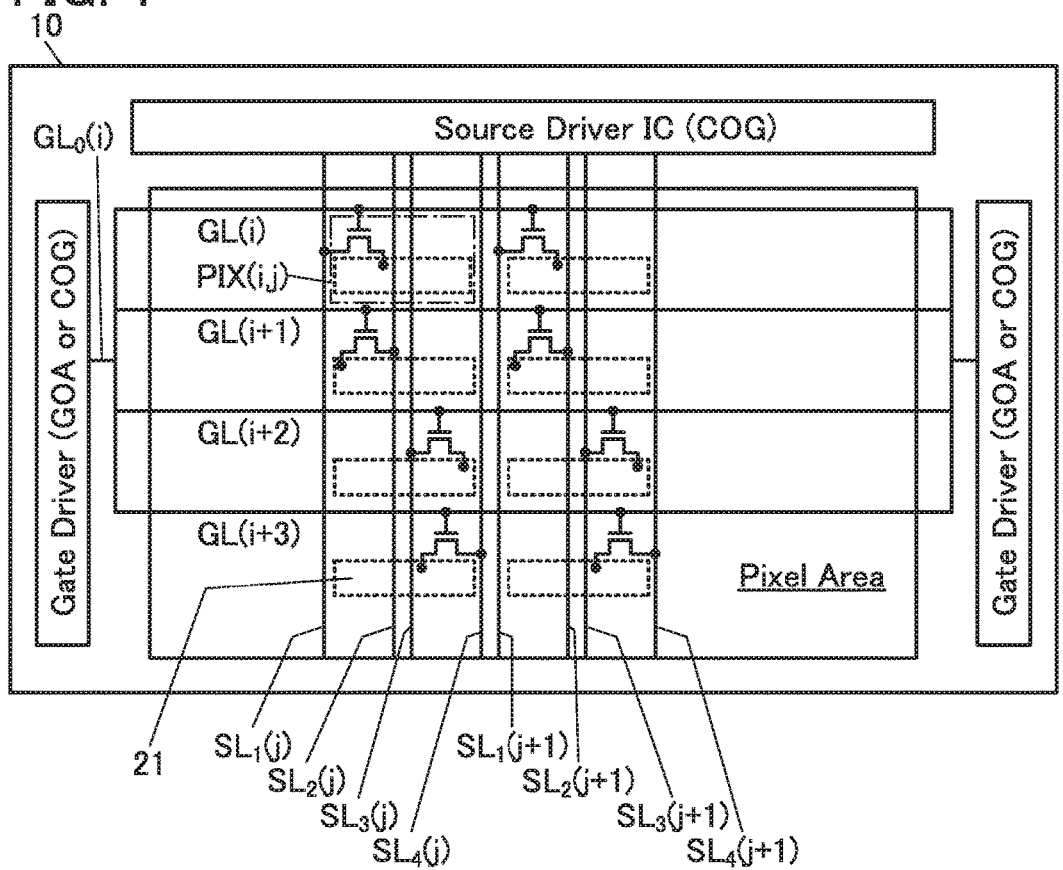
FIG. 1 illustrates a structure example of a display device.

Embodiments will be described in detail with reference to the drawings. Note that the present invention is not limited to the following description. It will be readily understood by those skilled in the art that modes and details of the present invention can be modified in various ways without departing from the spirit and scope of the present invention. Thus, the present invention should not be construed as being limited to the description in the following embodiments.

Note that in the structures of the present invention described below, the same portions or portions having similar functions are denoted by the same reference numerals in different drawings, and description thereof is not repeated. The same hatching pattern is applied to portions having similar functions, and the portions are not especially denoted by reference numerals in some cases.

Note that in each drawing described in this specification, the size, the layer thickness, or the region of each component is exaggerated for clarity in some cases. Therefore, the size, the layer thickness, or the region is not limited to the illustrated scale.

Note that in this specification and the like, ordinal numbers such as "first," "second," and the like are used in order to avoid confusion among components and do not limit the number.

A transistor is a kind of semiconductor elements and can achieve amplification of current or voltage, switching operation for controlling conduction or non-conduction, or the like. A transistor in this specification includes an insulated-gate field effect transistor (IGFET) and a thin film transistor (TFT) in its category.

Furthermore, functions of a source and a drain might be switched when a transistor of opposite polarity is employed or a direction of current flow is changed in circuit operation, for example. Therefore, the terms "source" and "drain" can be switched in this specification.

Note that in this specification and the like, the term "electrically connected" includes the case where components are connected through an object having any electric function. There is no particular limitation on the "object having any electric function" as long as electric signals can be transmitted and received between components that are connected through the object. Examples of an "object having any electric function" are a switching element such as a transistor, a resistor, a coil, a capacitor, and an element with a variety of functions as well as an electrode and a wiring.

In this specification and the like, a display panel as one embodiment of the display device has a function of displaying (outputting) an image or the like on (to) a display surface; hence, the display panel is one embodiment of an output device.

In this specification and the like, a structure in which a connector such as a flexible printed circuit (FPC) or a tape carrier package (TCP) is attached to a substrate of a display panel, or a structure in which an integrated circuit (IC) is mounted on a substrate by a chip on glass (COG) method or the like is referred to as a display panel module or a display module, or simply referred to as a display panel or the like in some cases.

In this specification and the like, a touch sensor has a function of sensing the contact, press, approach, or the like of an object such as a finger or a stylus. In addition, the touch sensor may have a function of sensing the positional information. Therefore, the touch sensor is one embodiment of an input device. For example, the touch sensor can include one or more sensor elements.

In this specification and the like, a substrate provided with a touch sensor is referred to as a touch sensor panel or simply referred to as a touch sensor or the like in some cases. Furthermore, in this specification and the like, a structure in which a connector such as an FPC or a TCP is attached to a substrate of a touch sensor panel, or a structure in which an IC is mounted on a substrate by a COG method or the like is referred to as a touch sensor panel module, a touch sensor module, or a sensor module, or simply referred to as a touch sensor or the like in some cases.

Note that in this specification and the like, a touch panel which is one embodiment of the display device has a function of displaying (outputting) an image or the like on (to) a display surface and a function as a touch sensor capable of sensing contact, press, approach, or the like of an object such as a finger or a stylus on or to the display surface. Therefore, the touch panel is an embodiment of an input/output device.

A touch panel can be referred to, for example, a display panel (or a display device) with a touch sensor or a display panel (or a display device) having a touch sensor function.

A touch panel can include a display panel and a touch sensor panel. Alternatively, a touch panel can have a function of a touch sensor inside a display panel or on a surface of the display panel.

In this specification and the like, a structure in which a connector such as an FPC or a TCP is attached to a substrate of a touch panel, or a structure in which an IC is mounted on a substrate by a COG method or the like is referred to as a touch panel module or a display module, or simply referred to as a touch panel or the like in some cases.

(Embodiment 1)

In this embodiment, a display device of one embodiment of the present invention is described.

One embodiment of the present invention is a display device including a display region (also referred to as a pixel portion) where a plurality of pixels are arranged in a matrix. In the pixel portion, a plurality of wirings to which a selection signal is supplied (also referred to as gate lines or scan lines) and a plurality of wirings to which a signal written to a pixel (also referred to as a video signal or the like) is supplied (also referred to as source lines, signal lines, data lines, or the like) are provided. The gate lines are provided parallel to one another and the source lines are provided parallel to one another. The gate lines and the source lines intersect with each other.

One pixel includes at least one transistor and one display element. The display element includes a conductive layer that functions as a pixel electrode. The conductive layer is electrically connected to one of a source and a drain of the transistor. A gate of the transistor is electrically connected to a gate line. The other of the source and the drain is electrically connected to a source line.

Here, a direction in which the gate lines extend is called a row direction or a first direction, and a direction in which the source lines extend is called a column direction or a second direction.

Three or more adjacent gate lines are preferably supplied with the same selection signal. That is, selection periods of these gate lines are preferably the same. In particular, three or four gate lines are preferably regarded as a group, in which case the configuration of a driver circuit can be simplified.

In the case where three or four gate lines are supplied with the same selection signal, three or four pixels which are adjacent to one another in the column direction are concurrently selected. Thus, different source lines are connected to the three or four pixels. That is, three or four source lines are arranged for each column.

It is preferable that one or two inner source lines among the three or four source lines be disposed to overlap with the conductive layer that functions as a pixel electrode, in which case the distance between pixel electrodes can be short. In addition, it is preferable that two outer source lines be disposed not to overlap with the pixel electrode, in which case parasitic capacitance between the two source lines can be reduced.

Furthermore, it is preferable that part of a semiconductor layer of a transistor be provided between the outer source line and the source line adjacent to the outer source line among the three or four source lines.

For example, in the case where first to third source lines are arranged in this order, part of a semiconductor layer in a transistor connected to the first source line and part of a semiconductor layer in a transistor connected to the second source line are positioned between the first source line and the second source line. Furthermore, part of a semiconductor layer in a transistor connected to the third source line is positioned between the second source line and the third source line. Thus, a node between each source line and each semiconductor layer does not intersect with another source line. With this configuration, parasitic capacitance between the source lines can be reduced.

For example, in the case where the first to fourth source lines are arranged in this order, part of a semiconductor layer in the transistor connected to the first source line and part of a semiconductor layer in the transistor connected to the second source line are positioned between the first source line and the second source line. Furthermore, part of the semiconductor layer in the transistor connected to the third source line and part of a semiconductor layer in a transistor connected to the fourth source line are positioned between the third source line and the fourth source line. Thus, a node between each source line and each semiconductor layer does not intersect with another source line. With this configuration, parasitic capacitance between the source lines can be reduced.

With such a configuration, one horizontal period can be longer than the conventional one. For example, in the case where three or four gate lines are supplied with the same selection signal, the length of one horizontal period can be three or four times the length of the conventional one. Furthermore, since the parasitic capacitance between the source lines can be reduced, the load of the source lines can be reduced. Thus, even a significantly high-resolution display device such as a 4K display or an 8K display can be operated with use of a transistor with low field-effect mobility. The above-described configurations can be applied to a large display device with a diagonal screen size of 50 inches or larger, 60 inches or larger, or 70 inches or larger.

In a transistor in each pixel, amorphous silicon or metal oxide (an oxide semiconductor) can be used for a semiconductor layer where a channel is formed. Thus, a display device with high productivity can be provided.

In particular, metal oxide (an oxide semiconductor) is preferably used for the semiconductor layer of the transistor. The transistor including metal oxide can have higher field-effect mobility and thus can have a smaller transistor size (the area occupied by a transistor) than a transistor including amorphous silicon. Accordingly, parasitic capacitance of the source lines and the gate lines can be small.

By reducing the electric resistance and capacitance of each source line as small as possible, driving at a higher frame frequency, a larger display device, and the like can be achieved. Examples of methods of reducing the electric resistance and capacitance include using a low resistance material (e.g., copper or aluminum) as a material of the source line, making the thickness or width of the source line large, making the thickness of an interlayer insulating film between the source line and another wiring large, and making the intersecting area of the source line and another wiring small.

A more specific example of the display device is described below with reference to drawings.

[Structure Example of Display Device]

FIG. 1 is a block diagram of a display device 10 of one embodiment of the present invention. The display device 10 includes a pixel region (a display region), a source driver, and a gate driver.

FIG. 1 illustrates an example in which the display device 10 includes two gate drivers with a pixel region sandwiched therebetween. A plurality of gate lines $GL_0$ are connected to the two gate drivers. In FIG. 1, an i-th gate line $GL_0(i)$ is illustrated. The gate line $GL_0(i)$ is electrically connected to four gate lines (a gate line $GL(i)$, a gate line $GL(i+1)$, a gate line $GL(i+2)$, and a gate line $GL(i+3)$). Accordingly, the four gate lines are supplied with the same selection signal.

A plurality of source lines are connected to the source driver. Four source lines are provided for one pixel column. FIG. 1 illustrates four source lines (a source line $SL_1(j)$, a source line $SL_2(j)$, a source line $SL_3(j)$, and a source line $SL_4(j)$) for the j-th pixel column and four source lines (a source line $SL_1(j+1)$, a source line $SL_2(j+1)$, a source line $SL_3(j+1)$, and a source line $SL_4(j+1)$) for the (j+1)-th pixel column.

One pixel PIX includes at least one transistor and one conductive layer 21 that functions as a pixel electrode of a display element. The pixel PIX corresponds to one color. In the case where color display is performed by utilizing mixture of light emitted from a plurality of pixels, the pixel PIX can be called a subpixel.

Furthermore, pixels arranged in one column in the column direction preferably emit light of the same color. In the case where a liquid crystal element is used as a display element, the pixels arranged in one column in the column direction are provided with coloring layers that transmit light of the same color to overlap with the liquid crystal elements. Pixels that emit light of different colors are periodically arranged in one row in the row direction.

Here, it is preferable that part of two inner source lines (e.g., the source line $SL_2(j)$ and the source line $SL_3(j)$) among four source lines for one pixel column overlap with the conductive layer 21. Moreover, it is preferable that the two source lines be arranged close to the center portion. For example, the distance between the source line $SL_1(j)$ and the source line $SL_2(j)$ is preferably larger than the distance between the source line $SL_2(j)$ and the source line $SL_3(j)$. That is, every two source lines are disposed close to each other and three or more source lines are prevented from being close to one another, whereby parasitic capacitance between the source lines can be reduced and the load of each source line can be reduced.

As a method for achieving high resolution with use of a transistor including amorphous silicon or the like which has difficulty in having high field-effect mobility, there is a method in which a display region of a display device is divided into a plurality of pixel regions and driven. In this driving method, for example, at least one of the source line and the gate line is divided. In the above method, a boundary portion between divided pixel regions might be visually recognized owing to variations in characteristics of a driver circuit, which decreases the visibility in some cases. In addition, image processing or the like for dividing in advance image data to be input is necessary; thus, a large-scale image processing device that can operate at a high speed is required.

In contrast, the display device of one embodiment of the present invention can be driven without dividing the display region even when including a transistor with relatively low field-effect mobility.

In particular, the use of a transistor including an oxide semiconductor provides various effects described below. For example, the transistor size (the area occupied by a transistor) can be small; thus, parasitic capacitance of the transistor itself can be small. Moreover, the aperture ratio can be improved, or the wiring width can be widened and wiring resistance can be low without reducing the aperture ratio as compared with a transistor including amorphous silicon. Furthermore, since the transistor including an oxide semiconductor can have a high on-state current, the period for writing to a pixel can be shortened. Owing to these effects, charge and discharge periods of the gate line and the source line can be shortened and the frame frequency can be increased.

Furthermore, since the transistor including an oxide semiconductor can have a significantly lower off-state current than a transistor including silicon has, the holding period of a potential applied to a pixel can be prolonged and the frame frequency can be reduced. For example, the frame frequency can be variable in a range from 0.1 Hz to 480 Hz inclusive. In a television device or the like, the frame frequency is preferably 30 Hz or higher and 240 Hz or lower, more preferably 60 Hz or higher and 120 Hz or lower.

Another effect from the use of a transistor having a significantly low off-state current is a reduction in storage capacitor of a pixel. This can increase the aperture ratio of a pixel and shorten the period for writing to a pixel.

Although FIG. 1 illustrates an example in which a source driver is disposed along a side of a pixel region, source drivers may be disposed along facing two sides of the pixel region such that the pixel region is sandwiched between the source drivers.

Figure 2:
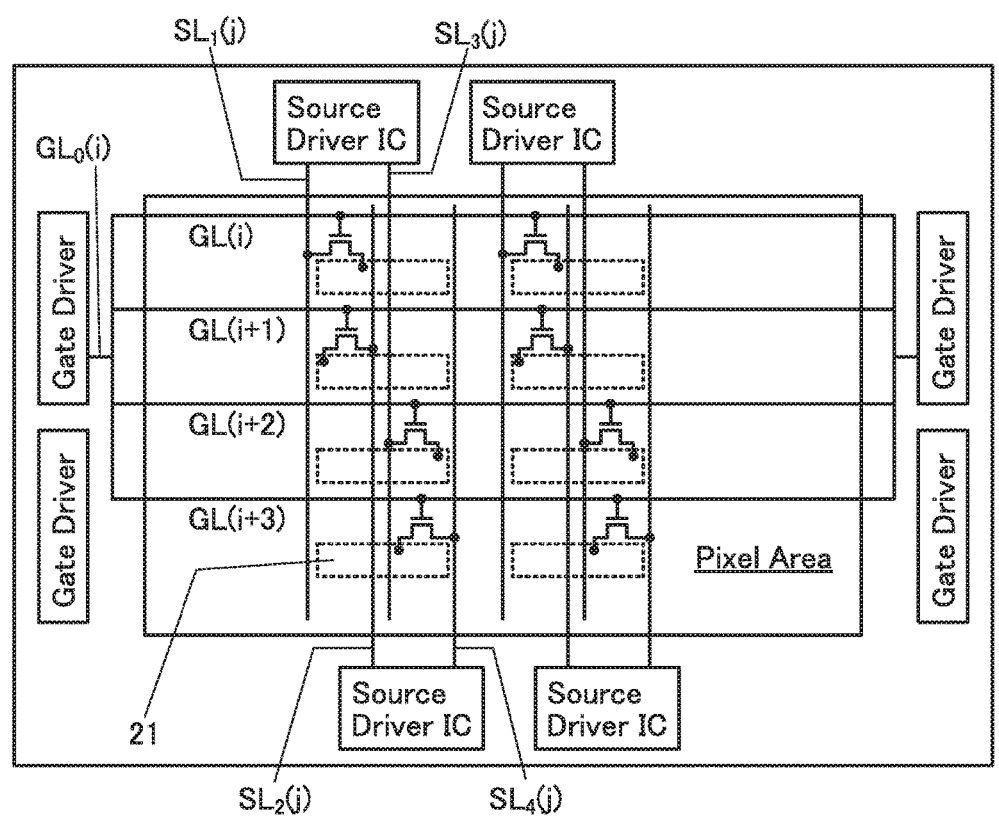
FIG. 2 illustrates a structure example of a display device.

FIG. 2 illustrates an example in which, a source driver IC connected to odd-numbered source lines (the source line $SL_1(j)$ and the source line $SL_3(j)$) among four source lines for one pixel column and a source driver IC connected to even-numbered source lines (the source line $SL_2(j)$ and the source line $SL_4(j)$) are disposed to face each other. With such a configuration, display unevenness due to a potential drop caused by wiring resistance can be suppressed even in a large display device. In the configuration of FIG. 2, the number of source driver ICs disposed along one side of the pixel region can be half of that in the configuration of FIG. 1; accordingly, the area of one source driver IC can be large. Thus, the distance between two adjacent source driver ICs can be large, improving the manufacturing yield.

[Pixel Configuration Example]

An example of the configuration of a pixel disposed in a pixel region of the display device 10 is described below.

Figure 3A:
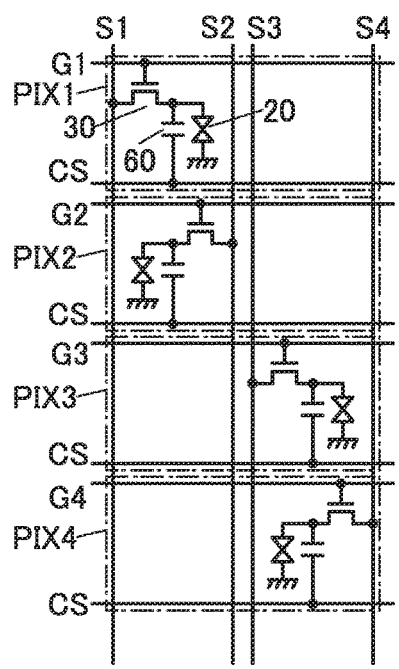
FIGS. 3A to 3E illustrate a structure example of a display device.

FIG. 3A is of the configuration of a pixel disposed in a pixel region of the display device a circuit diagram including four pixels arranged in one column in the column direction.

Each pixel includes a transistor 30, a liquid crystal element 20, and a capacitor 60.

Wirings S1 to S4 are source lines, and wirings G1 to G4 are gate lines. A wiring CS is electrically connected to one electrode of the capacitor 60, and a certain potential is applied to the wiring CS.

A pixel is electrically connected to any one of the wirings S1 to S4 and any one of the wirings G1 to G4. As an example, a pixel connected to the wiring S1 and the wiring G1 is described. In the transistor 30, a gate is electrically connected to the wiring G1, one of a source and a drain is electrically connected to the wiring S1, and the other of the source and the drain is electrically connected to the other electrode of the capacitor 60 and one electrode (pixel electrode) of the liquid crystal element 20. A common potential is supplied to the one electrode of the capacitor 60.

In FIG. 3A, the four pixels arranged in one column in the column direction are denoted as a pixel PIX1, a pixel PIX2, a pixel PIX3, and a pixel PIX4 from the top. Here, the pixel PIX1 is connected to the wiring G1 and the wiring S1, the pixel PIX2 is connected to the wiring G2 and the wiring S2, the pixel PIX3 is connected to the wiring G3 and the wiring S3, and the pixel PIX4 is connected to the wiring G4 and the wiring S4.

Figure 3B:
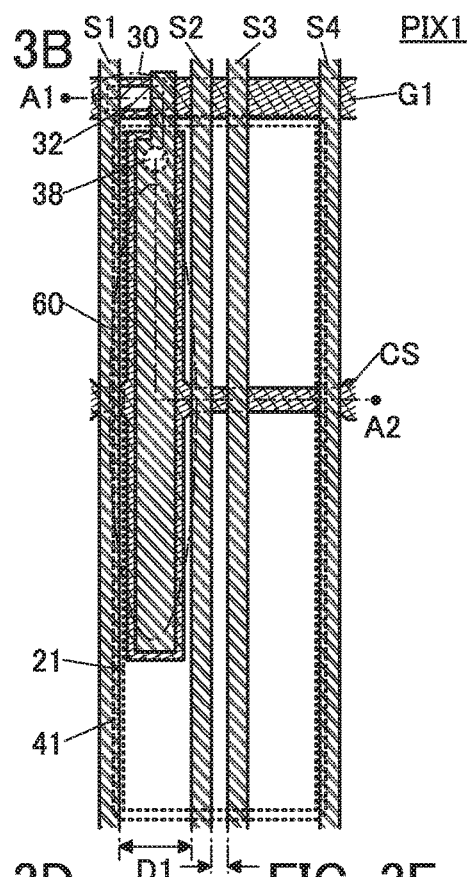

FIG. 3B illustrates an example of a layout of the pixel PIX1 connected to the wiring S1 and the wiring G1.

As illustrated in FIG. 3B, the wiring G1 and the wiring CS extend in the row direction (the lateral direction), and the wirings S1 to S4 extend in the column direction (the longitudinal direction).

In the transistor 30, a semiconductor layer 32 is provided over the wiring G1, and part of the wiring G1 functions as a gate electrode. Part of the wiring S1 functions as one of a source electrode and a drain electrode. The semiconductor layer 32 includes a region positioned between the wiring S1 and the wiring S2.

The other of the source electrode and the drain electrode of the transistor 30 is electrically connected to the conductive layer 21 that functions as a pixel electrode through a connection portion 38. A coloring layer 41 is provided in a position overlapping with the conductive layer 21.

The conductive layer 21 includes a portion overlapping with the wiring S2 and the wiring S3. It is preferable that the conductive layer 21 not overlap with the wiring S1 and the wiring S4 which are positioned along the both sides. Thus, parasitic capacitance of the wiring S1 and the wiring S4 can be reduced.

When the distance between the wiring S1 and the wiring S2 is called a distance D1 and the distance between the wiring S2 and the wiring S3 is called a distance D2, the distance D1 is preferably larger than the distance D2. Thus, parasitic capacitance between the wiring S1 and the wiring S2 can be reduced.

Owing to a wide distance between wirings, dust or the like that adheres between the wirings in the manufacturing process is easily removed by washing, improving the yield. When the washing is performed with a line washing apparatus, it is preferable that during the washing, a substrate be moved along the direction in which the wiring S1 and the like extend, in which case dust can be removed more easily.

The wiring CS in FIG. 3B has a portion wider than the other portion. Thus, the wiring resistance can be small. Note that wirings other than the wiring CS may have a portion wider than the other portion.

Figure 3C:
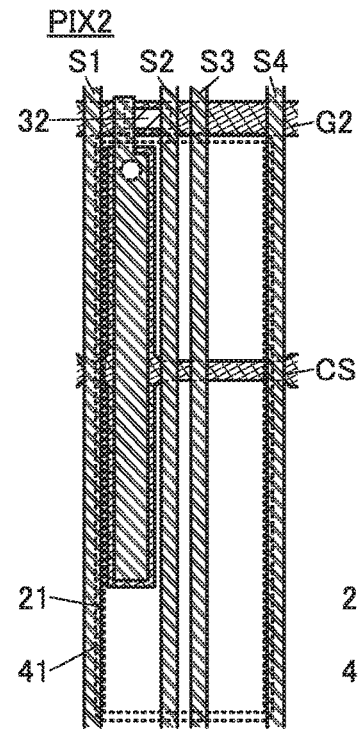
Figure 3D:
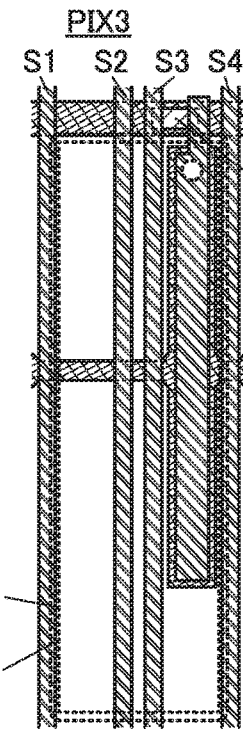
Figure 3E:
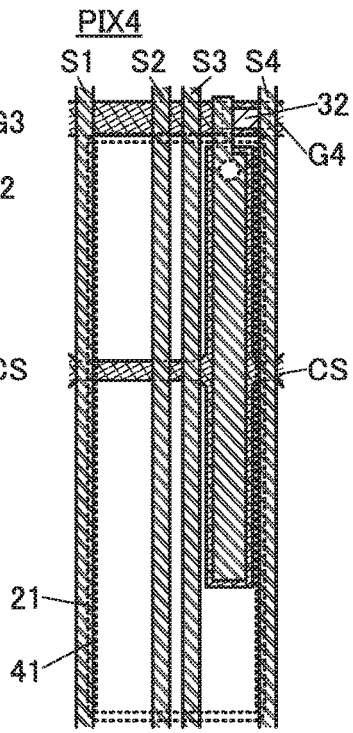

FIG. 3C, FIG. 3D, and FIG. 3E illustrate examples of layouts of the pixel PIX2 connected to the wiring G2, the pixel PIX3 connected to the wiring G3, and the pixel PIX4 connected to the wiring G4, respectively.

In FIG. 3C, the semiconductor layer 32 provided over the wiring G2 is electrically connected to the wiring S2, and has a region positioned between the wiring S1 and the wiring S2. In FIG. 3D, the semiconductor layer 32 provided over the wiring G3 is electrically connected to the wiring S3, and has a region positioned between the wiring S3 and the wiring S4. In FIG. 3E, the semiconductor layer 32 provided over the wiring G4 is electrically connected to the wiring S4, and has a region positioned between the wiring S3 and the wiring S4.

The pixels illustrated in FIGS. 3B to 3E preferably emit light of the same color when the pixels are arranged in one column in the column direction. The coloring layers 41 that transmit light of the same color can be provided in a region overlapping with the conductive layer 21. Pixels that adjoin in one row in the row direction preferably emit light of different colors. In that case, the pixel configuration can be the same as those of FIGS. 3B to 3E, but the coloring layers 41 that transmit different colors are provided.

Here, with use of a light-transmitting material for the pair of electrodes of the capacitor 60, the aperture ratio of a pixel (an effective transmission area ratio) can be increased.

Figure 4A:
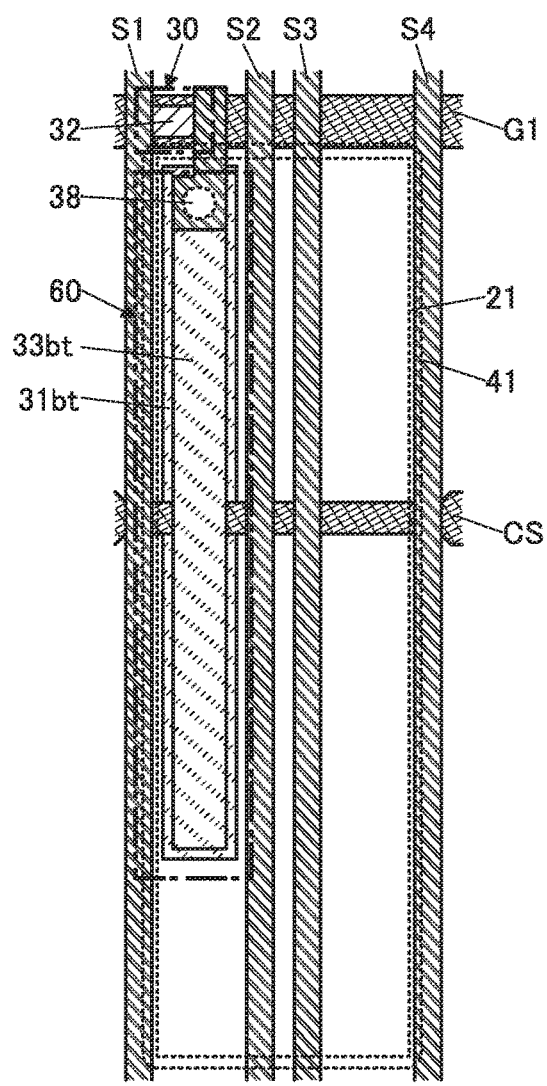
FIGS. 4A to 4D illustrate structure examples of a display device.

FIG. 4A illustrates an example in which a conductive layer 31*bt* and a conductive layer 33*bt* are used for the pair of electrodes of the capacitor 60. The conductive layer 31*bt* and the conductive layer 33*bt* contain a material that transmits visible light. The conductive layer 31*bt* is electrically connected to the wiring CS. The conductive layer 33*bt* is electrically connected to the other of the source electrode and the drain electrode of the transistor 30 and the conductive layer 21 that functions as a pixel electrode.

Figure 4B:
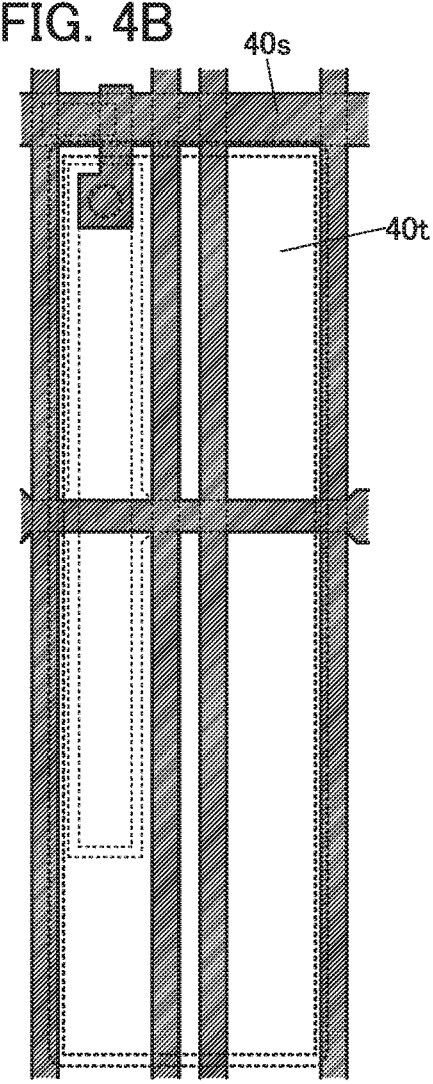

FIG. 4B illustrates an example in which the layout illustrated in FIG. 4A is separately shown as a light-blocking region 40*s* that blocks visible light and a transmissive region 40*t* that transmits visible light. As illustrated, a region where the capacitor 60 is provided can be used as the transmissive region 40*t*, whereby the aperture ratio can be improved and the power consumption can be reduced.

Figure 4C:
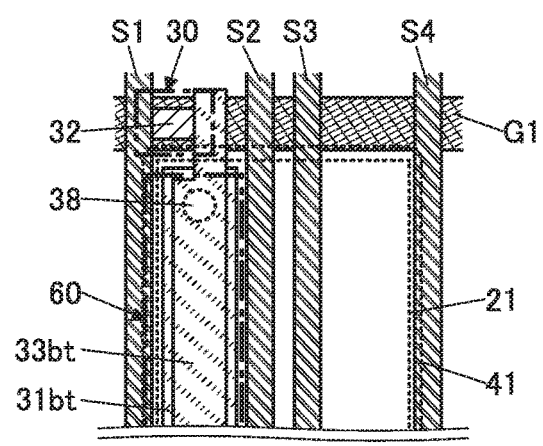

FIG. 4C illustrates an example in which part of the conductive layer 33*bt* included in the capacitor 60 serves as the other of the source electrode and the drain electrode of the transistor 30. That is, the part of the conductive layer 33*bt* overlaps with and is electrically connected to part of the semiconductor layer 32.

Figure 4D:
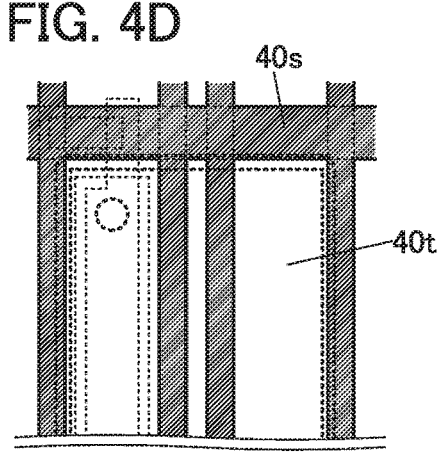

Thus, as illustrated in FIG. 4D, the area of the transmissive region 40*t* can be increased. In FIG. 4D, components of the light-blocking region 40*s* are only the wirings S1 to S4, the wiring G1 and the like, and the wiring CS. Accordingly, the top surface shape of the transmissive region 40*t* can be substantially symmetrical. Thus, display regions in the four kinds of pixels arranged in one column in the column direction can have substantially the same shapes, which can suppress generation of display unevenness.

The higher the proportion of the area of the transmissive region 40*t* to the area occupied by a pixel is, the larger the amount of transmission light can be. The proportion of the area of the transmissive region to the area occupied by a pixel is, for example, greater than or equal to 1% and less than or equal to 95%, preferably greater than or equal to 10% and less than or equal to 95%, more preferably greater than or equal to 15% and less than or equal to 95%. It is particularly preferable that the proportion be greater than or equal to 30% or greater than or equal to 50%. Thus, a display device with low power consumption can be provided. Note that the area occupied by a pixel can be obtained by dividing the pixel region by the total number of pixels, for example.

[Modification Example 1]

An example in which three adjacent gate lines are supplied with the same selection signal is described below. That is, three pixels adjacent to one another in the column direction are concurrently selected; thus, three source lines are arranged for each column.

The middle source line among the three source lines is preferably disposed to overlap with the conductive layer that functions as a pixel electrode. Thus, the distance between pixel electrodes can be short.

Furthermore, part of a semiconductor layer of a transistor is preferably positioned between the outer source line and the middle source line among the three source lines. For example, in the case where first to third source lines are arranged in this order, part of a semiconductor layer of a transistor connected to the first source line and part of a semiconductor layer of a transistor connected to the second source line are positioned between the first source line and the second source line. Part of a semiconductor layer of a transistor connected to the third source line is positioned between the second source line and the third source line. Thus, a node between each source line and each semiconductor layer can be prevented from intersecting with another source line. Accordingly, parasitic capacitance between the source lines can be reduced.

Figure 5A:
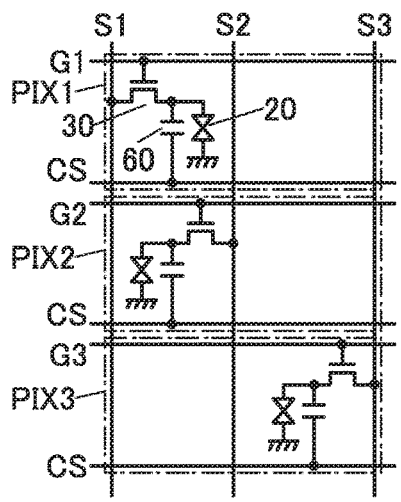
FIGS. 5A to 5D illustrate a structure example of a display device.

FIG. 5A is a circuit diagram including three pixels (the pixel PIX1, the pixel PIX2, and the pixel PIX3) arranged in one column in the column direction. Each pixel includes the transistor 30, the liquid crystal element 20, and the capacitor 60.

Figure 5B:
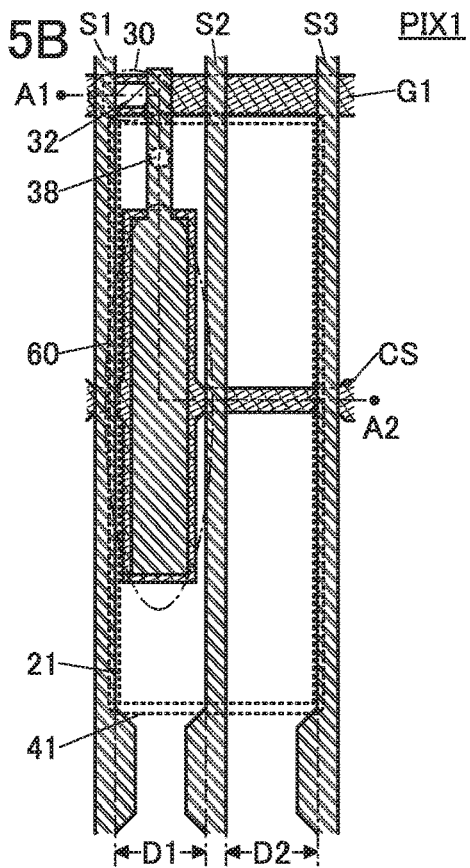

FIG. 5B illustrates an example of a layout of the pixel connected to the wiring S1 and the wiring G1.

As illustrated in FIG. 5B, the wiring G1 and the wiring CS extend in the row direction (the lateral direction), and the wirings S1 to S3 extend in the column direction (the longitudinal direction).

When the distance between the wiring S1 and the wiring S2 is called the distance D1 and the distance between the wiring S2 and the wiring S3 is called the distance D2, it is preferable that the distance D1 and the distance D2 be substantially equal to each other. For example, the ratio of the distance D2 to the distance D1 (the value of D2/D1) is greater than or equal to 0.8 and less than or equal to 1.2, preferably greater than or equal to 0.9 and less than or equal to 1.1. Thus, parasitic capacitance between the wiring S1 and the wiring S2 and parasitic capacitance between the wiring S2 and the wiring S3 can be reduced.

Figure 5C:
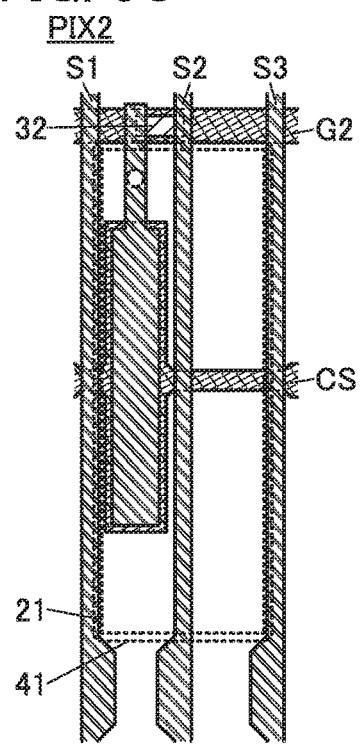
Figure 5D:
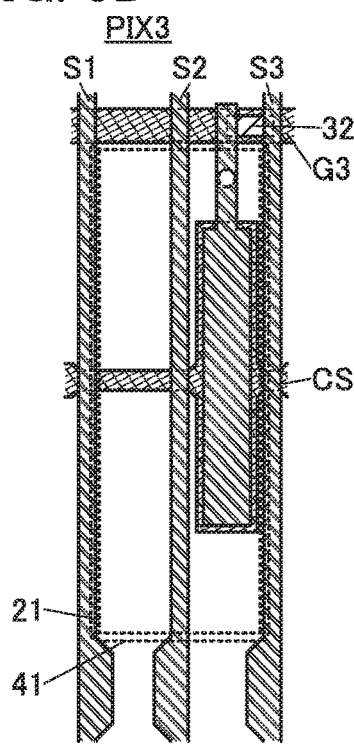

FIG. 5C and FIG. 5D illustrate examples of layouts of the pixel PIX2 connected to the wiring G2 and the pixel PIX3 connected to the wiring G3, respectively.

In FIG. 5C, the semiconductor layer 32 provided over the wiring G2 is electrically connected to the wiring S2, and has a region positioned between the wiring S1 and the wiring S2. The capacitor 60 is positioned between the wiring S1 and the wiring S2.

In FIG. 5D, the semiconductor layer 32 provided over the wiring G3 is electrically connected to the wiring S3, and has a region positioned between the wiring S2 and the wiring S3. The capacitor 60 is positioned between the wiring S2 and the wiring S3.

The above is the description of Modification example 1.

[Modification Example 2]

FIGS. 6A and 6B illustrate examples in which the shape of the transistor 30 is different from the shapes of the transistor 30 in FIG. 3B and FIG. 5B. In the transistor 30 illustrated in FIGS. 6A and 6B, one of a source electrode and a drain electrode over the semiconductor layer 32 has a substantially arc shape, and the other of the source electrode and the drain electrode over the semiconductor layer 32 is provided at a certain distance from the arc-shape electrode. With such a structure, the transistor 30 can have a larger channel width and make a larger amount of current flow. The transistor 30 with such a structure is suitable particularly in the case where amorphous silicon or the like is used for the semiconductor layer 32, for example.

FIGS. 6A and 6B illustrate examples in which part of the wirings S1 to S4 (or the wirings S1 to S3) and part of the wiring CS are wider than the other portions. Thus, the wiring resistance can be small.

[Cross-sectional Structure Example 1]

A cross-sectional structure example of a display device is shown below.

[Cross-sectional structure example 1-1]

Figure 7:
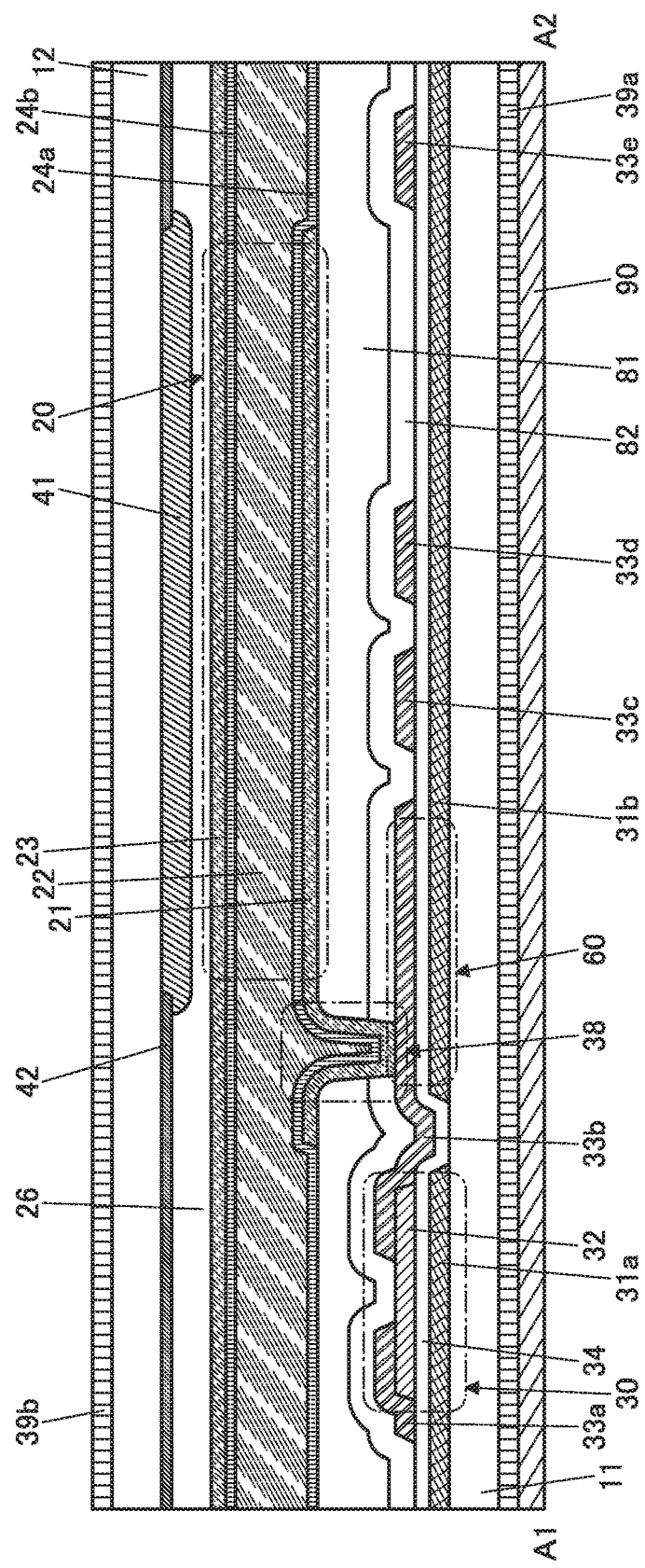
FIG. 7 illustrates a structure example of a display device.

FIG. 7 illustrates an example of a cross section along a line A1-A2 in FIG. 3B. Here, an example where a transmissive liquid crystal element 20 is used as a display element is shown. In FIG. 7, the substrate 12 side is the display surface side.

In the display device 10, a liquid crystal 22 is provided between a substrate 11 and the substrate 12. The liquid crystal element 20 includes the conductive layer 21 provided on the substrate 11 side, a conductive layer 23 provided on the substrate 12 side, and the liquid crystal 22 provided between the conductive layers 21 and 23. Furthermore, an alignment film 24a is provided between the liquid crystal 22 and the conductive layer 21 and an alignment film 24b is provided between the liquid crystal 22 and the conductive layer 23.

The conductive layer 21 functions as a pixel electrode. The conductive layer 23 functions as a common electrode or the like. The conductive layer 21 and the conductive layer 23 each have a function of transmitting visible light. Thus, the liquid crystal element 20 is a transmissive liquid crystal element.

The coloring layer 41 and a light-blocking layer 42 are provided on a surface of the substrate 12 on the substrate 11 side. An insulating layer 26 is provided to cover the coloring layer 41 and the light-blocking layer 42, and the conductive layer 23 is provided to cover the insulating layer 26. The coloring layer 41 is provided in a region overlapping with the conductive layer 21. The light-blocking layer 42 is provided to cover the transistor 30 and the connection portion 38.

A polarizing plate 39a is located outward from the substrate 11, and a polarizing plate 39b is located outward from the substrate 12. Furthermore, a backlight unit 90 is located outward from the polarizing plate 39a.

The transistor 30, the capacitor 60, and the like are provided over the substrate 11. The transistor 30 functions as a selection transistor of a pixel. The transistor 30 is electrically connected to the liquid crystal element 20 through the connection portion 38.

The transistor 30 illustrated in FIG. 7 is what is called a channel-etched bottom-gate transistor. The transistor 30 includes a conductive layer 31a functioning as a gate electrode, an insulating layer 34 functioning as a gate insulating layer, the semiconductor layer 32, and a pair of conductive layers 33a and 33b functioning as a source electrode and a drain electrode. A region of the semiconductor layer 32 overlapping with the conductive layer 31a functions as a channel formation region. The semiconductor layer 32 is in contact with the conductive layer 33a or 33b.

Note that the conductive layer 31a corresponds to part of the wiring G1 in FIG. 3B, and the conductive layer 33a corresponds to part of the wiring S1. Furthermore, a conductive layer 31b, a conductive layer 33c, a conductive layer 33d, and a conductive layer 33e which are described later correspond to the wiring CS, the wiring S2, the wiring S3, and the wiring S4, respectively.

A metal oxide having semiconductor characteristics (also referred to as an oxide semiconductor) is preferably used for the semiconductor layer 32. A transistor including an oxide semiconductor does not need a crystallization step which is necessary in a transistor including polycrystalline silicon, and can be formed over a large substrate with a high yield. Furthermore, a transistor including an oxide semiconductor can have higher field-effect mobility than a transistor including amorphous silicon.

The capacitor 60 includes the conductive layer 31b, the insulating layer 34, and the conductive layer 33b. Furthermore, the conductive layer 33c, the conductive layer 33d, and the conductive layer 33e are provided over the conductive layer 31b with the insulating layer 34 provided therebetween.

An insulating layer 82 and an insulating layer 81 are stacked to cover the transistor 30 and the like. The conductive layer 21 functioning as a pixel electrode is provided over the insulating layer 81. In the connection portion 38, the conductive layer 21 is electrically connected to the conductive layer 33b through an opening in the insulating layers 81 and 82. The insulating layer 81 preferably functions as a planarization layer. The insulating layer 82 preferably functions as a protective film that inhibits diffusion of impurities or the like to the transistor 30 and the like. The insulating layer 82 can be formed using an inorganic insulating material, and the insulating layer 81 can be formed using an organic insulating material, for example.

[Cross-Sectional Structure Example 1-2]

Figure 8:
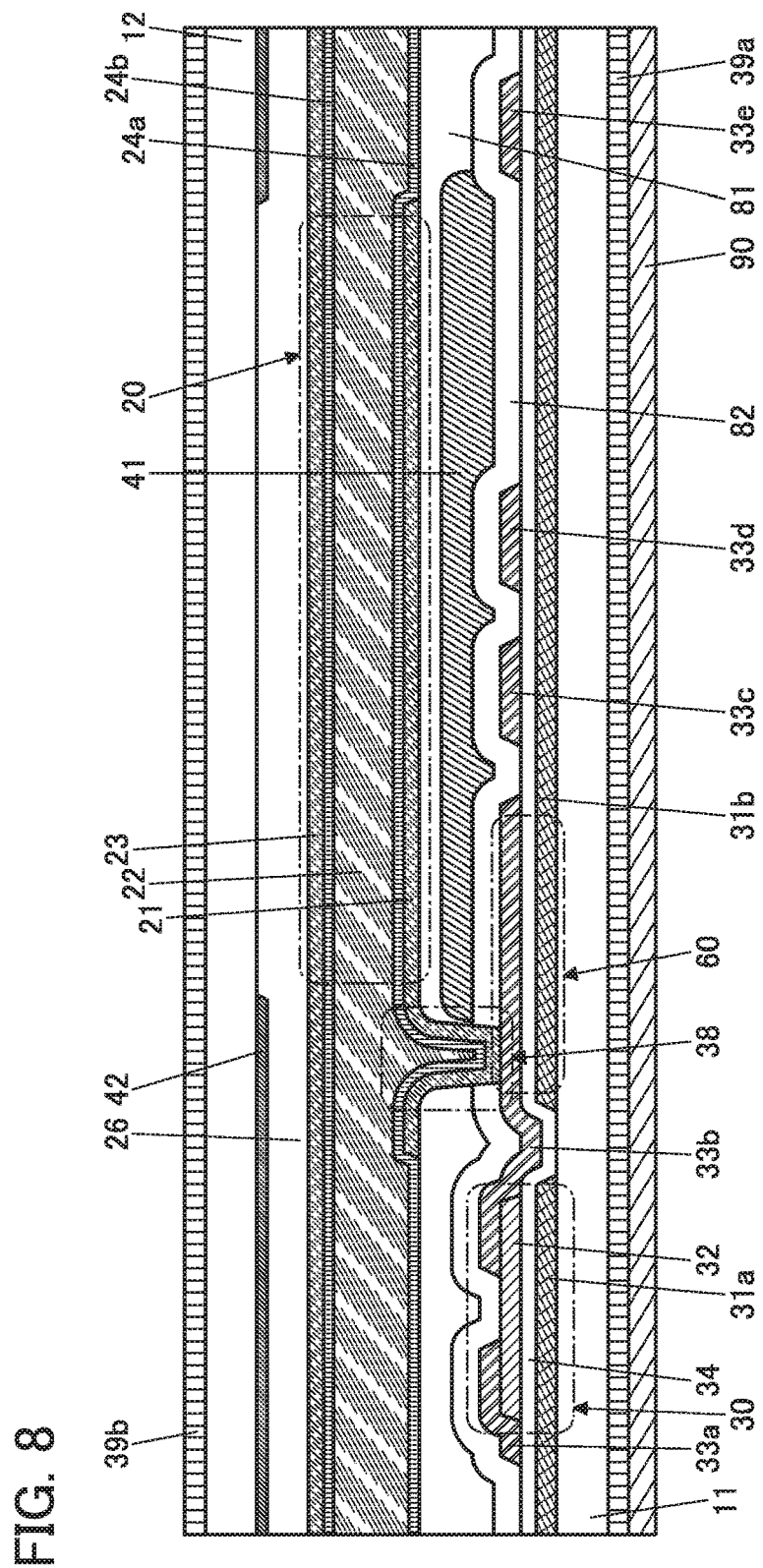
FIG. 8 illustrates a structure example of a display device.

FIG. 8 illustrates an example where the coloring layer 41 is provided on the substrate 11 side. Thus, the structure on the substrate 12 side can be simplified.

Note that in the case where the coloring layer 41 is a planarization film, the insulating layer 81 is not necessarily provided.

[Cross-sectional structure example 1-3]

In each of the above examples, a vertical electric field mode liquid crystal element in which a pair of electrodes are provided over and under a liquid crystal is used as the liquid crystal element: the structure of the liquid crystal element is not limited thereto and any of a variety of liquid crystal elements can be used.

Figure 9:
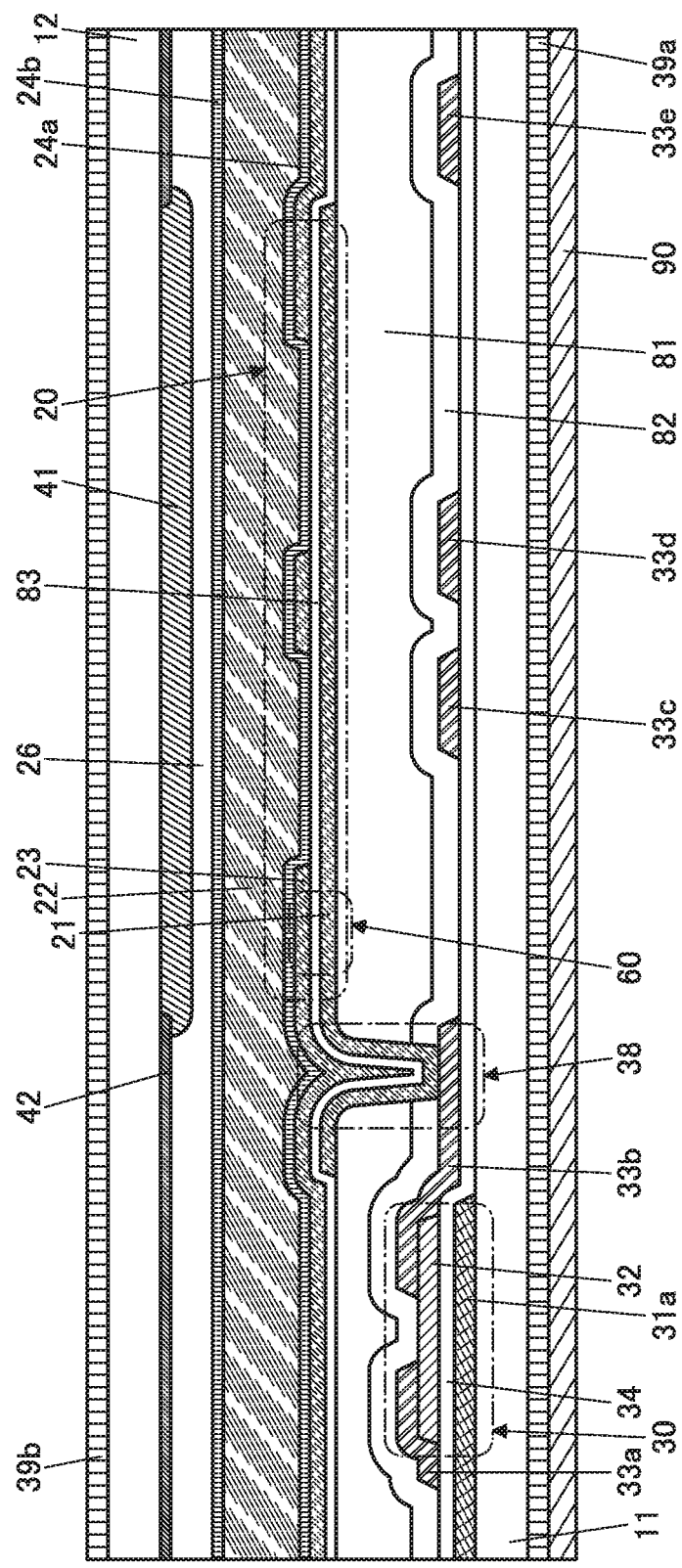
FIG. 9 illustrates a structure example of a display device.

FIG. 9 is a schematic cross-sectional view of a display device including a liquid crystal element using a fringe field switching (FFS) mode.

The liquid crystal element 20 includes the conductive layer 21 functioning as a pixel electrode and the conductive layer 23 overlapping with the conductive layer 21 with an insulating layer 83 provided therebetween. The conductive layer 23 has a slit-like or comb-like top surface.

In such a structure, a capacitor, which can be used as the capacitor 60, is formed in a region where the conductive layer 21 and the conductive layer 23 overlap with each other. Thus, the area occupied by a pixel can be reduced, leading to a high-resolution display device. Accordingly, the aperture ratio can be improved.

Figure 10:
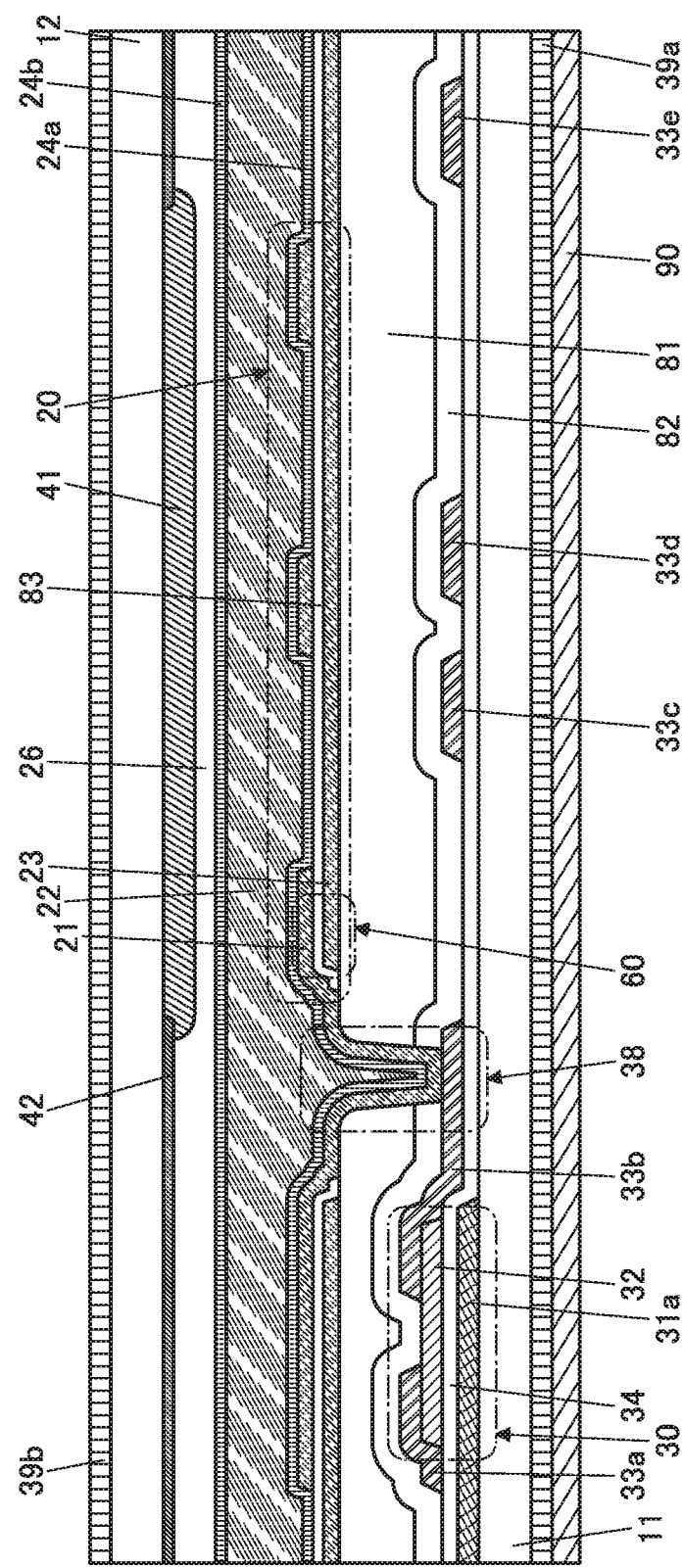
FIG. 10 illustrates a structure example of a display device.

Although FIG. 9 illustrates the structure in which the conductive layer 23 functioning as a common electrode is on the liquid crystal 22 side, a structure in which the conductive layer 21 functioning as a pixel electrode is on the liquid crystal 22 side may be employed as illustrated in FIG. 10. In such a structure, the conductive layer 21 has a slit-like or comb-like top surface.

[Cross-sectional Structure Example 1-4]

An example where a light-transmitting conductive film is used for the capacitor 60 or the like is described below.

Figure 11:
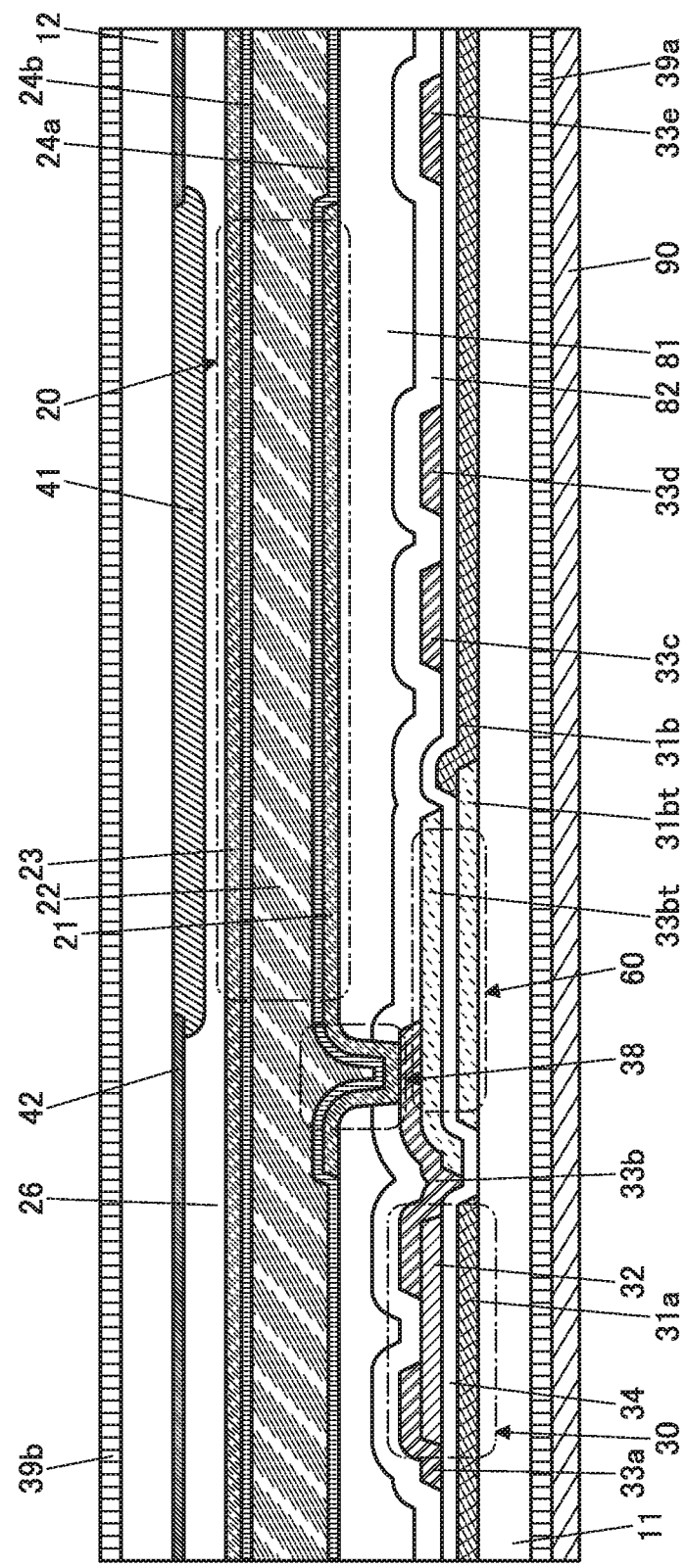
FIG. 11 illustrates a structure example of a display device.

A structure illustrated in FIG. 11 is mainly different from the structure illustrated in FIG. 7 in the structure of the capacitor 60. The structure illustrated in FIG. 11 is a cross section corresponding to the layout illustrated in FIG. 4A.

The capacitor 60 includes a structure where a conductive layer 31bt, the insulating layer 34, and a conductive layer 33bt are stacked in this order from the substrate 11 side. The conductive layer 31bt and the conductive layer 33bt each include a light-transmitting conductive material. For example, a metal oxide film with transmittance of visible light of greater than or equal to 70% and less than 100%, preferably greater than or equal to 80% and less than 100% can be used.

Part of the conductive layer 31bt is in contact with and electrically connected to the conductive layer 31b. Part of the conductive layer 33bt is in contact with and electrically connected to the conductive layer 33b.

Here, in the case where a metal oxide film and a metal film are stacked, when the metal oxide film is formed over the metal film, a surface of the metal film is oxidized; thus, electrical resistance of the metal film itself or contact resistance between the metal film and the metal oxide film is increased in some cases. For that reason, as illustrated in FIG. 11, a conductive layer including metal or the like is preferably provided over a conductive layer including a metal oxide.

[Cross-sectional Structure Example 1-5]

Figure 12:
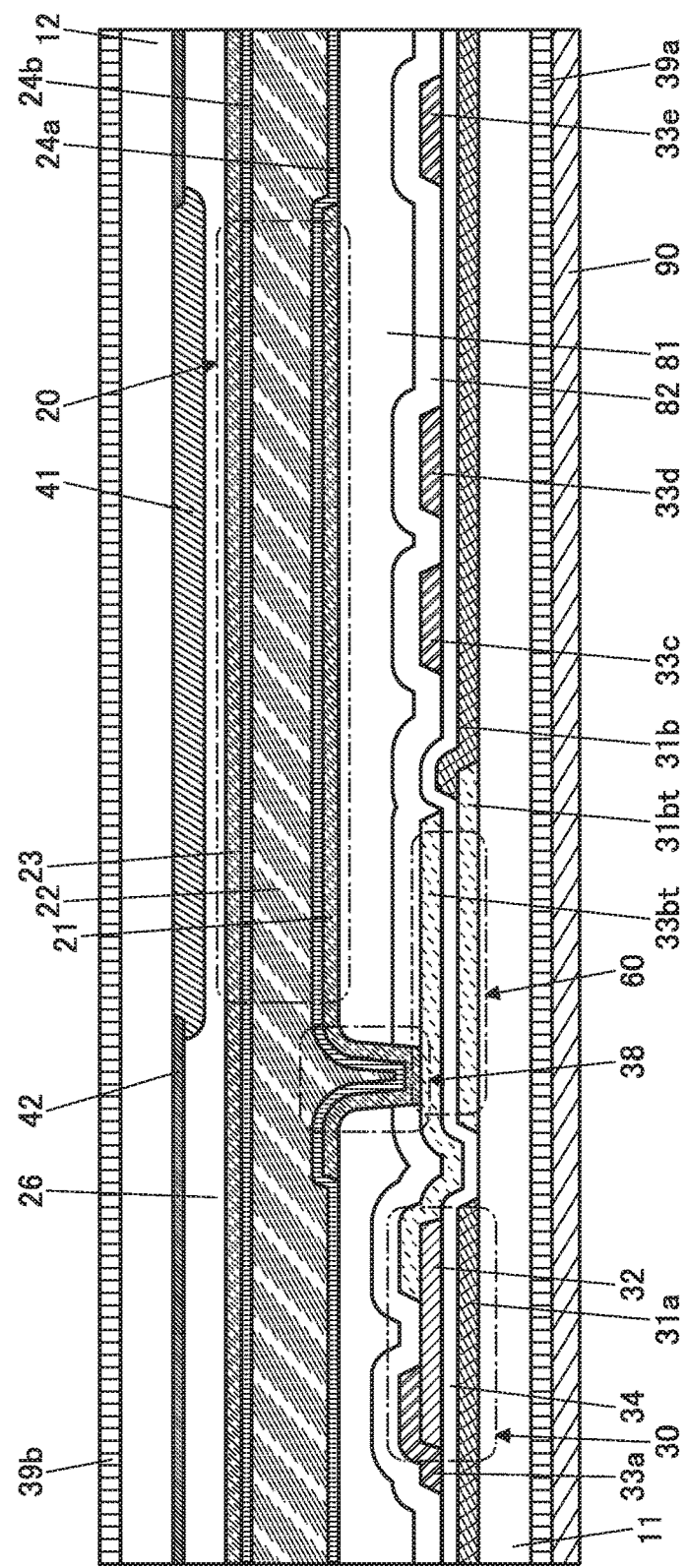
FIG. 12 illustrates a structure example of a display device.

FIG. 12 illustrates a cross section corresponding to the layout illustrated in FIG. 4C.

In FIG. 12, part of the conductive layer 33bt is in contact with the semiconductor layer 32. Thus, part of the conductive layer 33bt functions as one of a source electrode and a drain electrode of the transistor 30.

The conductive layer 21 is provided in contact with part of a top surface of the conductive layer 33bt. The conductive layer 21 and the conductive layer 33bt each include a metal oxide film, which leads to a decrease in contact resistance therebetween.

[Cross-sectional Structure Example 1-6]

Figure 13:
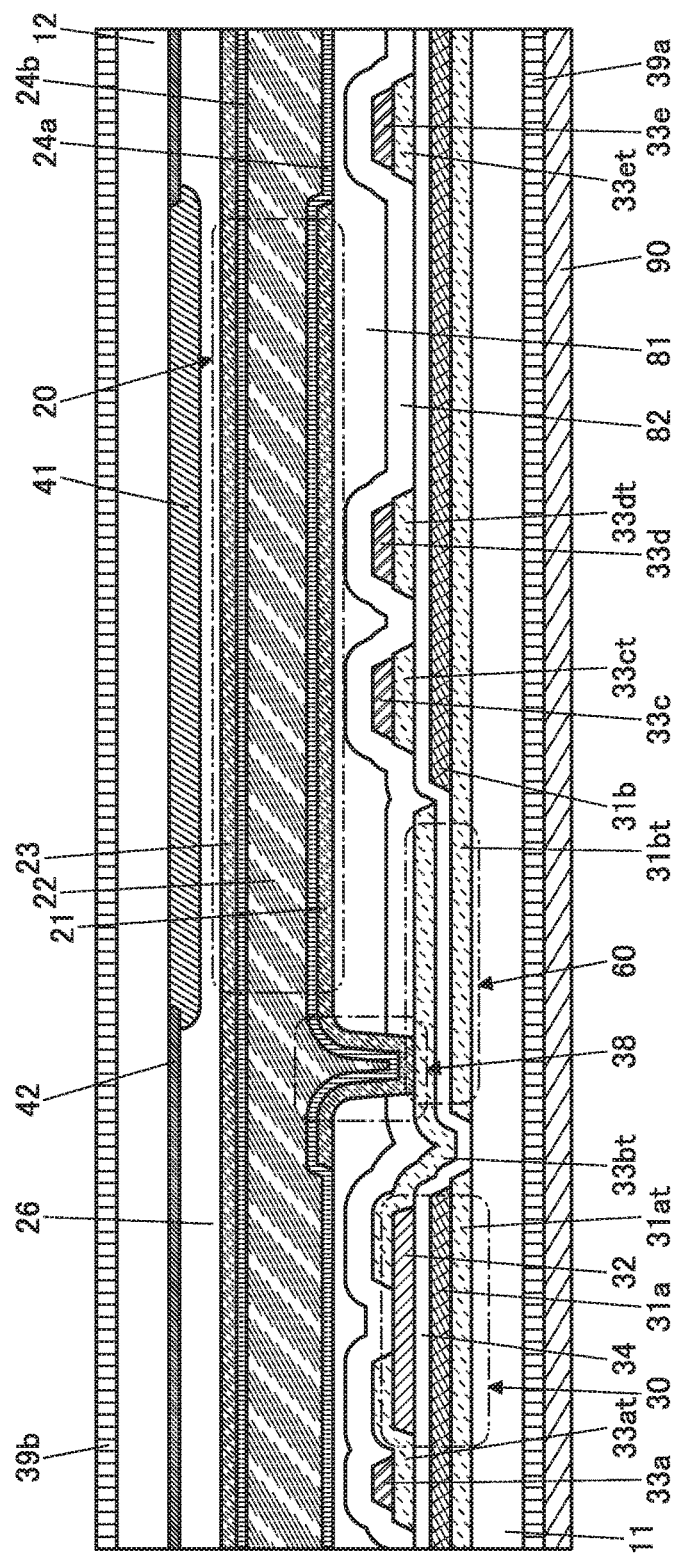
FIG. 13 illustrates a structure example of a display device.

FIG. 13 illustrates an example where a conductive layer functioning as a gate electrode of a transistor and a conductive layer functioning as a source electrode and a drain electrode of the transistor each have a stacked-layer structure including a conductive film having a light-transmitting property and a conductive film having a light-blocking property and are formed by using an exposure technique with a half-tone mask, a gray-tone mask, or the like, or a multiple exposure technique. Thus, a smaller number of photomasks is required.

Note that a stacked layer obtained by such an exposure technique has a characteristic cross-sectional shape in that an end of a layer on the upper side is located inward from an end of a layer on the lower side.

In the transistor 30, a conductive layer 31at is provided on the substrate 11 side of the conductive layer 31a. A pair of conductive layers 33at and 33bt that function as a source electrode and a drain electrode are in contact with the semiconductor layer 32. The conductive layer 33a is provided over the conductive layer 33at.

The capacitor 60 includes part of the conductive layer 33bt and part of the conductive layer 31bt. The conductive layer 31b forming the wiring CS is provided over the conductive layer 33bt.

A conductive layer 33ct, a conductive layer 33dt, and a conductive layer 33et are provided below the conductive layer 33c, the conductive layer 33d, and the conductive layer 33e, respectively.

Here, the smaller the number of photolithography steps in a manufacturing process of a display device is, i.e., the smaller the number of photomasks is, the lower the manufacturing cost can be.

For example, the display device having the structure illustrated in FIG. 7 can be manufactured through five photolithography steps, i.e., a formation step of the conductive layer 31a and the like, a formation step of the semiconductor layer 32, a formation step of the conductive layer 33a and the like, a formation step of the opening to be the connection portion 38, and a formation step of the conductive layer 21, among steps on the substrate 11 side. That is, a back plane substrate can be manufactured with five photomasks. On the other hand, on the substrate 12 (counter substrate) side, an ink-jet method, a screen printing method, or the like is preferably used as the formation methods of the coloring layer 41 and the light-blocking layer 42, in which case a photomask becomes unnecessary. For example, in the case where three-color coloring layers 41 and the light-blocking layer 42 are provided, four or more photomasks can be reduced compared with the case where these are formed by a photolithography process.

The above is the description of the cross-sectional structure examples.

[Structure Example 1 of Transistor]

Structure examples of a transistor different from the above transistors are described below.

An OS transistor can be formed by using a metal oxide for the semiconductor layer 32 of the transistor described below. With an OS transistor, the frequency of updating a video signal can be set low in a period during which there is no change in a video or a period during which the change is below a certain level; thus, a reduction in power consumption can be achieved.

Figure 14A:
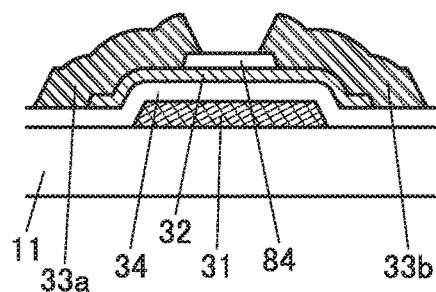
FIGS. 14A to 14E illustrate structure examples of a transistor.

In a transistor illustrated in FIG. 14A, an insulating layer 84 is provided over a channel formation region of the semiconductor layer 32. The insulating layer 84 functions as an etching stopper at the time of etching of the conductive layers 33a and 33b.

Figure 14B:
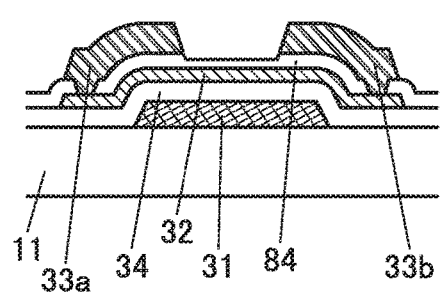

A transistor illustrated in FIG. 14B has a structure in which the insulating layer 84 extends over the insulating layer 34 to cover the semiconductor layer 32. In this case, the conductive layers 33a and 33b are connected to the semiconductor layer 32 through openings in the insulating layer 84.

Figure 14C:
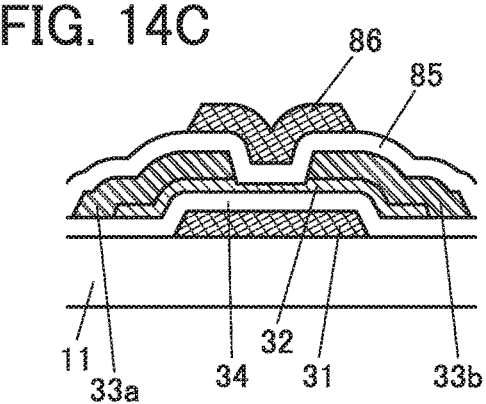

A transistor illustrated in FIG. 14C includes an insulating layer 85 and a conductive layer 86. The insulating layer 85 is provided to cover the semiconductor layer 32, the conductive layer 33a, and the conductive layer 33b. Furthermore, the conductive layer 86 is provided over the insulating layer 85 and includes a region overlapping with the semiconductor layer 32.

The conductive layer 86 is located to face the conductive layer 31 with the semiconductor layer 32 positioned therebetween. In the case where the conductive layer 31 is used as a first gate electrode, the conductive layer 86 can function as a second gate electrode. By applying the same potential to the conductive layer 31 and the conductive layer 86, the on-state current of the transistor can be increased. By applying a potential for controlling the threshold voltage to one of the conductive layers 31 and 86 and a potential for driving to the other, the threshold voltage of the transistor can be controlled.

Although FIGS. 14A to 14C each illustrate an example where an end portion of the semiconductor layer 32 is located outward from an end portion of the conductive layer 31, one embodiment of the present invention is not limited thereto. The end portion of the semiconductor layer 32 may be located inward from the end portion of the conductive layer 31.

Figure 14D:
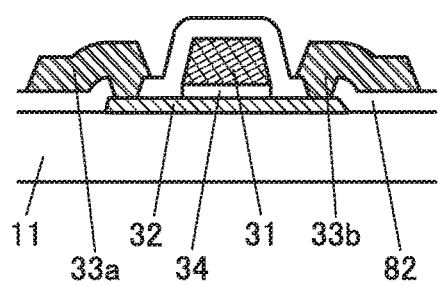

A transistor illustrated in FIG. 14D is a top-gate transistor, and the conductive layer 31 functioning as a gate electrode is provided above the semiconductor layer 32 (on the side opposite to the formation surface side). The insulating layer 34 and the conductive layer 31 are stacked over the semiconductor layer 32. The insulating layer 82 is provided to cover the top surface and side end portions of the semiconductor layer 32 and the conductive layer 31. The conductive layers 33a and 33b are provided over the insulating layer 82. The conductive layers 33a and 33b are connected to the semiconductor layer 32 through openings in the insulating layer 82.

Note that although the insulating layer 34 is not present in a portion that does not overlap with the conductive layer 31 in this example, the insulating layer 34 may be provided to cover the upper surface and the side end portions of the semiconductor layer 32.

In the transistor illustrated in FIG. 14D, the physical distance between the conductive layer 31 and each of the conductive layers 33a and 33b can be easily increased, so that the parasitic capacitance therebetween can be reduced.

Figure 14E:
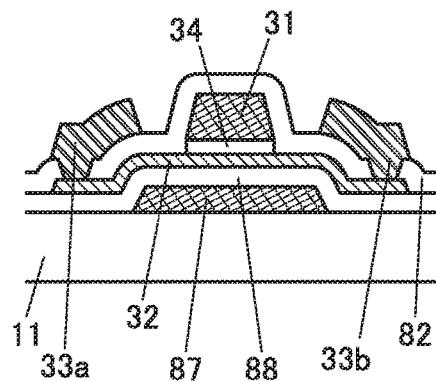

A transistor illustrated in FIG. 14E is different from the transistor illustrated in FIG. 14D in that the transistor illustrated in FIG. 14E includes a conductive layer 87 and an insulating layer 88. The conductive layer 87 includes a region overlapping with the semiconductor layer 32. The insulating layer 88 covers the conductive layer 87.

The conductive layer 87 functions as a second gate electrode. Thus, the on-state current can be increased and the threshold voltage can be controlled, for example.

The above is the description of Structure example 1 of the transistor.

[Cross-sectional Structure Example 2]

Cross-sectional structure examples of a display device including silicon for a semiconductor layer of a transistor are described below.

[Cross-sectional Structure Example 2-1]

Figure 15:
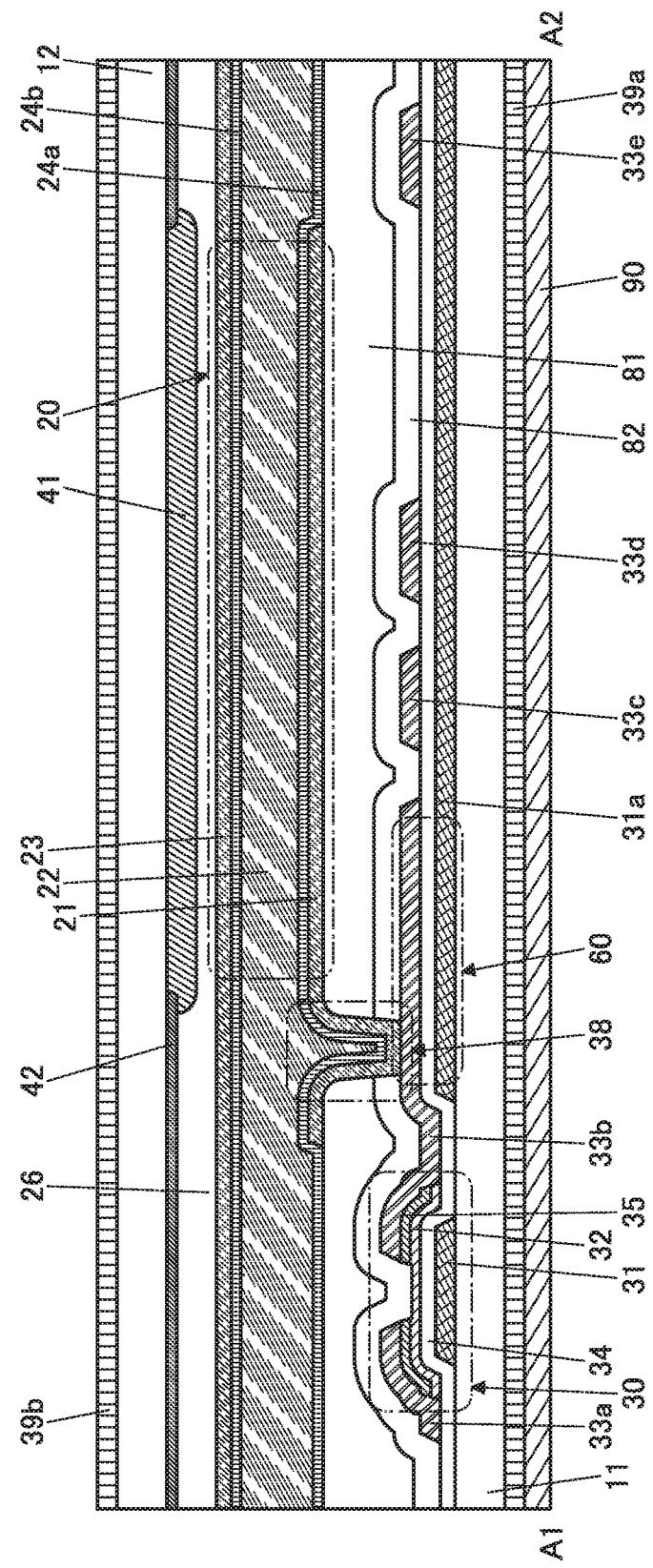
FIG. 15 illustrates a structure example of a display device.

A structure illustrated in FIG. 15 is different from the structure described in the above cross-sectional structure example 1-1 (FIG. 7) mainly in the structure of the transistor 30.

The transistor 30 illustrated in FIG. 15 is what is called a channel-etched bottom-gate transistor. The transistor 30 includes the conductive layer 31 functioning as a gate electrode, the insulating layer 34 functioning as a gate insulating layer, the semiconductor layer 32, a pair of impurity semiconductor layers 35 functioning as a source region and a drain region, and a pair of conductive layers 33a and 33b functioning as a source electrode and a drain electrode. A region of the semiconductor layer 32 overlapping with the conductive layer 31 functions as a channel formation region. The semiconductor layer 32 is in contact with the impurity semiconductor layer 35, and the impurity semiconductor layer 35 is in contact with the conductive layer 33a or 33b.

A semiconductor containing silicon is preferably used for the semiconductor layer 32. For example, amorphous silicon, microcrystalline silicon, polycrystalline silicon, or the like can be used. Amorphous silicon is particularly preferable because it can be formed over a large substrate with a high yield. A display device of one embodiment of the present invention can perform favorable display even with a transistor including amorphous silicon having relatively low field-effect mobility. As amorphous silicon, hydrogenated amorphous silicon (denoted by a-Si:H in some cases) in which dangling bonds are terminated by hydrogen is preferably used.

The impurity semiconductor film to form the impurity semiconductor layer 35 is formed using a semiconductor to which an impurity element imparting one conductivity type is added. In the case where the transistor is an n-channel transistor, for example, silicon to which P or As is added is given as a semiconductor to which an impurity element imparting one conductivity type is added. In the case where the transistor is a p-channel transistor, for example, it is possible to add B as the impurity element imparting one conductivity type; however, it is preferable to use an n-channel transistor. Note that the impurity semiconductor layer 35 may be formed using an amorphous semiconductor or a crystalline semiconductor such as a microcrystalline semiconductor.

[Cross-sectional Structure Example 2-2]

Figure 16:
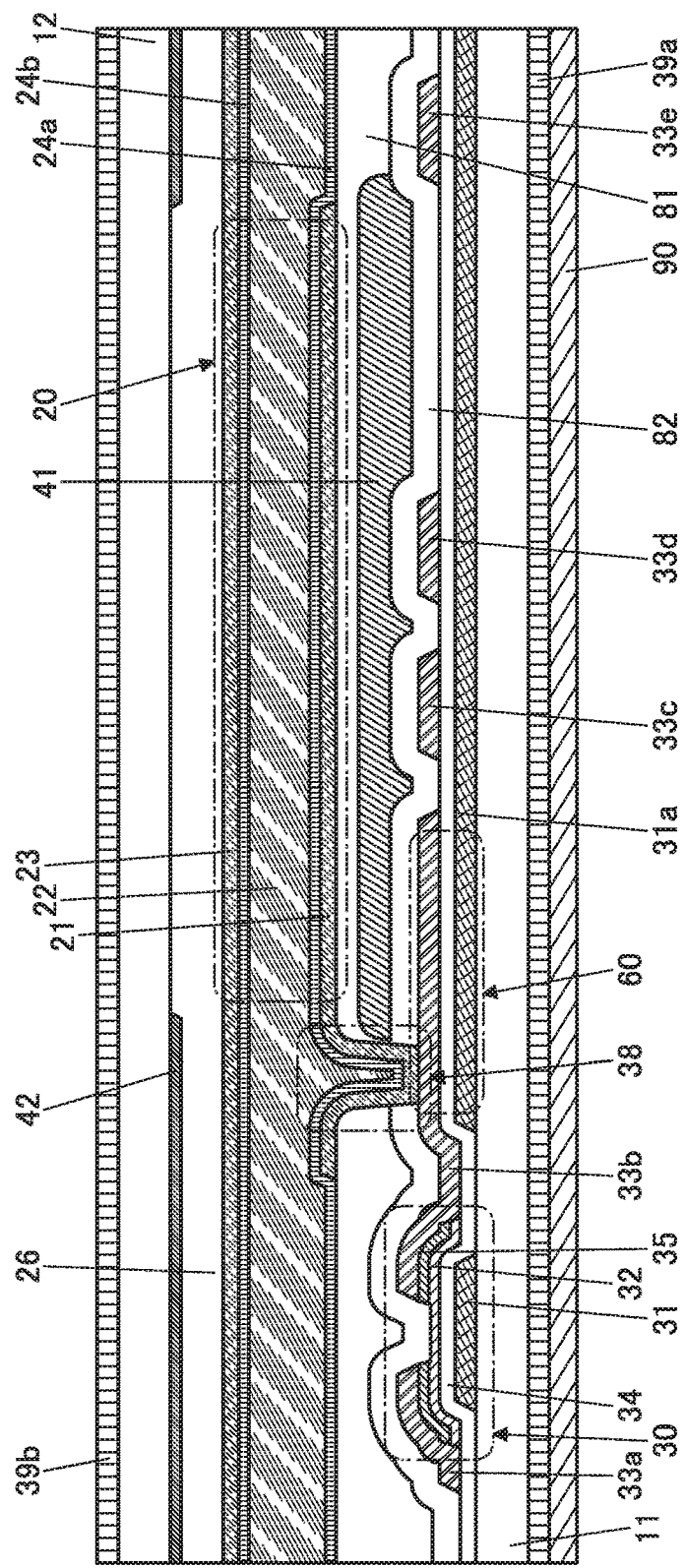
FIG. 16 illustrates a structure example of a display device.

FIG. 16 illustrates an example where the coloring layer 41 is provided on the substrate 11 side. The cross-sectional structure example 1-2 can be referred to for Cross-sectional structure example 2-2 except the structure of the transistor 30.

[Cross-sectional Structure Example 2-3]

Figure 17:
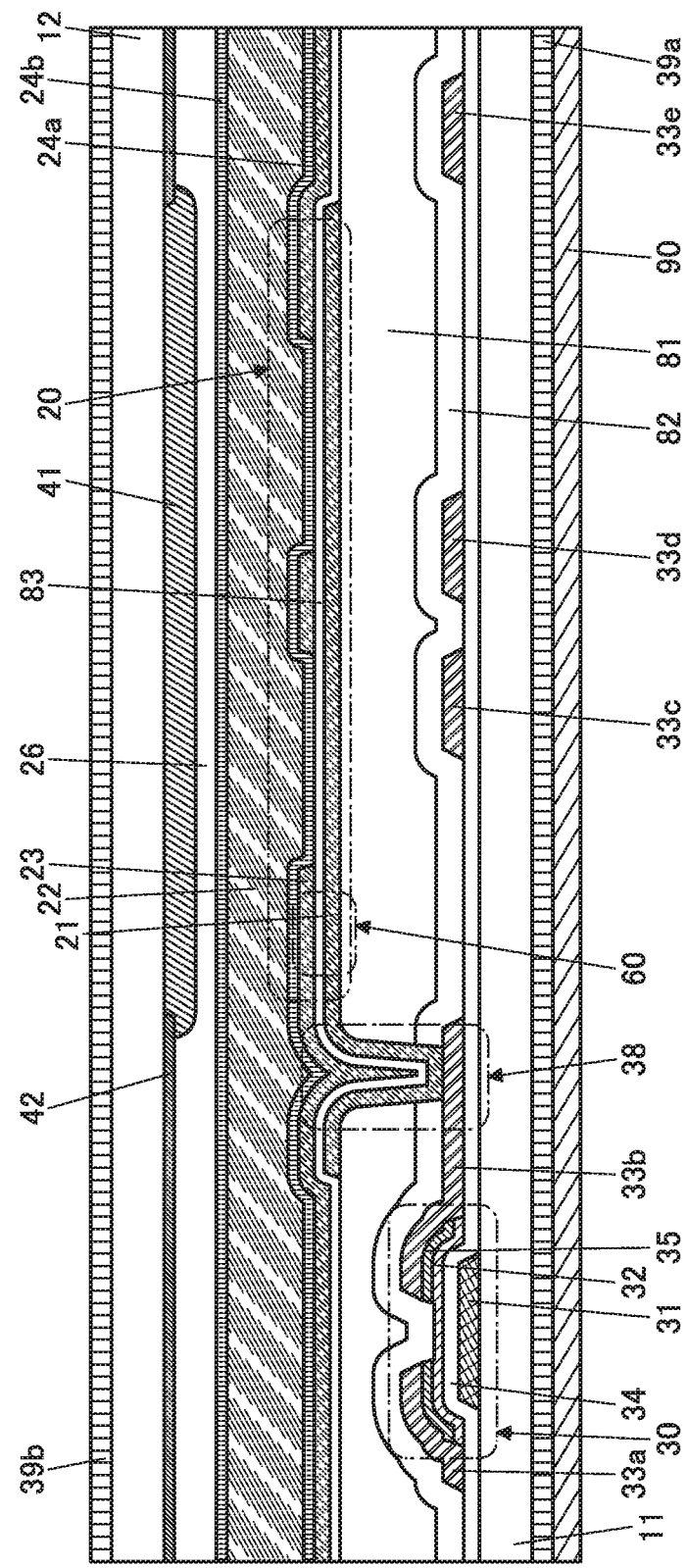
FIG. 17 illustrates a structure example of a display device.
Figure 18:
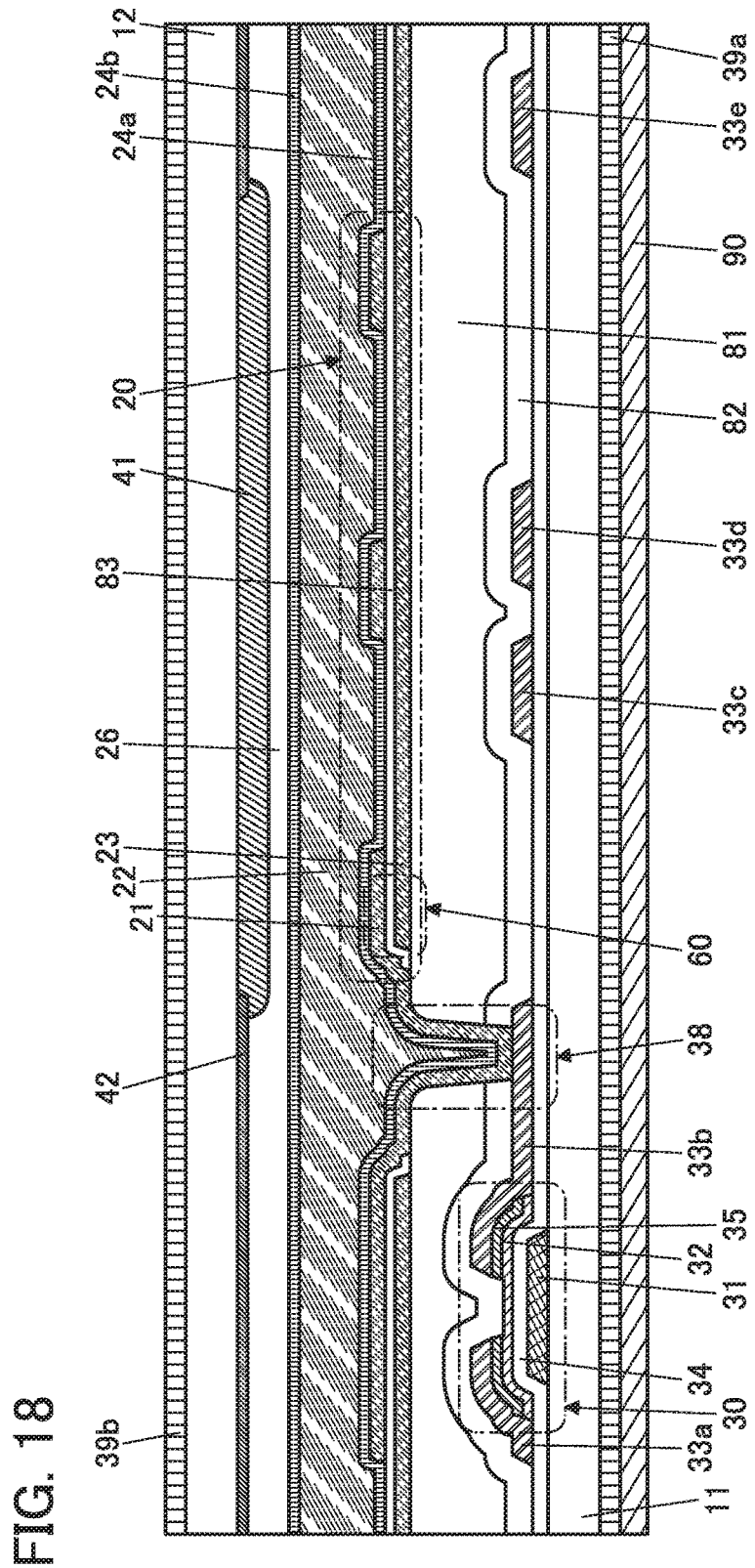
FIG. 18 illustrates a structure example of a display device.

FIG. 17 and FIG. 18 each are a schematic cross-sectional view of a display device including a liquid crystal element using an FFS mode. The cross-sectional structure example 1-3 can be referred to for Cross-sectional structure example 2-3 except the structure of the transistor 30.

The above is the description of Cross-sectional structure example 2.

[Structure Example 2 of Transistor]

Structure examples of a transistor different from the above transistors are described below.

Figure 19A:
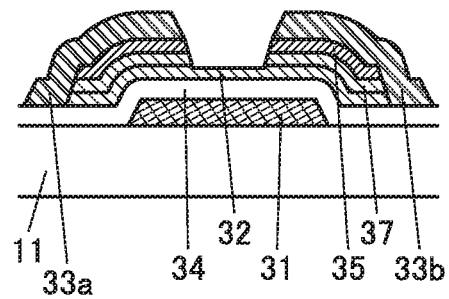
FIGS. 19A to 19F illustrate structure examples of a transistor.

A transistor illustrated in FIG. 19A includes a semiconductor layer 37 between the semiconductor layer 32 and the impurity semiconductor layer 35.

The semiconductor layer 37 may be formed using the same semiconductor film as the semiconductor layer 32. The semiconductor layer 37 can function as an etching stopper for preventing the semiconductor layer 32 from being removed at the time of etching of the impurity semiconductor layer 35. Although FIG. 19A illustrates an example where the semiconductor layer 37 is divided into a right portion and a left portion, part of the semiconductor layer 37 may cover a channel formation region of the semiconductor layer 32.

Furthermore, the semiconductor layer 37 may contain an impurity at a concentration lower than the impurity semiconductor layer 35. Thus, the semiconductor layer 37 can function as a lightly doped drain (LDD) region and can suppress hot-carrier degradation when the transistor is driven.

Figure 19B:
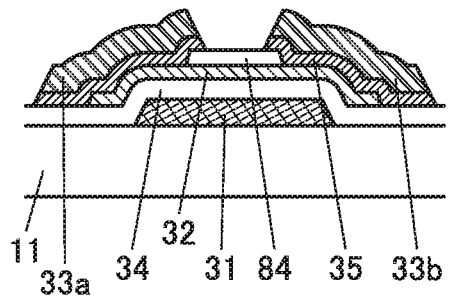

In a transistor illustrated in FIG. 19B, the insulating layer 84 is provided over a channel formation region of the semiconductor layer 32. The insulating layer 84 functions as an etching stopper at the time of etching of the impurity semiconductor layer 35.

Figure 19C:
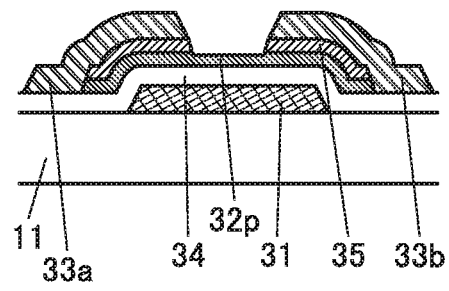

A transistor illustrated in FIG. 19C includes a semiconductor layer 32p instead of the semiconductor layer 32. The semiconductor layer 32p includes a semiconductor film having high crystallinity. For example, the semiconductor layer 32p includes a polycrystalline semiconductor or a single crystal semiconductor. Thus, a transistor having high field-effect mobility can be provided.

Figure 19D:
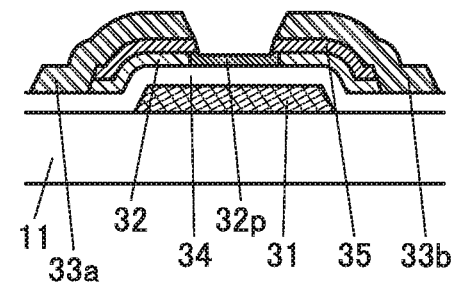

A transistor illustrated in FIG. 19D includes the semiconductor layer 32p in a channel formation region of the semiconductor layer 32. For example, the transistor illustrated in FIG. 19D can be formed by irradiating a semiconductor film to be the semiconductor layer 32 with laser light or the like so that crystallization is caused locally. Thus, a transistor having high field-effect mobility can be provided.

Figure 19E:
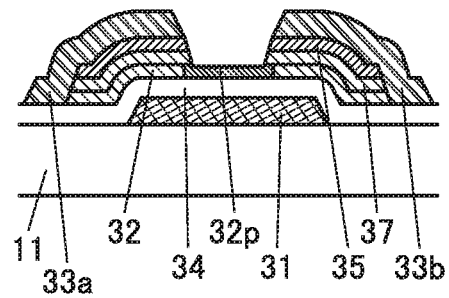

A transistor illustrated in FIG. 19E includes the semiconductor layer 32p having crystallinity in a channel formation region of the semiconductor layer 32 of the transistor illustrated in FIG. 19A.

Figure 19F:
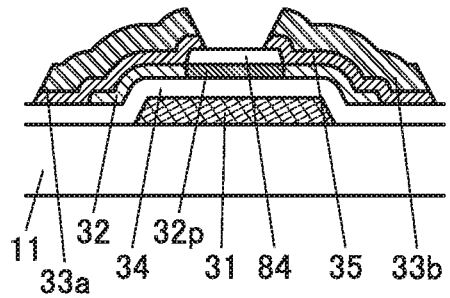

A transistor illustrated in FIG. 19F includes the semiconductor layer 32p having crystallinity in a channel formation region of the semiconductor layer 32 of the transistor illustrated in FIG. 19B.

The above is the description of Structure example 2 of transistor.

[Shape of Conductive Layer]

For a conductive film which can be used as a wiring such as a gate line or a source line, a low-resistance material such as metal or an alloy is preferably used because it can reduce the wiring resistance. In the case where a display device having a large screen is fabricated, increasing the width of a wiring is also effective. However, such a conductive film does not transmit visible light, and in a transmissive liquid crystal display device, the following problems occur in some cases: the width of a wiring itself is large; and the aperture ratio is decreased owing to an increase in the number of wirings.

The shape of an end portion of the conductive film is devised, whereby light from a backlight unit can be extracted efficiently.

Figure 20A:
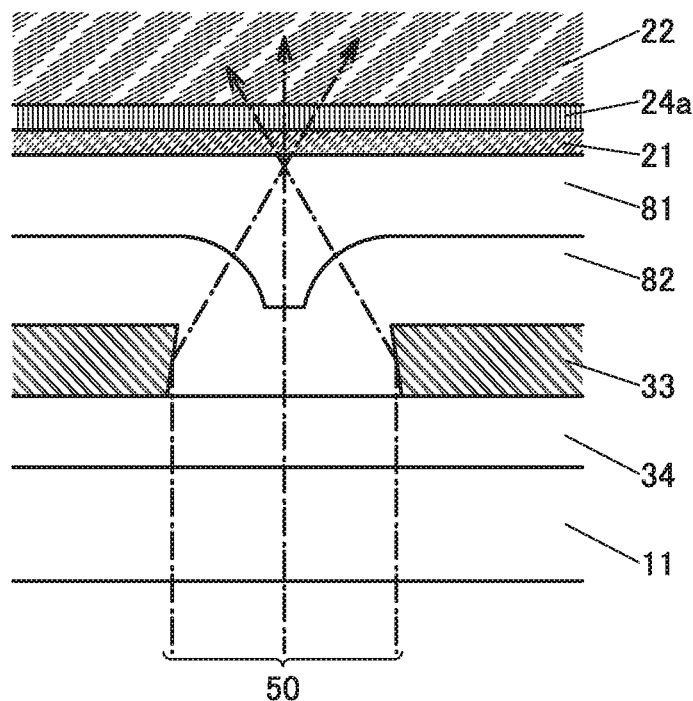
FIGS. 20A and 20B illustrate structure examples of a display device.

FIG. 20A is a cross-sectional view of the conductive layer 33 forming a source line or the like and the vicinity thereof. The conductive layer 33 has an inverse tapered end portion.

Here, a taper angle refers to an angle between a bottom surface (a surface in contact with a surface where a thin film is formed) and a side surface at an end portion of the thin film. The taper angle is greater than 0° and less than 180°. A taper with an angle less than 90° is referred to as a forward taper whereas a taper with an angle greater than 90° is referred to as an inverse taper.

As illustrated in FIG. 20A, when the conductive layer 33 has an inverse tapered shape, part of light 50 from the backlight unit is reflected by a side surface of the conductive layer 33 and reaches the liquid crystal 22. Consequently, the light extraction efficiency can be increased compared with the case where the conductive layer 33 has a perpendicular side surface or a tapered side surface.

Here, the taper angle of the conductive layer 33 is preferably greater than 90° and less than 135°, further preferably greater than or equal to 91° and less than or equal to 120°, still further preferably greater than or equal to 95° and less than or equal to 110°.

Figure 20B:
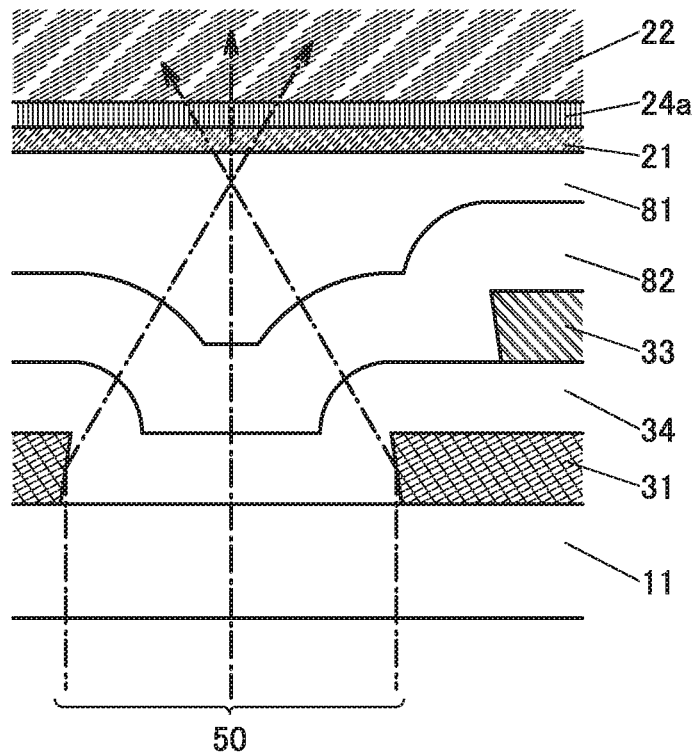

FIG. 20B illustrates an example where the conductive layer 31 forming a gate line or the like has an inverse tapered shape. When the conductive layer 31 has an inverse tapered shape as well as the conductive layer 33, the light extraction efficiency can be increased more efficiently.

The above is the description of the wiring shape.

[Components]

The above-described components are described below.

<Substrate>

A material having a flat surface can be used as the substrate included in the display panel. The substrate on the side from which light from the display element is extracted is formed using a material transmitting the light. For example, a material such as glass, quartz, ceramics, sapphire, or an organic resin can be used.

The weight and thickness of the display panel can be reduced by using a thin substrate. A flexible display panel can be obtained by using a substrate that is thin enough to have flexibility. Alternatively, glass or the like that is thin enough to have flexibility can be used as the substrate. Alternatively, a composite material where glass and a resin material are attached to each other with an adhesive layer may be used.

<Transistor>

The transistor includes a conductive layer functioning as a gate electrode, a semiconductor layer, a conductive layer functioning as a source electrode, a conductive layer functioning as a drain electrode, and an insulating layer functioning as a gate insulating layer.

Note that there is no particular limitation on the structure of the transistor included in the display device of one embodiment of the present invention. For example, a planar transistor, a staggered transistor, or an inverted staggered transistor can be used. A top-gate transistor or a bottom-gate transistor may also be used. Gate electrodes may be provided above and below a channel.

There is no particular limitation on the crystallinity of a semiconductor material used for the transistors, and an amorphous semiconductor or a semiconductor having crystallinity (a microcrystalline semiconductor, a polycrystalline semiconductor, a single crystal semiconductor, or a semiconductor partly including crystal regions) may be used. It is preferred that a semiconductor having crystallinity be used, in which case deterioration of the transistor characteristics can be suppressed.

As a semiconductor material used for the transistor, a metal oxide whose energy gap is greater than or equal to 2 eV, preferably greater than or equal to 2.5 eV, further preferably greater than or equal to 3 eV can be used. A typical example is a metal oxide containing indium, and a CAC-OS described later can be used, for example.

Because of a low off-state current of a transistor that contains a metal oxide having a larger band gap and a lower carrier density than silicon, charge stored in a capacitor connected in series with the transistor can be held for a long time.

The semiconductor layer can be, for example, a film represented by an In-M-Zn-based oxide that contains indium, zinc, and M (a metal such as aluminum, titanium, gallium, germanium, yttrium, zirconium, lanthanum, cerium, tin, neodymium, or hafnium).

In the case where the metal oxide contained in the semiconductor layer is an In-M-Zn-based oxide, the atomic ratio of metal elements of a sputtering target used for forming a film of the In-M-Zn oxide preferably satisfy In≥M and Zn≥M. The atomic ratio of the metal elements (In:M:Zn) in such a sputtering target is preferably 1:1:1, 1:1:1.2, 3:1:2, 4:2:3, 4:2:4.1, 5:1:6, 5:1:7, or 5:1:8, for example. Note that the atomic ratio of the metal elements in the formed semiconductor layer varies from the above atomic ratios of the metal elements of the sputtering targets in a range of ±40%.

The bottom-gate transistor described in this embodiment is preferable because the number of manufacturing steps can be reduced. When a metal oxide, which can be formed at a lower temperature than polycrystalline silicon, is used for the bottom-gate transistor, materials with low heat resistance can be used for a wiring, an electrode, or a substrate below the semiconductor layer; thus, the range of choices of materials can be widened. For example, an extremely large glass substrate can be favorably used.

A metal oxide film with low carrier density is used as the semiconductor layer. For example, the semiconductor layer is a metal oxide whose carrier density is lower than or equal to $1\times10^{17}/cm^3$, preferably lower than or equal to $1\times10^{15}/cm^3$, further preferably lower than or equal to $1\times10^{13}/cm^3$, still further preferably lower than or equal to $1\times10^{11}/cm^3$, even further preferably lower than $1\times10^{10}/cm^3$, and higher than or equal to $1\times10^{-9}/cm^3$. Such a metal oxide is referred to as a highly purified intrinsic or substantially highly purified intrinsic metal oxide. The metal oxide has a low impurity concentration and a low density of defect states and can thus be referred to as a metal oxide having stable characteristics.

Note that, without limitation to those described above, a material with an appropriate composition may be used depending on required semiconductor characteristics and electrical characteristics (e.g., field-effect mobility and threshold voltage) of a transistor. To obtain the required semiconductor characteristics of the transistor, it is preferable that the carrier density, the impurity concentration, the defect density, the atomic ratio between a metal element and oxygen, the interatomic distance, the density, and the like of the semiconductor layer be set to appropriate values.

When silicon or carbon that is one of elements belonging to Group 14 is contained in the metal oxide contained in the semiconductor layer, oxygen vacancies are increased in the semiconductor layer, and the semiconductor layer becomes n-type. Thus, the concentration of silicon or carbon (measured by secondary ion mass spectrometry) in the semiconductor layer is lower than or equal to $2\times10^{18}$ atoms/cm$^3$, preferably lower than or equal to $2\times10^{17}$ atoms/cm$^3$.

Alkali metal and alkaline earth metal might generate carriers when bonded to a metal oxide, in which case the off-state current of the transistor might be increased. Therefore, the concentration of alkali metal or alkaline earth metal of the semiconductor layer, which is measured by secondary ion mass spectrometry, is lower than or equal to $1\times10^{18}$ atoms/cm$^3$, preferably lower than or equal to $2\times10^{16}$ atoms/cm$^3$.

When nitrogen is contained in the metal oxide contained in the semiconductor layer, electrons functioning as carriers are generated and the carrier density increases, so that the semiconductor layer easily becomes n-type. Thus, a transistor including a metal oxide which contains nitrogen is likely to be normally on. Hence, the concentration of nitrogen in the semiconductor layer which is measured by secondary ion mass spectrometry is preferably lower than or equal to $5\times10^{18}$ atoms/cm$^3$.

An oxide semiconductor is classified into a single crystal oxide semiconductor and a non-single-crystal oxide semiconductor. Examples of a non-single-crystal oxide semiconductor include a c-axis-aligned crystalline oxide semiconductor (CAAC-OS), a polycrystalline oxide semiconductor, a nanocrystalline oxide semiconductor (nc-OS), an amorphous-like oxide semiconductor (a-like OS), and an amorphous oxide semiconductor.

For the semiconductor layer of the transistor disclosed in one embodiment of the present invention, a cloud-aligned composite oxide semiconductor (CAC-OS) may be used.

Note that the above-described non-single-crystal oxide semiconductor or CAC-OS can be suitably used for the semiconductor layer of the transistor disclosed in one embodiment of the present invention. As the non-single-crystal oxide semiconductor, the nc-OS or the CAAC-OS can be suitably used.

In one embodiment of the present invention, the CAC-OS is preferably used for the semiconductor layer of the transistor. With the use of the CAC-OS, the transistor can have excellent electrical characteristics or high reliability.

The semiconductor layer may be a mixed film including two or more of the following: a region of a CAAC-OS, a region of a polycrystalline oxide semiconductor, a region of an nc-OS, a region of an amorphous-like oxide semiconductor, and a region of an amorphous oxide semiconductor. The mixed film has, for example, a single-layer structure or a stacked-layer structure including two or more of the above-described regions in some cases.

<Composition of CAC-OS>

Described below is the composition of a cloud-aligned composite oxide semiconductor (CAC-OS) applicable to a transistor disclosed in one embodiment of the present invention.

The CAC-OS has, for example, a composition in which elements included in a metal oxide are unevenly distributed. Materials including unevenly distributed elements each have a size of greater than or equal to 0.5 nm and less than or equal to 10 nm, preferably greater than or equal to 1 nm and less than or equal to 2 nm, or a similar size. Note that in the following description of a metal oxide, a state in which one or more metal elements are unevenly distributed and regions including the metal element(s) are mixed is referred to as a mosaic pattern or a patch-like pattern. The region has a size of greater than or equal to 0.5 nm and less than or equal to 10 nm, preferably greater than or equal to 1 nm and less than or equal to 2 nm, or a similar size.

Note that a metal oxide preferably contains at least indium. In particular, indium and zinc are preferably contained. In addition, one or more of aluminum, gallium, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like may be contained.

For example, of the CAC-OS, an In—Ga—Zn oxide with the CAC composition (such an In—Ga—Zn oxide may be particularly referred to as CAC-IGZO) has a composition in which materials are separated into indium oxide (InO$_{X1}$, where X1 is a real number greater than 0) or indium zinc oxide (In$_{X2}$Zn$_{Y2}$O$_{Z2}$, where X2, Y2, and Z2 are real numbers greater than 0), and gallium oxide (GaO$_{X3}$, where X3 is a real number greater than 0) or gallium zinc oxide (Ga$_{X4}$Zn$_{Y4}$O$_{Z4}$, where X4, Y4, and Z4 are real numbers greater than 0), and a mosaic pattern is formed. Then, InO$_{X1}$ or In$_{X2}$Zn$_{Y2}$O$_{Z2}$ forming the mosaic pattern is evenly distributed in the film. This composition is also referred to as a cloud-like composition.

That is, the CAC-OS is a composite metal oxide with a composition in which a region including GaO$_{X3}$ as a main component and a region including In$_{X2}$Zn$_{Y2}$O$_{Z2}$ or InO$_{X1}$ as a main component are mixed. Note that in this specification, for example, when the atomic ratio of In to an element M in a first region is greater than the atomic ratio of In to an element M in a second region, the first region has higher In concentration than the second region.

Note that a compound including In, Ga, Zn, and O is also known as IGZO. Typical examples of IGZO include a crystalline compound represented by $InGaO_3(ZnO)_{m1}$ (m1 is a natural number) and a crystalline compound represented by $In_{(1+x0)}Ga_{(1-x0)}O_3(ZnO)_{m0}$ ($-1 \leq x0 \leq 1$; m0 is a given number).

The above crystalline compounds have a single crystal structure, a polycrystalline structure, or a CAAC structure. Note that the CAAC structure is a crystal structure in which a plurality of IGZO nanocrystals have c-axis alignment and are connected in the a-b plane direction without alignment.

On the other hand, the CAC-OS relates to the material composition of a metal oxide. In a material composition of a CAC-OS including In, Ga, Zn, and O, nanoparticle regions including Ga as a main component are observed in part of the CAC-OS and nanoparticle regions including In as a main component are observed in part thereof. These nanoparticle regions are randomly dispersed to form a mosaic pattern. Therefore, the crystal structure is a secondary element for the CAC-OS.

Note that in the CAC-OS, a stacked-layer structure including two or more films with different atomic ratios is not included. For example, a two-layer structure of a film including In as a main component and a film including Ga as a main component is not included.

A boundary between the region including $GaO_{X3}$ as a main component and the region including $In_{X2}Zn_{Y2}O_{Z2}$ or $InO_{X1}$ as a main component is not clearly observed in some cases.

In the case where one or more of aluminum, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like are contained instead of gallium in a CAC-OS, nanoparticle regions including the selected metal element(s) as a main component(s) are observed in part of the CAC-OS and nanoparticle regions including In as a main component are observed in part thereof, and these nanoparticle regions are randomly dispersed to form a mosaic pattern in the CAC-OS.

The CAC-OS can be formed by a sputtering method under conditions where a substrate is not intentionally heated, for example. In the case of forming the CAC-OS by a sputtering method, one or more selected from an inert gas (typically, argon), an oxygen gas, and a nitrogen gas may be used as a deposition gas. The ratio of the flow rate of an oxygen gas to the total flow rate of the deposition gas at the time of deposition is preferably as low as possible, and for example, the flow ratio of an oxygen gas is preferably higher than or equal to 0% and less than 30%, further preferably higher than or equal to 0% and less than or equal to 10%.

The CAC-OS is characterized in that no clear peak is observed in measurement using $\theta/2\theta$ scan by an out-of-plane method, which is an X-ray diffraction (XRD) measurement method. That is, X-ray diffraction shows no alignment in the a-b plane direction and the c-axis direction in a measured region.

In an electron diffraction pattern of the CAC-OS which is obtained by irradiation with an electron beam with a probe diameter of 1 nm (also referred to as a nanometer-sized electron beam), a ring-like region with high luminance and a plurality of bright spots in the ring-like region are observed. Therefore, the electron diffraction pattern indicates that the crystal structure of the CAC-OS includes a nanocrystal (nc) structure with no alignment in plan-view and cross-sectional directions.

For example, an energy dispersive X-ray spectroscopy (EDX) mapping image confirms that an In—Ga—Zn oxide with the CAC composition has a structure in which a region including $GaO_{X3}$ as a main component and a region including $In_{X2}Zn_{Y2}O_{Z2}$ or $InO_{X1}$ as a main component are unevenly distributed and mixed.

The CAC-OS has a structure different from that of an IGZO compound in which metal elements are evenly distributed, and has characteristics different from those of the IGZO compound. That is, in the CAC-OS, regions including $GaO_{X3}$ or the like as a main component and regions including $In_{X2}Zn_{Y2}O_{Z2}$ or $InO_{X1}$ as a main component are separated to form a mosaic pattern.

The conductivity of a region including $In_{X2}Zn_{Y2}O_{Z2}$ or $InO_{X1}$ as a main component is higher than that of a region including $GaO_{X3}$ or the like as a main component. In other words, when carriers flow through regions including $In_{X2}Zn_{Y2}O_{Z2}$ or $InO_{X1}$ as a main component, the conductivity of a metal oxide is exhibited. Accordingly, when regions including $In_{X2}Zn_{Y2}O_{Z2}$ or $InO_{X1}$ as a main component are distributed in a metal oxide like a cloud, high field-effect mobility ($\mu$) can be achieved.

By contrast, the insulating property of a region including $GaO_{X3}$ or the like as a main component is higher than that of a region including $In_{X2}Zn_{Y2}O_{Z2}$ or $InO_{X1}$ as a main component. In other words, when regions including $GaO_{X3}$ or the like as a main component are distributed in a metal oxide, leakage current can be suppressed and favorable switching operation can be achieved.

Accordingly, when a CAC-OS is used for a semiconductor element, the insulating property derived from $GaO_{X3}$ or the like and the conductivity derived from $In_{X2}Zn_{Y2}O_{Z2}$ or $InO_{X1}$ complement each other, whereby a high on-state current ($I_{on}$) and high field-effect mobility ($\mu$) can be achieved.

A semiconductor element including a CAC-OS has high reliability. Thus, the CAC-OS is suitably used in a variety of semiconductor devices typified by a display.

Since a transistor including a CAC-OS in a semiconductor layer has high field-effect mobility and high driving capability, the use of the transistor in a driver circuit (typically, a scan line driver circuit that generates a gate signal) allows a display device to have a narrow bezel. Moreover, the use of the transistor in a signal line driver circuit that is included in a display device (particularly in a demultiplexer connected to an output terminal of a shift register included in the signal line driver circuit) can reduce the number of wirings connected to the display device.

The transistor including a CAC-OS in the semiconductor layer does not need a laser crystallization step necessary for a transistor including low-temperature polysilicon. Thus, the manufacturing cost of a display device can be reduced even when the display device is formed using a large substrate. In addition, it is preferable to use the transistor including a CAC-OS in the semiconductor layer for a driver circuit and a display portion in a large display device having high resolution such as ultra-high definition ("4K resolution," "4K2K," and "4K") or super high definition ("8K resolution," "8K4K," and "8K"), in which case writing can be performed in a short time and display defects can be reduced.

Alternatively, silicon can be used as a semiconductor in which a channel of the transistor is formed, for example. In particular, when amorphous silicon is used as silicon, a transistor can be formed over a large substrate with a high yield. When amorphous silicon is used, hydrogenated amorphous silicon (denoted by a-Si:H in some cases) in which dangling bonds are terminated by hydrogen is preferably used.

Furthermore, silicon having crystallinity such as microcrystalline silicon, polycrystalline silicon, or single-crystal silicon can be used. In particular, polycrystalline silicon can be formed at a lower temperature than single-crystal silicon and has higher field-effect mobility and higher reliability than amorphous silicon.

When silicon is used, an impurity semiconductor layer to which an impurity element imparting one conductivity type is added is preferably provided between a semiconductor layer and a source electrode or a drain electrode. In the case where the transistor is an n-channel transistor, for example, silicon to which P or As is added is given as a semiconductor to which an impurity element imparting one conductivity type is added. In the case where the transistor is a p-channel transistor, for example, it is possible to add B as the impurity element imparting one conductivity type; however, it is preferable to use an n-channel transistor. Note that the impurity semiconductor layer may be formed using an amorphous semiconductor or a crystalline semiconductor such as a microcrystalline semiconductor.

The bottom-gate transistor described in this embodiment is preferable because the number of manufacturing steps can be reduced. When amorphous silicon, which can be formed at a lower temperature than polycrystalline silicon, is used for the semiconductor layer, materials with low heat resistance can be used for a wiring, an electrode, or a substrate below the semiconductor layer, resulting in wider choice of materials. For example, an extremely large glass substrate can be favorably used. Meanwhile, the top-gate transistor is preferable because an impurity region is easily formed in a self-aligned manner and variation in characteristics can be reduced. In some cases, the top-gate transistor is particularly preferable when polycrystalline silicon, single-crystal silicon, or the like is employed.

<Conductive Layer>

As materials for the gates, the source, and the drain of a transistor, and the conductive layers functioning as the wirings and electrodes included in the display device, any of metals such as aluminum, titanium, chromium, nickel, copper, yttrium, zirconium, molybdenum, silver, tantalum, and tungsten, or an alloy containing any of these metals as its main component can be used. A single-layer structure or a stacked-layer structure including a film containing any of these materials can be used. For example, the following structures can be given: a single-layer structure of an aluminum film containing silicon, a two-layer structure in which an aluminum film is stacked over a titanium film, a two-layer structure in which an aluminum film is stacked over a tungsten film, a two-layer structure in which a copper film is stacked over a copper-magnesium-aluminum alloy film, a two-layer structure in which a copper film is stacked over a titanium film, a two-layer structure in which a copper film is stacked over a tungsten film, a three-layer structure in which a titanium film or a titanium nitride film, an aluminum film or a copper film, and a titanium film or a titanium nitride film are stacked in this order, and a three-layer structure in which a molybdenum film or a molybdenum nitride film, an aluminum film or a copper film, and a molybdenum film or a molybdenum nitride film are stacked in this order. Note that an oxide such as indium oxide, tin oxide, or zinc oxide may be used. Copper containing manganese is preferably used because it increases controllability of a shape by etching.

As a light-transmitting conductive material that can be used for the gate, source, and drain of the transistor and the conductive layers such as the wirings and electrodes included in the display device, a conductive oxide such as indium oxide, an indium tin oxide, an indium zinc oxide, zinc oxide, or zinc oxide to which gallium is added or graphene can be used. Alternatively, a metal material such as gold, silver, platinum, magnesium, nickel, tungsten, chromium, molybdenum, iron, cobalt, copper, palladium, or titanium, or an alloy material containing the metal material can be used. Further alternatively, a nitride of the metal material (e.g., titanium nitride) or the like may be used. In the case of using the metal material or the alloy material (or the nitride thereof), the thickness is set small enough to be able to transmit light. A stacked film of any of the above materials can be used for the conductive layers. For example, a stacked film of an indium tin oxide and an alloy of silver and magnesium is preferably used because it can increase the conductivity. They can also be used for conductive layers such as wirings and electrodes included in the display device, and conductive layers (e.g., a conductive layer functioning as a pixel electrode or a common electrode) included in a display element.

An oxide semiconductor (oxide conductor: OC) whose resistance is lowered by adding an impurity element, for example, is preferably used as the light-transmitting conductive material.

<Insulating Layer>

Examples of an insulating material that can be used for the insulating layers include a resin such as acrylic or epoxy resin, a resin having a siloxane bond, and an inorganic insulating material such as silicon oxide, silicon oxynitride, silicon nitride oxide, silicon nitride, or aluminum oxide.

Examples of the insulating film with low water permeability include a film containing nitrogen and silicon (e.g., a silicon nitride film and a silicon nitride oxide film) and a film containing nitrogen and aluminum (e.g., an aluminum nitride film). Alternatively, a silicon oxide film, a silicon oxynitride film, an aluminum oxide film, or the like may be used.

<Liquid Crystal Element>

The liquid crystal element can employ, for example, a vertical alignment (VA) mode. Examples of the vertical alignment mode include a multi-domain vertical alignment (MVA) mode, a patterned vertical alignment (PVA) mode, and an advanced super view (ASV) mode.

The liquid crystal element can employ a variety of modes; for example, other than the VA mode, a twisted nematic (TN) mode, an in-plane switching (IPS) mode, a fringe field switching (FFS) mode, an axially symmetric aligned microcell (ASM) mode, an optically compensated birefringence (OCB) mode, a ferroelectric liquid crystal (FLC) mode, an antiferroelectric liquid crystal (AFLC) mode, an electrically controlled birefringence (ECB) mode, or a guest-host mode can be used.

The liquid crystal element controls the transmission or non-transmission of light utilizing an optical modulation action of a liquid crystal. Note that the optical modulation action of the liquid crystal is controlled by an electric field applied to the liquid crystal (including a horizontal electric field, a vertical electric field, or an oblique electric field). As the liquid crystal used for the liquid crystal element, a thermotropic liquid crystal, a low-molecular liquid crystal, a high-molecular liquid crystal, a polymer dispersed liquid crystal (PDLC), a polymer network liquid crystal (PNLC), a ferroelectric liquid crystal, an anti-ferroelectric liquid crystal, or the like can be used. These liquid crystal materials exhibit a cholesteric phase, a smectic phase, a cubic phase, a chiral nematic phase, an isotropic phase, or the like depending on conditions.

As the liquid crystal material, either a positive liquid crystal or a negative liquid crystal may be used, and an appropriate liquid crystal material can be used depending on the mode or design to be used.

An alignment film can be provided to adjust the alignment of a liquid crystal. In the case where a horizontal electric field mode is employed, a liquid crystal exhibiting a blue phase for which an alignment film is unnecessary may be used. The blue phase is a liquid crystal phase, which is generated just before a cholesteric phase changes into an isotropic phase when the temperature of a cholesteric liquid crystal is increased. Since the blue phase appears only in a narrow temperature range, a liquid crystal composition in which a chiral material is mixed to account for several weight percent or more is used for the liquid crystal layer in order to improve the temperature range. The liquid crystal composition containing a liquid crystal exhibiting a blue phase and a chiral material has a short response time and optical isotropy, which eliminates the need for an alignment process and reduces the viewing angle dependence. Since the alignment film does not need to be provided, rubbing treatment is not necessary; accordingly, electrostatic discharge damage caused by the rubbing treatment can be prevented, reducing defects and damage of a liquid crystal display device in the manufacturing process.

Examples of the liquid crystal element include a transmissive liquid crystal element, a reflective liquid crystal element, and a semi-transmissive liquid crystal element.

In one embodiment of the present invention, a transmissive liquid crystal element is particularly suitable.

In the case where a transmissive or semi-transmissive liquid crystal element is used, two polarizing plates are provided such that a pair of substrates are sandwiched therebetween. Furthermore, a backlight is provided on the outer side of the polarizing plate. The backlight may be a direct-below backlight or an edge-light backlight. The direct-below backlight including a light-emitting diode (LED) is preferably used because local dimming is easily performed to improve contrast. The edge-light backlight is preferably used because the thickness of a module including the backlight can be reduced.

When the edge-light backlight is turned off, one embodiment of the present invention can be used as a see-through display.

<Coloring Layer>

Examples of a material that can be used for the coloring layers include a metal material, a resin material, and a resin material containing a pigment or dye.

<Light-blocking Layer>

Examples of a material that can be used for the light-blocking layer include carbon black, titanium black, a metal, a metal oxide, and a composite oxide containing a solid solution of a plurality of metal oxides. The light-blocking layer may be a film containing a resin material or a thin film of an inorganic material such as a metal. Stacked films containing the material of the coloring layer can also be used for the light-blocking layer. For example, a stacked-layer structure including a film containing a material of a coloring layer which transmits light of a certain color and a film containing a material of a coloring layer which transmits light of another color can be employed. It is preferable that the coloring layer and the light-blocking layer be formed using the same material because the same manufacturing apparatus can be used and the process can be simplified.

The above is the descriptions of Components.

At least part of any of the structure examples, the manufacturing method examples, the drawings corresponding thereto, and the like described in this embodiment can be implemented in combination with any of the other structure examples, the other manufacturing method examples, the other drawings corresponding thereto, and the like as appropriate.

At least part of this embodiment can be implemented in combination with any of the other embodiments described in this specification as appropriate.

(Embodiment 2)

In this embodiment, examples of a method of crystallization for polycrystalline silicon which can be used for a semiconductor layer of a transistor and a laser crystallization apparatus are described.

To form polycrystalline silicon layers having favorable crystallinity, it is preferable that an amorphous silicon layer be provided over a substrate and crystallized by laser irradiation. For example, the substrate is moved while the amorphous silicon layer is irradiated with a linear beam, so that polycrystalline silicon layers can be formed in desired regions over the substrate.

The throughput of a method using a linear beam is relatively preferable. On the other hand, the method tends to produce variations in crystallinity owing to a change in the output of laser light and a change in the beam profile caused by the output change because laser light is moved relative to a region and is emitted to the region a plurality of times. For example, when a semiconductor layer crystallized by the above method is used for a transistor included in a pixel of a display device, a random stripe pattern due to the variation in the crystallinity is seen in some cases at the time of displaying an image.

The length of the linear beam is ideally greater than or equal to the length of a side of the substrate; however, the length of the linear beam is limited by an output of a laser oscillator and the structure of an optical system. Thus, it is practical to irradiate a large substrate with the laser light by turning back the laser light in a substrate plane. Consequently, there is a region irradiated with the laser light a plurality of times. Since the crystallinity of such a region is likely to be different from that of the other region, display unevenness is sometimes caused in the region.

To avoid such a problem, an amorphous silicon layer formed over a substrate may be crystallized by local laser irradiation. Local laser irradiation easily forms polycrystalline silicon layers with small variation in crystallinity.

Figure 21A:
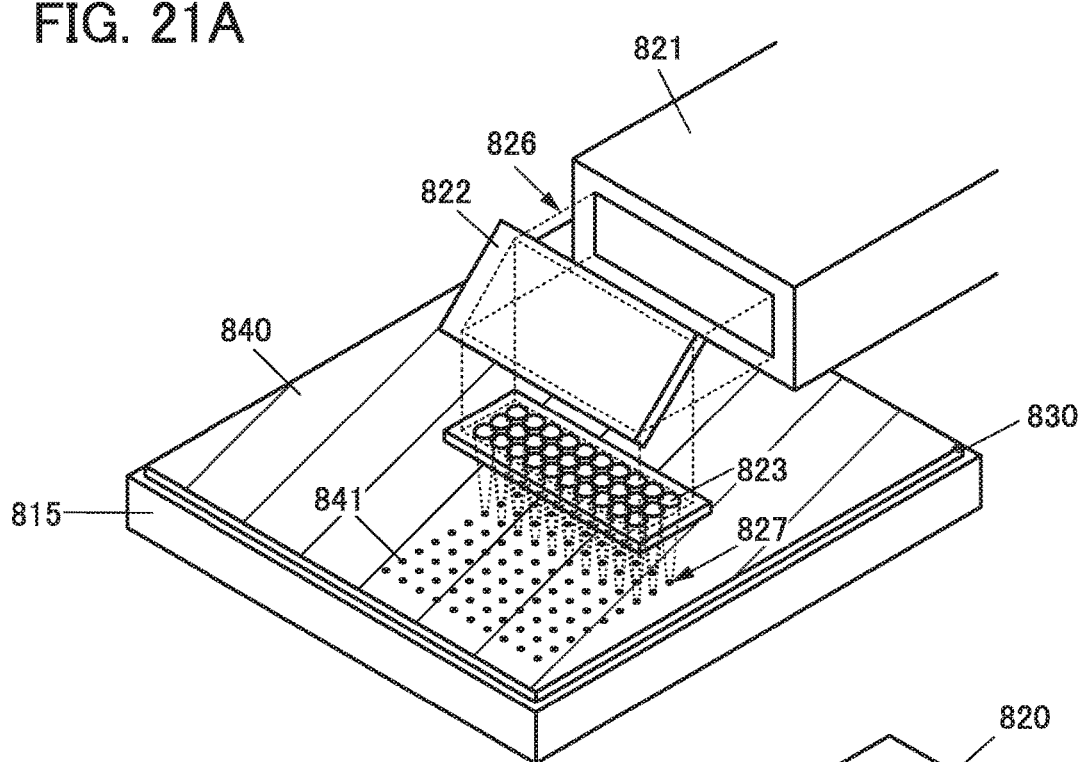
FIGS. 21A and 21B illustrate a laser irradiation method and a laser crystallization apparatus.

FIG. 21A illustrates a method of locally irradiating an amorphous silicon layer formed over a substrate with laser light.

Laser light 826 emitted from an optical system unit 821 is reflected by a mirror 822 and enters a microlens array 823. The microlens array 823 collects the laser light 826 to form a plurality of laser beams 827.

A substrate 830 over which an amorphous silicon layer 840 is formed is fixed to a stage 815. The amorphous silicon layer 840 is irradiated with the plurality of laser beams 827, so that a plurality of polycrystalline silicon layers 841 can be formed at the same time.

Microlenses of the microlens array 823 are preferably provided with a pixel pitch of a display device. Alternatively, they may be provided at intervals of an integral multiple of the pixel pitch. In either of the cases, polycrystalline silicon layers can be formed in regions corresponding to all pixels by repeating laser irradiation and movement of the stage 815 in the X direction or the Y direction.

For example, when the microlens array 823 includes M rows and N columns (M and N are natural numbers) of microlenses arranged with a pixel pitch, laser irradiation is performed at a predetermined start position first, so that M rows and N columns of polycrystalline silicon layers 841 can be formed. Then, the stage 815 is moved by N columns in the row direction and laser irradiation is performed, so that M rows and N columns of polycrystalline silicon layers 841 can be further formed. Consequently, M rows and 2N columns of polycrystalline silicon layers 841 can be obtained. By repeating the steps, a plurality of polycrystalline silicon layers 841 can be formed in desired regions. In the case where laser irradiation is performed by turning back the laser light, the following steps are repeated: the stage 815 is moved by N columns in the row direction; laser irradiation is performed; the stage 815 is moved by M rows in the column direction: and laser irradiation is performed.

Note that even when a method of performing laser irradiation while the stage 815 is moved in one direction is employed, polycrystalline silicon layers can be formed with a pixel pitch by adjusting the oscillation frequency of the laser light and the moving speed of the stage 815 properly.

The size of the laser beam 827 can be an area in which the whole semiconductor layer of a transistor is included, for example. Alternatively, the size can be an area in which the whole channel region of a transistor is included. Further alternatively, the size can be an area in which part of a channel region of a transistor is included. The size can be selected from them depending on required electrical characteristics of a transistor.

Note that in the case of a display device including a plurality of transistors in a pixel, the size of the laser beam 827 can be an area in which the whole semiconductor layer of each transistor in a pixel is included. Alternatively, the size of the laser beam 827 may be an area in which the whole semiconductor layers of transistors in a plurality of pixels are included.

Figure 22A:
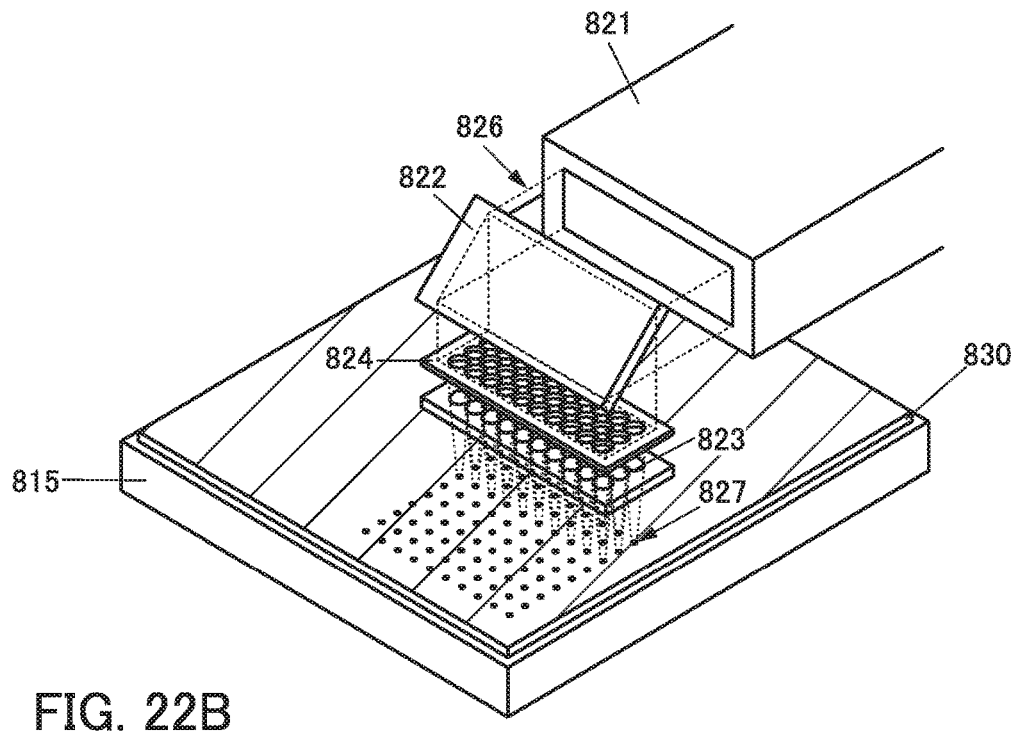
FIGS. 22A and 22B illustrate a laser irradiation method.
Figure 22B:
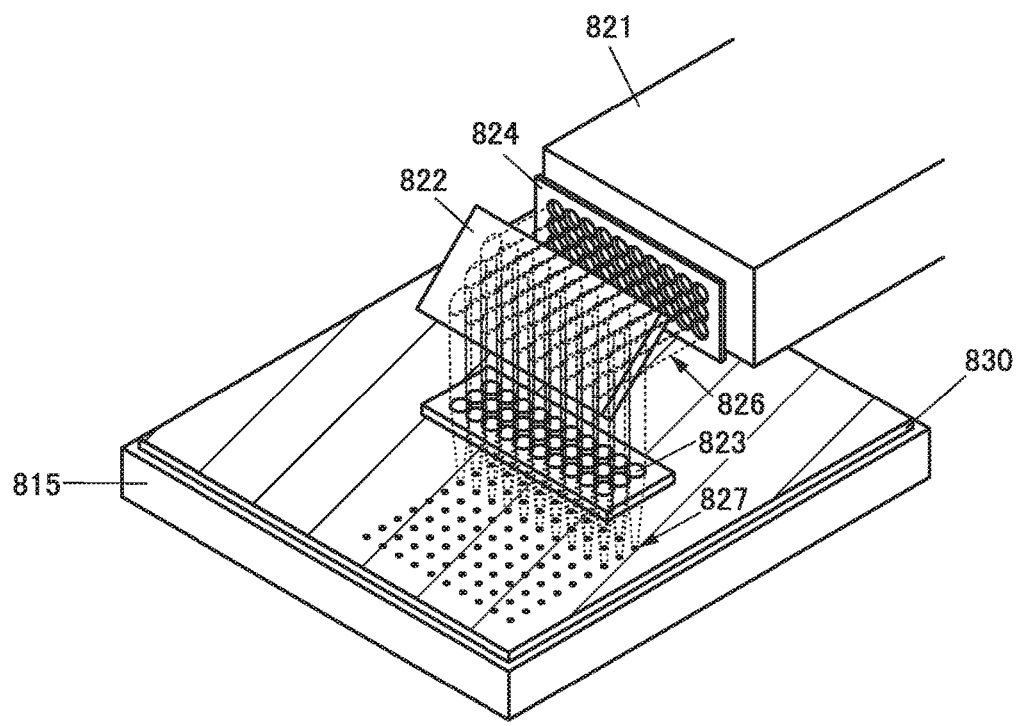

As illustrated in FIG. 22A, a mask 824 may be provided between the mirror 822 and the microlens array 823. The mask 824 includes a plurality of openings corresponding to respective microlenses. The shape of the opening can be reflected by the shape of the laser beam 827; as illustrated in FIG. 22A, the laser beam 827 having a circular shape can be obtained in the case where the mask 824 includes circular openings. The laser beam 827 having a rectangular shape can be obtained in the case where the mask 824 includes rectangular openings. The mask 824 is effective in the case where only a channel region of a transistor is crystallized, for example. Note that the mask 824 may be provided between the optical system unit 821 and the mirror 822 as illustrated in FIG. 22B.

Figure 21B:
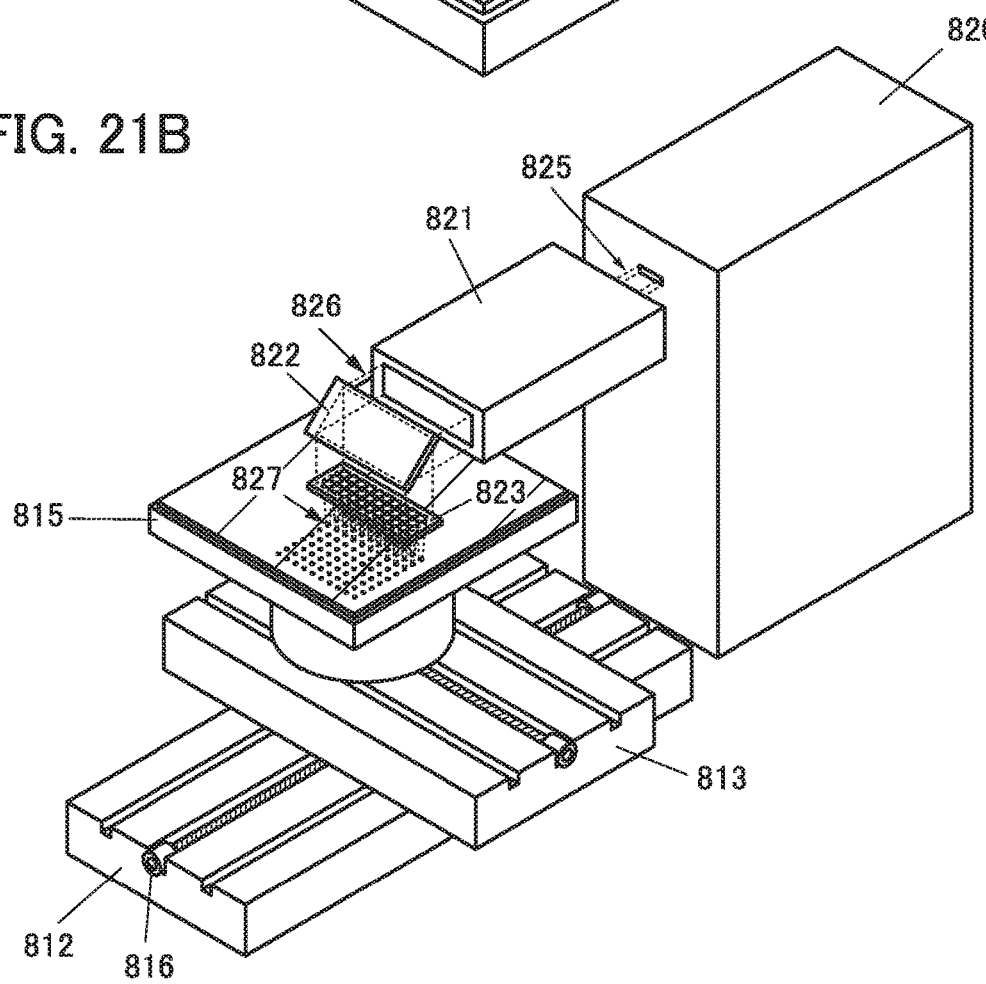

FIG. 21B is a perspective view illustrating a main structure of a laser crystallization apparatus which can be used in the above local laser irradiation step. The laser crystallization apparatus includes a moving mechanism 812, a moving mechanism 813, and the stage 815 which are components of an XY stage. The crystallization apparatus further includes a laser oscillator 820, the optical system unit 821, the mirror 822, and the microlens array 823 to shape the laser beam 827.

The moving mechanism 812 and the moving mechanism 813 each have a function of performing reciprocating linear motion in the horizontal direction. As a mechanism for powering the moving mechanism 812 and the moving mechanism 813, a ball screw mechanism 816 driven by a motor can be used, for example. The moving directions of the moving mechanism 812 and the moving mechanism 813 cross orthogonally; thus, the stage 815 fixed to the moving mechanism 813 can be moved in the X direction and in the Y direction freely.

The stage 815 includes a fixing mechanism such as a vacuum suction mechanism and can fix the substrate 830 or the like. Furthermore, the stage 815 may include a heating mechanism as needed. Although not illustrated, the stage 815 may include a pusher pin and a vertical moving mechanism thereof, and the substrate 830 or the like can be moved up and down when being transferred.

The laser oscillator 820 is preferably a pulsed laser, but may be a CW laser as long as it outputs light with a wavelength and intensity suitable for the purpose of processing. Typically, an excimer laser that emits ultraviolet light with a wavelength of 351 nm to 353 nm (XeF), a wavelength of 308 nm (XeCl), or the like can be used. Alternatively, a second harmonic wavelength (515 nm, 532 nm, or the like) or a third harmonic wavelength (343 nm, 355 nm, or the like) of a solid-state laser such as a YAG laser or a fiber laser may be used. A plurality of laser oscillators 820 may be provided.

The optical system unit 821 includes a mirror, a beam expander, a beam homogenizer, or the like, for example, and can homogenize and expand the energy in-plane distribution of laser light 825 emitted from the laser oscillator 820.

As the mirror 822, a dielectric multilayer mirror can be used, for example, and is provided so that the incident angle of the laser light is substantially 45°. The microlens array 823 can have a shape such that a plurality of convex lenses are provided on the top surface or on the top and bottom surfaces of a quartz board, for example.

With the above-described laser crystallization apparatus, polycrystalline silicon layers with small variation in crystallinity can be formed.

At least part of this embodiment can be implemented in combination with any of the other embodiments described in this specification as appropriate.

(Embodiment 3)

In this embodiment, electronic devices of embodiments of the present invention are described with reference to the drawing.

Each of electronic devices described below is provided with a display device of one embodiment of the present invention in a display portion. Thus, the electronic devices achieve high resolution. In addition, the electronic devices can achieve both high resolution and a large screen.

The display portion of the electronic device of one embodiment of the present invention can display, for example, an image with a resolution of full high definition, 4K2K, 8K4K, 16K8K, or more. As a screen size of the display portion, the diagonal size can be greater than or equal to 20 inches, greater than or equal to 30 inches, greater than or equal to 50 inches, greater than or equal to 60 inches, or greater than or equal to 70 inches.

Examples of electronic devices include electronic devices with a relatively large screen, such as a television device, a desktop or laptop personal computer, a monitor of a computer or the like, a digital signage, and a large game machine (e.g., a pachinko machine); a camera such as a digital camera or a digital video camera; a digital photo frame; a mobile phone; a portable game console; a portable information terminal; and an audio reproducing device.

The electronic device or a lighting device of one embodiment of the present invention can be incorporated along a curved inside/outside wall surface of a house or a building or a curved interior/exterior surface of a car.

The electronic device of one embodiment of the present invention may include an antenna. When a signal is received by the antenna, the electronic device can display an image, data, or the like on a display portion. When the electronic device includes the antenna and a secondary battery, the antenna may be used for contactless power transmission.

The electronic device of one embodiment of the present invention may include a sensor (a sensor having a function of measuring force, displacement, position, speed, acceleration, angular velocity, rotational frequency, distance, light, liquid, magnetism, temperature, chemical substance, sound, time, hardness, electric field, electric current, voltage, electric power, radiation, flow rate, humidity, gradient, oscillation, odor, or infrared rays).

The electronic device of one embodiment of the present invention can have a variety of functions such as a function of displaying a variety of information (e.g., a still image, a moving image, and a text image) on the display portion, a touch panel function, a function of displaying a calendar, date, time, and the like, a function of executing a variety of software (programs), a wireless communication function, and a function of reading out a program or data stored in a recording medium.

Figure 23A:
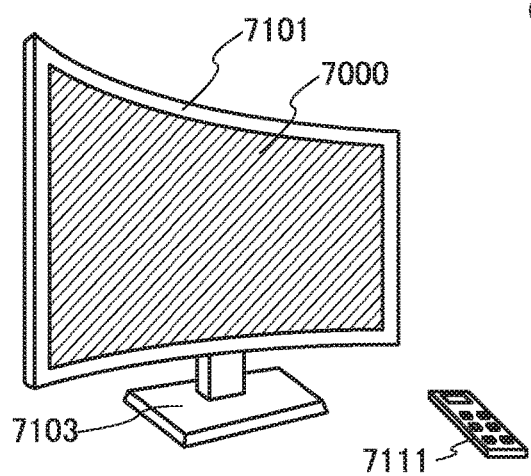
FIGS. 23A to 23D illustrate structure examples of electronic devices.

FIG. 23A illustrates an example of a television device. In a television device 7100, a display portion 7000 is incorporated in a housing 7101. Here, the housing 7101 is supported by a stand 7103.

The display device of one embodiment of the present invention can be used in the display portion 7000.

The television device 7100 illustrated in FIG. 23A can be operated with an operation switch provided in the housing 7101 or a separate remote controller 7111. Furthermore, the display portion 7000 may include a touch sensor. The television device 7100 can be operated by touching the display portion 7000 with a finger or the like. Furthermore, the remote controller 7111 may be provided with a display portion for displaying data outputted from the remote controller 7111. With operation keys or a touch panel of the remote controller 7111, channels and volume can be controlled and images displayed on the display portion 7000 can be controlled.

Note that the television device 7100 is provided with a receiver, a modem, and the like. With use of the receiver, general television broadcasting can be received. When the television device is connected to a communication network with or without wires via the modem, one-way (from a transmitter to a receiver) or two-way (between a transmitter and a receiver or between receivers) data communication can be performed.

Figure 23B:
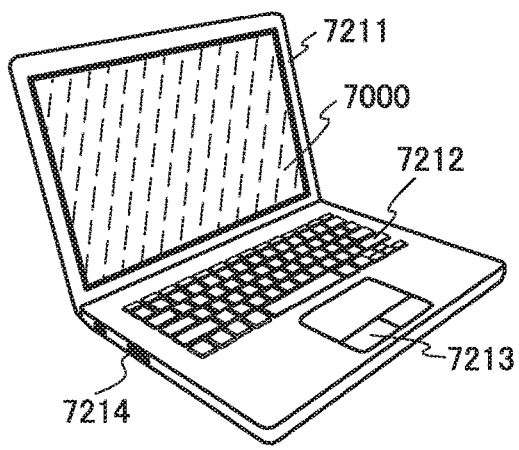

FIG. 23B illustrates a laptop personal computer 7200. The laptop personal computer 7200 includes a housing 7211, a keyboard 7212, a pointing device 7213, an external connection port 7214, and the like. In the housing 7211, the display portion 7000 is incorporated.

The display device of one embodiment of the present invention can be used in the display portion 7000.

Figure 23C:
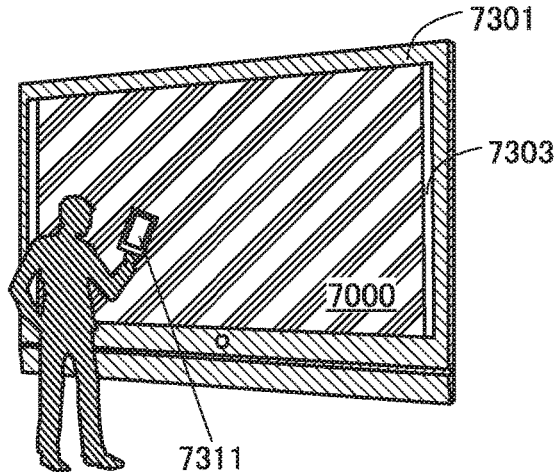
Figure 23D:
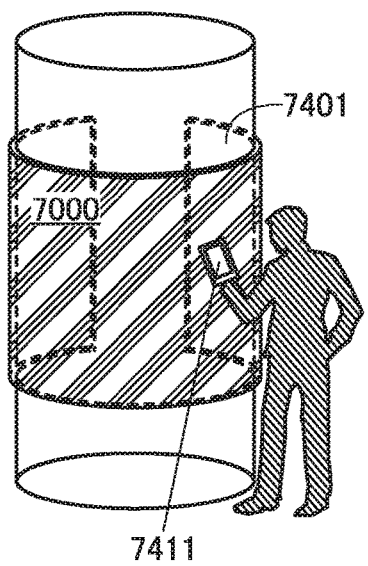

FIGS. 23C and 23D illustrate examples of digital signages.

A digital signage 7300 illustrated in FIG. 23C includes a housing 7301, the display portion 7000, a speaker 7303, and the like. Also, the digital signage 7300 can include an LED lamp, operation keys (including a power switch or an operation switch), a connection terminal, a variety of sensors, a microphone, and the like.

FIG. 23D illustrates a digital signage 7400 mounted on a cylindrical pillar 7401. The digital signage 7400 includes the display portion 7000 provided along a curved surface of the pillar 7401.

The display device of one embodiment of the present invention can be used in each of the display portions 7000 illustrated in FIGS. 23C and 23D.

A larger area of the display portion 7000 can provide more information at a time. In addition, the larger display portion 7000 attracts more attention, so that the effectiveness of the advertisement can be increased, for example.

It is preferable to use a touch panel in the display portion 7000 because a device with such a structure does not just display a still or moving image, but can be operated by users intuitively. In the case where the display device of one embodiment of the present invention is used for providing information such as route information or traffic information, usability can be enhanced by intuitive operation.

Furthermore, as illustrated in FIGS. 23C and 23D, it is preferable that the digital signage 7300 or the digital signage 7400 work with an information terminal 7311 or an information terminal 7411 such as a smartphone a user has through wireless communication. For example, information of an advertisement displayed on the display portion 7000 can be displayed on a screen of the information terminal 7311 or 7411. Moreover, by operation of the information terminal 7311 or 7411, a displayed image on the display portion 7000 can be switched.

Furthermore, it is possible to make the digital signage 7300 or 7400 execute a game with use of the screen of the information terminal 7311 or 7411 as an operation means (controller). Thus, an unspecified number of people can join in and enjoy the game concurrently.

At least part of this embodiment can be implemented in combination with any of the other embodiments described in this specification as appropriate.

(Embodiment 4)

In this embodiment, an example of a television device for which a display device of one embodiment of the present invention is used is described with reference to drawings.

Figure 24A:
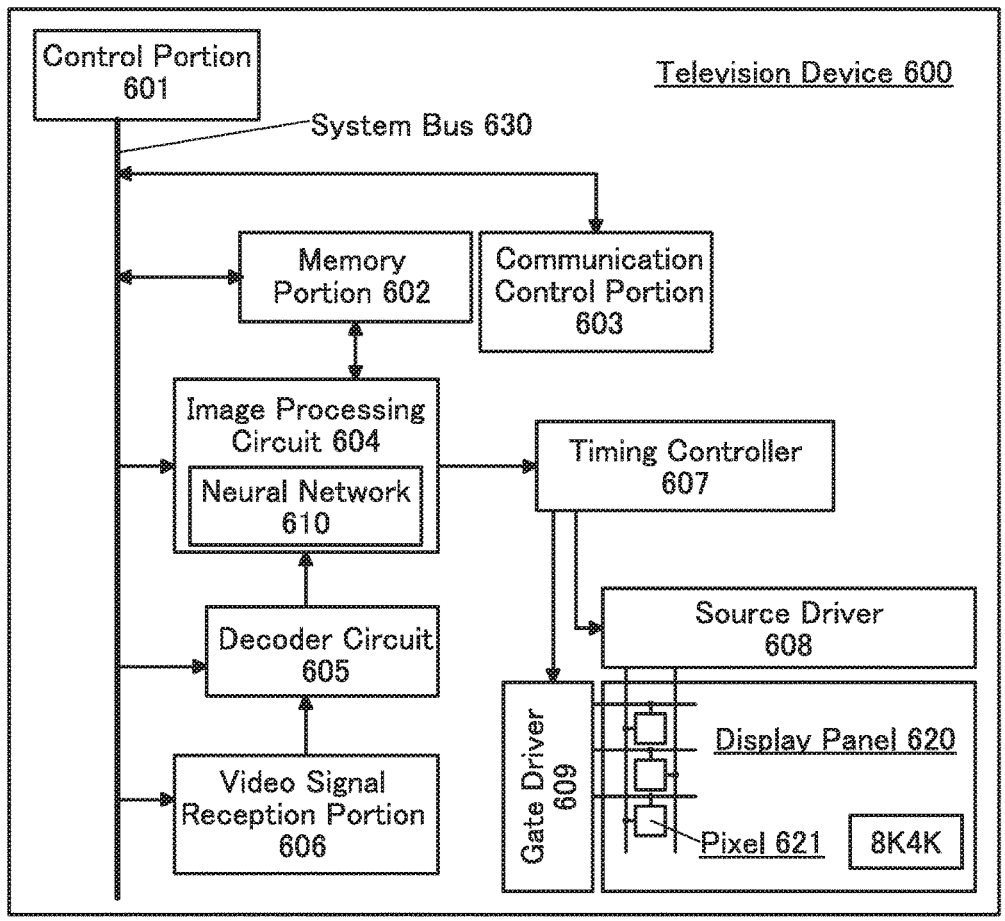
FIGS. 24A and 24B illustrate a structure example of a television device of one embodiment of the present invention.

FIG. 24A is a block diagram illustrating a television device 600.

Note that in a block diagram attached to this specification, components are classified according to their functions and shown as independent blocks; however, it is practically difficult to completely separate the components according to their functions, and one component may have a plurality of functions.

The television device 600 includes a control portion 601, a memory portion 602, a communication control portion 603, an image processing circuit 604, a decoder circuit 605, a video signal reception portion 606, a timing controller 607, a source driver 608, a gate driver 609, a display panel 620, and the like.

The display device described in the above embodiment can be used for the display panel 620 illustrated in FIG. 24A. Thus, the television device 600 with a large size, high resolution, and high visibility can be fabricated.

The control portion 601 can function as, for example, a central processing unit (CPU). For example, the control portion 601 has a function of controlling components such as the memory portion 602, the communication control portion 603, the image processing circuit 604, the decoder circuit 605, and the video signal reception portion 606 via a system bus 630.

Signals are transmitted between the control portion 601 and the components via the system bus 630. The control portion 601 has a function of processing signals inputted from the components which are connected via the system bus 630, a function of generating signals to be outputted to the components, and the like, so that the components connected to the system bus 630 can be controlled comprehensively.

The memory portion 602 functions as a register, a cache memory, a main memory, a secondary memory, or the like that can be accessed by the control portion 601 and the image processing circuit 604.

As a memory device that can be used as a secondary memory, a memory device that includes a rewritable nonvolatile memory element can be used, for example. Examples of them include a flash memory, a magnetoresistive random access memory (MRAM), a phase change RAM (PRAM), a resistive RAM (ReRAM), and a ferroelectric RAM (FeRAM).

As a memory device that can be used as a temporary memory such as a register, a cache memory, or a main memory, a volatile memory element such as a dynamic RAM (DRAM) or a static random access memory (SRAM) may be used.

For example, as a RAM provided in the main memory, a DRAM is used, in which case a memory space as a workspace for the control portion 601 is virtually allocated and used. An operating system, an application program, a program module, program data, and the like which are stored in the memory portion 602 are loaded into the RAM and executed. The data, program, and program module which are loaded into the RAM are directly accessed and operated by the control portion 601.

In the ROM, a basic input/output system (BIOS), firmware, and the like for which rewriting is not needed can be stored. As the ROM, a mask ROM, a one-time programmable read only memory (OTPROM), or an erasable programmable read only memory (EPROM) can be used. As an EPROM, an ultra-violet erasable programmable read only memory (UV-EPROM) which can erase stored data by irradiation with ultraviolet rays, an electrically erasable programmable read only memory (EEPROM), a flash memory, and the like can be given.

Besides the memory portion 602, a detachable memory device may be connected to the television device 600. For example, it is preferable to provide a terminal connected to a storage media drive functioning as a storage device such as a hard disk drive (HDD) or a solid state drive (SSD) or a storage medium such as a flash memory, a Blu-ray Disc, or a DVD. With such a structure, an image can be stored.

The communication control portion 603 has a function of controlling communication exchanged via a computer network. For example, the communication control portion 603 controls a control signal for connection to a computer network in response to instructions from the control portion 601 and transmits the signal to the computer network. Accordingly, communication can be performed by connecting to a computer network such as the Internet, which is an infrastructure of the World Wide Web (WWW), an intranet, an extranet, a personal area network (PAN), a local area network (LAN), a campus area network (CAN), a metropolitan area network (MAN), a wide area network (WAN), or a global area network (GAN).

The communication control portion 603 may have a function of communicating with a computer network or another electronic device with a communication standard such as Wi-Fi (registered trademark), Bluetooth (registered trademark), or ZigBee (registered trademark).

The communication control portion 603 may have a function of wireless communication. For example, an antenna and a high frequency circuit (an RF circuit) are provided to receive and transmit an RF signal. The high frequency circuit converts an electromagnetic signal into an electric signal in a frequency band in accordance with respective national laws and transmits the electromagnetic signal wirelessly to another communication device. Several tens of kilohertz to several tens of gigahertz are a practical frequency band which is generally used. The high frequency circuit connected to an antenna includes a high frequency circuit portion compatible with a plurality of frequency bands; the high frequency circuit portion can include an amplifier, a mixer, a filter, a DSP, an RF transceiver, or the like.

The video signal reception portion 606 includes, for example, an antenna, a demodulation circuit, and analog-digital conversion circuit (AD converter circuit), and the like. The demodulation circuit has a function of demodulating a signal inputted from the antenna. The AD converter circuit has a function of converting the demodulated analog signal into a digital signal. The signal processed in the video signal reception portion 606 is transmitted to the decoder circuit 605.

The decoder circuit 605 has a function of decoding video data included in a digital signal inputted from the video signal reception portion 606, in accordance with the specifications of the broadcasting standard for transmitting the video data, and a function of generating a signal transmitted to the image processing circuit. For example, as the broadcasting standard in 8K broadcasts, H.265|MPEG-H high efficiency video coding (hereinafter referred to as HEVC) is given.

The antenna included in the video signal reception portion 606 can receive airwaves such as a ground wave and a wave transmitted from a satellite. The antenna can receive airwaves for analog broadcasting, digital broadcasting, image-sound-only broadcasting, sound-only broadcasting, or the like. For example, the antenna can receive airwaves transmitted in a certain frequency band, such as a UHF band (about 300 MHz to 3 GHz) or a VHF band (30 MHz to 300 MHz). When a plurality of pieces of data received in a plurality of frequency bands are used, the transfer rate can be increased and more information can thus be obtained. Accordingly, the display panel 620 can display an image with a resolution higher than the full high definition, such as 4K2K, 8K4K, 16K8K, or more.

Alternatively, the video signal reception portion 606 and the decoder circuit 605 may generate a signal using the broadcasting data transmitted with data transmission technology through a computer network. The signal is transmitted to the image processing circuit 604. In the case where a digital signal is received, the video signal reception portion 606 does not necessarily include a demodulating circuit, an AD converter circuit, and the like.

The image processing circuit 604 has a function of generating a video signal outputted to the timing controller 607, on the basis of a video signal inputted from the decoder circuit 605.

The timing controller 607 has a function of generating a signal (e.g., a clock signal or a start pulse signal) outputted to the gate driver 609 and the source driver 608 on the basis of a synchronization signal included in a video signal or the like on which the image processing circuit 604 performs processing. In addition, the timing controller 607 has a function of generating a video signal outputted to the source driver 608, as well as the above signal.

The display panel 620 includes a plurality of pixels 621. Each pixel 621 is driven by a signal supplied from the gate driver 609 and the source driver 608. Here, an example of a display panel with the 7680×4320 pixels, i.e., the resolution corresponding to the standard of 8K4K, is shown. Note that the resolution of the display panel 620 is not limited to the above, and may have a resolution corresponding to the standard such as full high-definition (the number of pixels is 1920×1080) or 4K2K (the number of pixels is 3840×2160).

The control portion 601 or the image processing circuit 604 illustrated in FIG. 24A may include, for example, a processor. For example, a processor functioning as a central processing unit (CPU) can be used for the control portion 601. Another processor such as a digital signal processor (DSP) or a graphics processing unit (GPU) can be used, for example for the image processing circuit 604. Furthermore, such a processor obtained with a programmable logic device (PLD) such as a field programmable gate array (FPGA) or a field programmable analog array (FPAA) may be used for the control portion 601 or the image processing circuit 604.

The processor interprets and executes instructions from various programs to process various kinds of data and control programs. The programs executed by the processor may be stored in a memory region included in the processor or a memory device which is additionally provided.

Two or more functions among the functions of the control portion 601, the memory portion 602, the communication control portion 603, the image processing circuit 604, the decoder circuit 605, the video signal reception portion 606, and the timing controller 607 are aggregated in one IC chip to form a system LSI. For example, such a system LSI may include a processor, a decoder circuit, a tuner circuit, an AD converter circuit, a DRAM, an SRAM, and the like.

Note that a transistor that includes an oxide semiconductor in a channel formation region and that has an extremely low off-state current can be used in an IC or the like included in the control portion 601 or another component. With use of the transistor having an extremely low off-state current as a switch for holding electric charge (data) which flows into a capacitor functioning as a memory element, a long data retention period can be ensured. By utilizing this characteristic for a register or a cache memory of the control portion 601 or the like, normally-off computing is achieved where the control portion 601 operates only when needed and data on the previous processing is stored in the memory element in the rest of time; thus, power consumption of the television device 600 can be reduced.

Note that the structure of the television device 600 illustrated in FIG. 24A is just an example, and all of the components illustrated here are not necessarily included. The television device 600 may include at least necessary components among the components illustrated in FIG. 24A. Furthermore, the television device 600 may include a component other than the components illustrated in FIG. 24A.

For example, the television device 600 may include an external interface, a sound output portion, a touch panel unit, a sensor unit, a camera unit, or the like besides the components illustrated in FIG. 24A. Examples of the external interfaces include an external connection terminal such as an universal serial bus (USB) terminal, a local area network (LAN) connection terminal, a power reception terminal, a sound output terminal, a sound input terminal, a video output terminal, and a video input terminal, a transceiver for optical communication using infrared rays, visible light, ultraviolet rays, or the like, a physical button provided on a housing, or the like. Examples of sound input/output portions include a sound controller, a microphone, and a speaker.

The image processing circuit 604 is described in detail below.

The image processing circuit 604 preferably has a function of performing image processing on the basis of a video signal inputted from the decoder circuit 605.

Examples of the image processing include noise removal, grayscale conversion, tone correction, and luminance correction. As the tone correction or the luminance correction, gamma correction can be given, for example.

Furthermore, the image processing circuit 604 preferably has a function of pixel interpolation in accordance with up-conversion of the resolution, a function of frame interpolation in accordance with up-conversion of the frame frequency, or the like.

The noise removing process is a process for removing various noise, such as mosquito noise which appears near outline of texts and the like, block noise which appears in high-speed moving images, random noise causing flicker, and dot noise caused by up-conversion of the resolution.

The grayscale conversion processing converts the grayscale of an image to a grayscale corresponding to output characteristics of the display panel 620. For example, in the case where the number of grayscale levels is increased, gradation values of pixels are interpolated and assigned to respective images inputted with low grayscale levels, so that a smooth histogram can be obtained. In addition, a high-dynamic range (HDR) processing for increasing the dynamic range is also included in the grayscale conversion processing.

The pixel interpolation process interpolates data which does not actually exist when resolution is up-converted. For example, referring pixels around the target pixel, data is interpolated to display intermediate color between the pixels.

The tone correction process corrects the tone of an image. The luminance correction process corrects the brightness (luminance contrast) of an image. For example, these processes detect a type, luminance, color purity, and the like of a lighting in a space where the television device 600 is provided, and corrects luminance and tone of images displayed on the display panel 620 to be optimal luminance and tone in accordance with the detection. These processes can have a function of referring a displayed image to various images of various scenes in an image list stored in advance, and then correcting luminance and tone of the displayed image to be suitable to the images in the closest scene of the image.

In the case where the frame frequency of the displayed video is increased, the frame interpolation generates an image for a frame that does not exist originally (interpolation frame). For example, an image for an interpolation frame which is interposed between two images is generated from a difference between the two images. Alternatively, images for a plurality of interpolation frames can be generated between two images. For example, when the frame frequency of a video signal inputted from the decoder circuit 605 is 60 Hz, a plurality of interpolation frames are generated, and the frame frequency of a video signal outputted to the timing controller 607 can be increased twofold (120 Hz), fourfold (240 Hz), eightfold (480 Hz), or the like.

The image processing circuit 604 preferably has a function of performing image processing utilizing a neural network. FIG. 24A illustrates an example in which the image processing circuit 604 includes a neural network 610.

For example, with the neural network 610, features can be extracted from image data included in a video. In addition, the image processing circuit 604 can select an optimal correction method in accordance with the extracted feature or select a parameter used for the correction.

Alternatively, the neural network 610 itself may have a function of performing image processing. In other words, the neural network 610 may receive image data on which image processing is not performed and output image data that has been subjected to image processing.

Data of a weight coefficient used for the neural network 610 is stored in the memory portion 602 as a data table. The data table including the weight coefficient can be updated, for example, by the communication control portion 603 through the computer network. Alternatively, the image processing circuit 604 may have a learning function and enable the update of the data table including the weight coefficient.

Figure 24B:
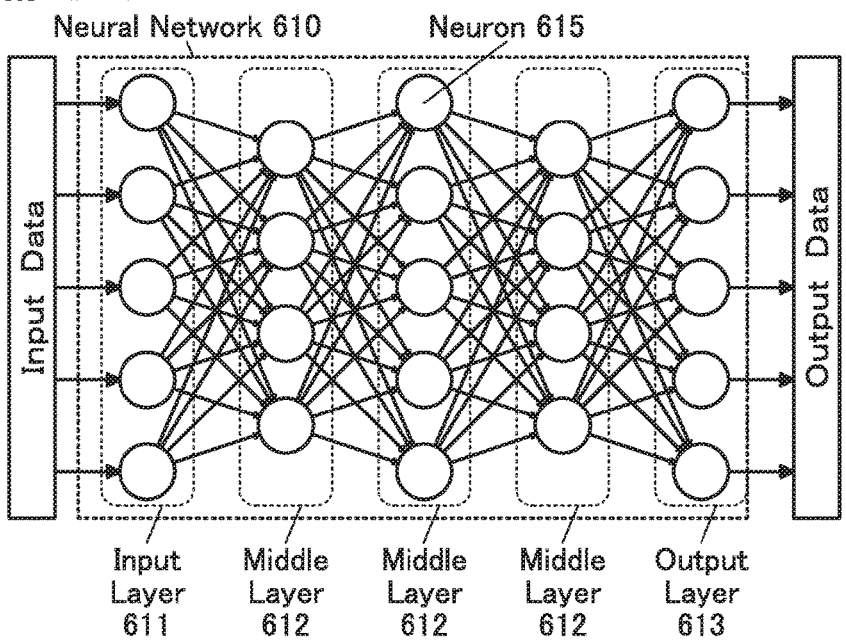

FIG. 24B is a schematic view illustrating the neural network 610 included in the image processing circuit 604.

In this specification and the like, the neural network indicates a general model having the capability of solving problems, which is modeled on a biological neural network and determines the connection strength of neurons by the learning. The neural network includes an input layer, a middle layer (also referred to as hidden layer), and an output layer. A neural network having two or more middle layers is referred to as deep neural network (DNN), and the learning using such a DNN is referred to as deep learning.

In the description of the neural network in this specification and the like, to determine a connection strength of neurons (also referred to as weight coefficient) from the existing data is called "leaning" in some cases. In this specification and the like, to form a neural network using the connection strength obtained by the learning, to lead to a new conclusion, is called "inference" in some cases.

The neural network 610 includes an input layer 611, one or more middle layers 612, and an output layer 613. Input data is inputted to the input layer 611. Output data is outputted from the output layer 613.

Each of the input layer 611, the middle layer 612, and the output layer 613 includes neurons 615. The neuron 615 indicates a circuit element that performs product-sum operation (product-sum operation element). In FIG. 24B, directions of inputting/outputting data between the two neurons 615 in two layers are denoted by arrows.

The arithmetic processing in each layer is executed by the product-sum operation of an output of the neuron 615 in the previous layer and a weight coefficient. For example, when the output from an i-th neuron in the input layer 611 is denoted by $x_i$, and the connection strength (weight coefficient) between the output $x_i$ and a j-th neuron in the middle layer 612 next to the input layer 611 is denoted by $w_{ji}$, the output from the j-th neuron in the middle layer can be denoted by $y_j = f(\Sigma w_{ji} \cdot x_i)$. Note that i and j are each an integer greater than or equal to 1. Here, f(x) represents an activation function, and a sigmoid function, a threshold function, or the like can be used therefor. In this manner, the output of the neuron 615 in each layer is a value obtained from the activation function with respect to the result of product-sum operation of the output from the neuron 615 in the previous layer and the weight coefficient. The connection between layers may be a full connection where all of the neurons are connected or a partial connection where part of neurons is connected.

FIG. 24B illustrates an example including three middle layers 612. The number of the middle layers 612 is not limited to three, and a structure including at least one middle layer is acceptable. The number of neurons included in one middle layer 612 may be changed as appropriate depending on the specifications. For example, the number of the neurons 615 included in one middle layer 612 may be larger or smaller than the number of the neurons 615 included in the input layer 611 or the output layer 613.

The weight coefficient functioning as an indicator of the connection strength between the neurons 615 is determined by learning. Although the learning may be executed by the processor in the television device 600, it is preferable to execute the learning with a calculator having high arithmetic processing properties, such as a dedicated server or a cloud. The weight coefficient determined by the learning is stored in the memory portion 602 as the data table and used when the weight coefficient is read out by the image processing circuit 604. The table can be updated as needed through the computer network.

The above is the description of the neural network.

At least part of this embodiment can be implemented in combination with any of the other embodiments described in this specification as appropriate.

EXAMPLE 1

In this example, results of rough estimation of data writing time of an 8K4K liquid crystal display module including a 65-inch diagonal pixel region are described.

In particular, in this example, whether a large-sized high-resolution display in which amorphous silicon (a-Si:H) is used for a semiconductor layer of a transistor can be operated by applying one embodiment of the present invention was examined.

Note that the resolution of the 8K4K display is significantly high: the horizontal resolution is 7680 and the vertical resolution is 4320. Recommendation ITU-R BT.2020-2 is an international standard for 8K4K displays. In the standard, the driving method is a progressive method and the maximum frame frequency is 120 Hz.

In the case where a transistor with low field-effect mobility is used in a large-sized high-resolution display module, image rewriting cannot be done in a frame period and driving cannot be performed in some cases. In such a case, a configuration in which a pixel region is divided into a plurality of parts (e.g., four parts) and each part is provided with a scan line driver circuit (also referred to as a gate driver) and a signal line driver circuit (also referred to as a source driver) can be employed. With such a configuration, image rewriting of the plurality of pixel regions can be performed at the same time; thus, image rewriting can be performed in a frame period even when a transistor with low field-effect mobility is used.

However, the structure in which the pixel region is divided has, for example, the following problems: an increase in cost resulting from an increase in the number of ICs such as the source driver and the gate driver and the amount of materials thereof; a decrease in the aperture ratio due to an increase in the number of wirings; an increase in a bezel area due to the implementation of ICs; the necessity of a circuit for synchronizing the divided pixel regions; and a decrease in visibility because a boundary portion between the divided pixel regions is visually recognized. In addition, image processing or the like for dividing image data to be input is necessary; thus, a large-scale image processing circuit that can operate at a high speed might be required.

In view of the above, in this example, a configuration in which a selection signal is supplied to each gate line and a pixel is selected one by one and a configuration in which a selection signal is supplied to two or four gate lines at the same time and two or four pixels that adjoin in the column direction are concurrently selected are considered. The two or four pixels that are concurrently selected are connected to different source lines. That is, two or four source lines are arranged for each column. In this example, rough estimation of data writing time was performed with use of a layout of pixels with such a configuration.

In this example, a case where amorphous silicon is used for a semiconductor layer of a transistor and a case where metal oxide is used for a semiconductor layer of a transistor are examined.

The data writing time in the case where amorphous silicon is used for a semiconductor layer was estimated with use of a pseudo parameter obtained by changing field-effect mobility that is a design parameter from an actually measured value of a transistor including microcrystalline silicon.

As to the semiconductor layer including metal oxide, the following two types of structures were considered. As the metal oxide, In—Ga—Zn oxide was used. In a first type of the structure, a single layer of metal oxide with an atomic ratio In:Ga:Zn=1:1:1 or the neighborhood thereof was used as a semiconductor layer. In a second type of the structure, a stacked layer of metal oxide with an atomic ratio In:Ga:Zn=4:2:3 or the neighborhood thereof was used as a semiconductor layer. Specifically, a structure in which a cloud-aligned composite oxide semiconductor (CAC-OS) film is used for a first metal oxide layer and a c-axis-aligned crystalline oxide semiconductor (CAAC-OS) film is used for a second metal oxide layer was assumed.

Table 1 shows parameters of layers used in this example. These parameters were for the case of a transistor in which metal oxide is used for a semiconductor layer; however, in this example, the same parameters were used in the case of a transistor in which amorphous silicon is used for a semiconductor layer.

is connected to a gate line GL(i). One of a source and a drain of the transistor M1 is connected to a source line SL(j), and the other one is connected to one electrode of the capacitor C1 and one electrode of the liquid crystal element LC. The other electrode of the capacitor C1 is connected to a wiring CSCOM. The other electrode of the liquid crystal element LC is connected to a wiring TCOM.

Figure 26A:
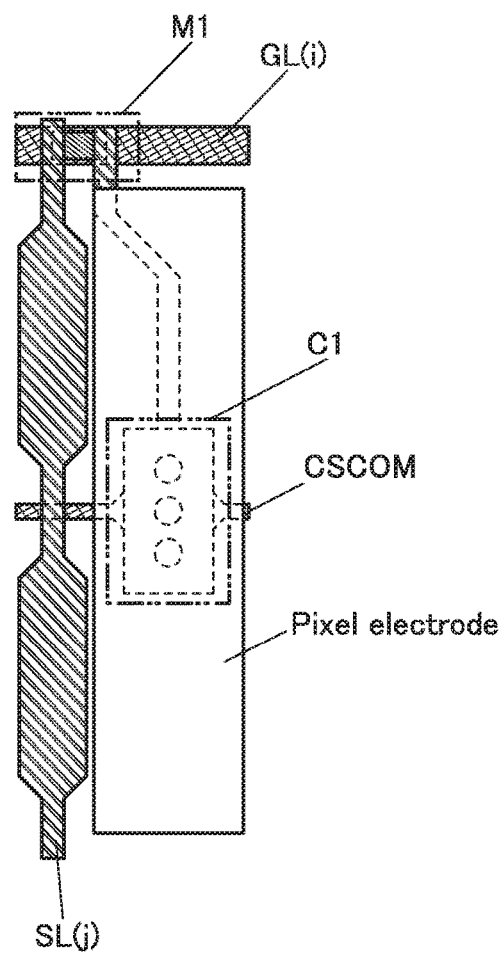
FIGS. 26A and 26B are top views illustrating pixel layouts in Example 1.
Figure 26B:
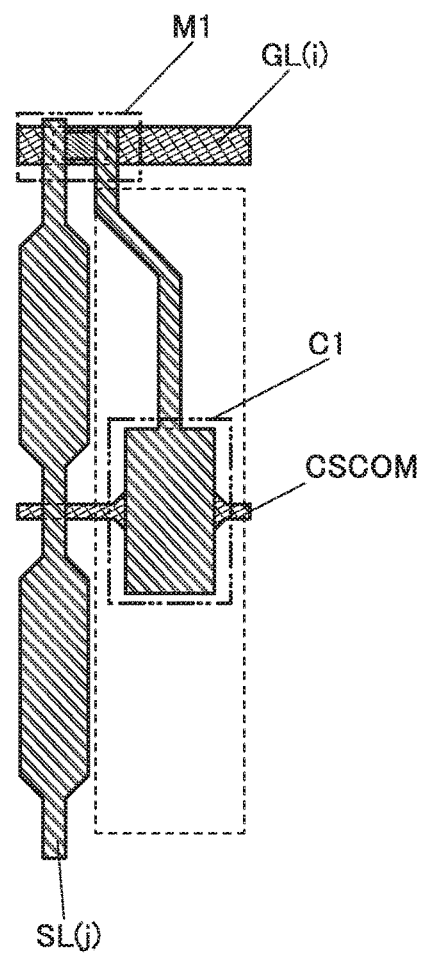

FIGS. 26A and 26B illustrate a pixel layout of a display module in which a pixel is selected one by one. FIG. 26A is a top view in which a stacked structure including components from the gate line GL(i) to the pixel electrode is seen from the pixel electrode side. FIG. 26B is a top view excepting the pixel electrode in FIG. 26A.

The pixel size is 62.5 μm×187.5 μm. The transistor M1 is a channel-etched transistor with a bottom-gate top-contact structure. The transistor M1 has a channel length L of 4 μm, a channel width W of 8 μm, and an LDD region overlapping with a gate (hereinafter referred to as an overlap LDD region Lov) of 2 μm. The gate line GL(i) has a width of 10 μm, and the wiring CSCOM has a width of 3.5 μm. The source line SL(j) has a width of 10 μm, but has a width of 4 μm at a portion crossing another wiring (the gate line GL(i) or the wiring CSCOM). The aperture ratio is 45.6%.

First, rough estimation of data writing time in the case where metal oxide is used for a semiconductor layer is described with reference to FIG. 27.

A period for charging a gate line and a period for charging a source line and a pixel were roughly estimated in such a manner that the parasitic resistance and the parasitic capacitance were extracted from the pixel layout in FIG. 26A, and only a parameter of the field-effect mobility of a transistor was changed. In this example, the data writing time corresponds to the sum of the period for charging a gate line and the period for charging a source line and a pixel. In this example, the period for charging a gate line is a time until the potential of the gate line reaches 75% of the maximum input voltage, and the period for charging a source line and

TABLE 1

| | Material | Thickness | Sheet resistance/capacity | Relative dielectric constant |
| --- | --- | --- | --- | --- |
| Counter electrode | ITSO | 100 nm | 100 Ω/square | — |
| Liquid crystal layer | LC material | 3200 nm | 0.011 fF/μm$^2$ | 4 |
| Pixel electrode | ITSO | 100 nm | 100 Ω/square | — |
| Planarization film | acrylic | 3000 nm | 0.012 fF/μm$^2$ | 4 |
| Passivation film 2 | SiN | 100 nm | 0.620 fF/μm$^2$ | 7 |
| Passivation film 1 | SiON\SiON | 430 nm | 0.082 fF/μm$^2$ | 4 |
| SD wiring * | Cu | 600 nm | 0.050 Ω/square | — |
| Semiconductor layer | IGZO or a-Si | 40 nm | — | — |
| Gate insulating layer ** | SiON | 280 nm | 0.127 fF/μm$^2$ | 4 |
| Gate wiring * | Cu | 600 nm | 0.050 Ω/square | — |
| Substrate | glass | — | — | — |

* The equivalent value based on sheet resistance 0.1 Ω/square of TaN_10 nm\Cu_300 nm.
** The equivalent value of an SiON single layer based on SiN_400 nm\SiON_50 nm.

<Case where Pixel is Selected One by One>

Figure 25A:
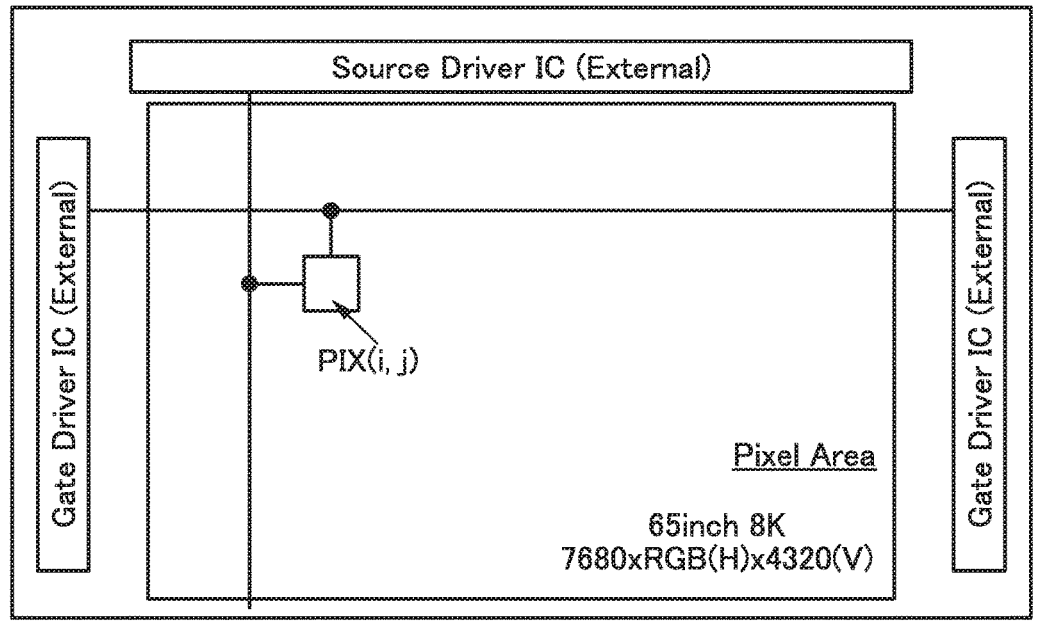
FIG. 25A is a block diagram illustrating a display module in Example 1 and FIG. 25B is a circuit diagram illustrating a pixel in Example 1.

FIG. 25A is a block diagram illustrating a configuration of a display module used in this example. In this configuration, a selection signal is supplied to each gate line and a pixel is selected one by one. A gate driver and a source driver are both external circuits. A gate line is supplied with the same signal from two gate driver ICs. A source line is supplied with a signal from one source driver IC. A pixel region is not divided and has a diagonal of 65 inches. The number of effective pixels is 7680×RGB (H)×4320 (V).

Figure 25B:
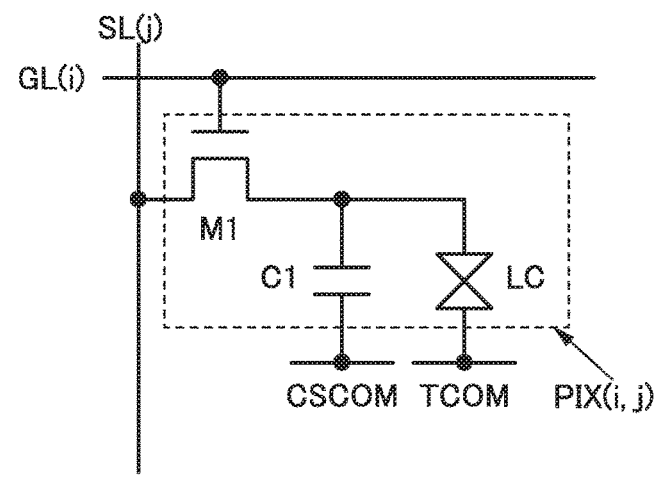

FIG. 25B is a circuit diagram illustrating a pixel PIX(i, j). The pixel PIX(i, j) includes a transistor M1, a capacitor C1, and a liquid crystal element LC. A gate of the transistor M1 a pixel is a time until the potential of the source line reaches 99% of the maximum input voltage.

Here, a normalized value (normalized mobility) under a condition that the field-effect mobility in the case where a stacked layer of metal oxide with an atomic ratio In:Ga:Zn=4:2:3 or the neighborhood thereof is used for a semiconductor layer is 1 was used. The transistor size was not changed. The load of the whole pixel region is described below. A parasitic resistance Rgl of the gate line is 3.60 kΩ, a parasitic capacitance Cgl of the gate line is 255 pF, a parasitic resistance Rsl of the source line is 5.80 kΩ, a parasitic capacitance Csl of the source line is 147 pF, and a parasitic capacitance Cpix of the pixel is 216.6 fF. Note that in this example, the parasitic capacitance Cpix of the pixel includes storage capacitor of a capacitor, capacitance of a liquid crystal element, and parasitic capacitance of a node A. In this example, the node A is a node at which a source or a drain of a transistor, one electrode of a capacitor, and one electrode of a liquid crystal element are connected in each pixel.

Figure 27:
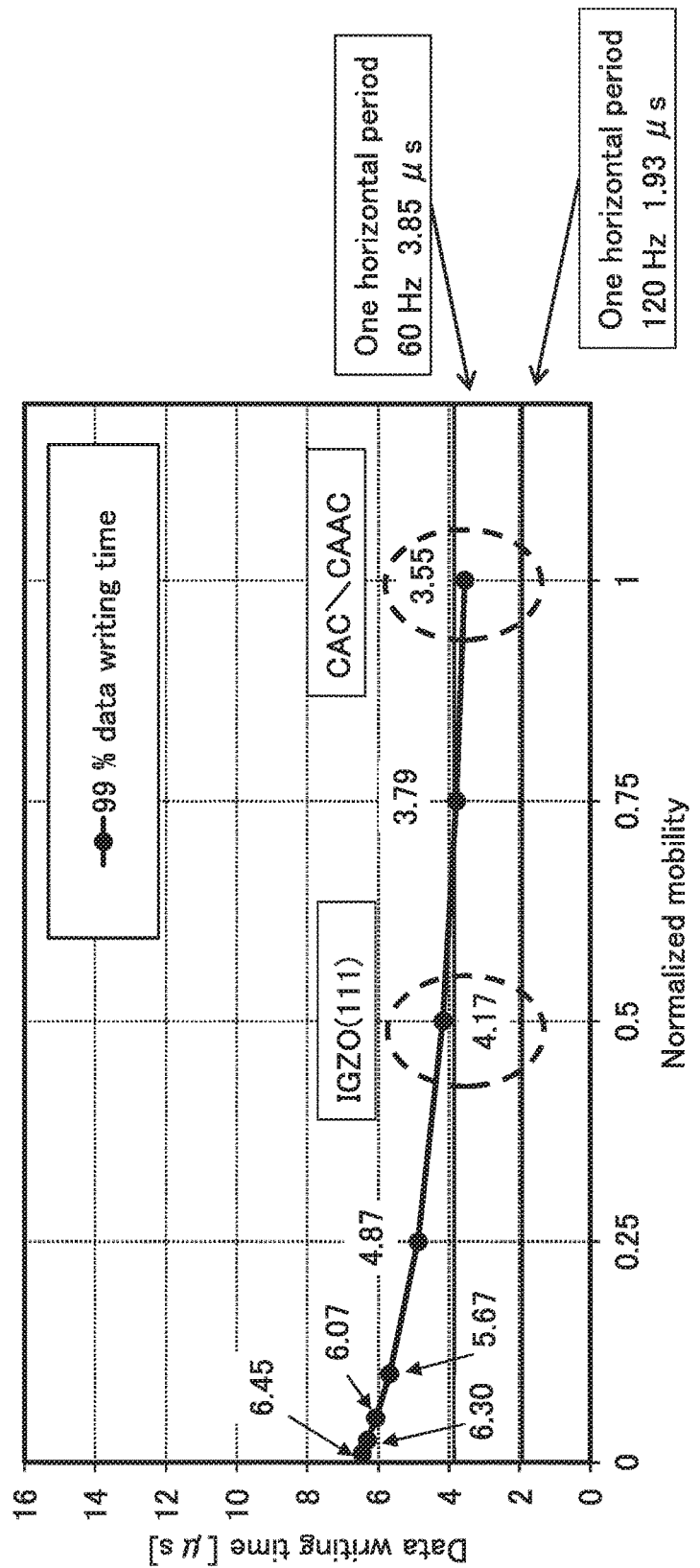
FIG. 27 shows results of rough estimation of data writing time in Example 1.

The result of normalized mobility of 1 in FIG. 27 corresponds to the case where a stacked layer of metal oxide with an atomic ratio In:Ga:Zn=4:2:3 or the neighborhood thereof is used as a semiconductor layer (denoted as "CAC\CAAC" in FIG. 27). In that case, the data writing time is 3.55 µs, which is shorter than one horizontal period 3.85 µs in 60-Hz driving. Accordingly, it was estimated that 60-Hz driving can be performed. This data writing time is longer than one horizontal period 1.93 µs in 120-Hz driving. Accordingly, it was estimated that 120-Hz driving is difficult.

The result of normalized mobility of 0.5 in FIG. 27 corresponds to the case where a single layer of metal oxide with an atomic ratio In:Ga:Zn=1:1:1 or the neighborhood thereof is used as a semiconductor layer (denoted as "IGZO (111)" in FIG. 27). In that case, the data writing time is 4.17 µs, which is longer than one horizontal period 3.85 µs in 60-Hz driving. Accordingly, it was estimated that not only 120-Hz driving but also 60-Hz driving is difficult.

Next, rough estimation of data writing time in the case where amorphous silicon is used for a semiconductor layer is described with reference to FIG. 28.

A period for charging a gate line and a period for charging a source line and a pixel were roughly estimated in such a manner that the parasitic resistance and the parasitic capacitance were extracted from the pixel layout in FIG. 26A, and a design parameter of the field-effect mobility of a transistor was changed from the actually measured value of a transistor fabricated using microcrystalline silicon. The transistor size and storage capacitor were not changed. In order to actually use amorphous silicon for a semiconductor layer, a larger transistor and storage capacitor are needed, and thus the data writing time needs to be longer than that shown as the result in this example. The load of the whole pixel region is described below. A parasitic resistance Rgl of the gate line is 3.60 kΩ, a parasitic capacitance Cgl of the gate line is 255 pF, a parasitic resistance Rsl of the source line is 5.80 kΩ, a parasitic capacitance Csl of the source line is 147 pF, and a parasitic capacitance Cpix of the pixel is 216.6 fF.

Figure 28:
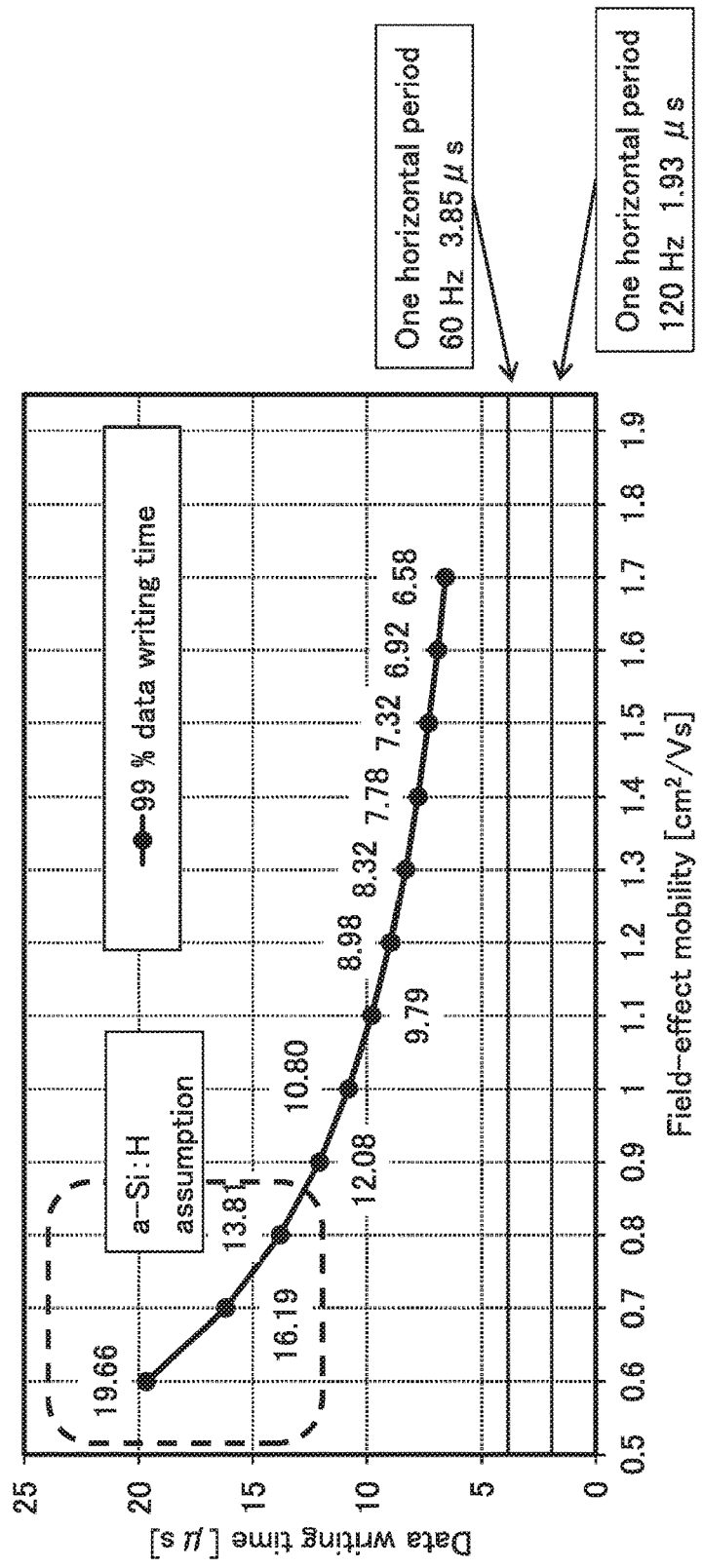
FIG. 28 shows results of rough estimation of data writing time in Example 1.

The results of field-effect mobility of 0.6, 0.7, and 0.8 [cm$^2$/Vs] in FIG. 28 correspond to the case where amorphous silicon is used for a semiconductor layer. In that case, the data writing time at field-effect mobility of 0.6, 0.7, and 0.8 [cm$^2$/Vs] are 19.66 µs, 16.19 µs, and 13.81 µs, respectively, which are longer than one horizontal period 1.93 µs in 120-Hz driving and one horizontal period 3.85 µs in 60-Hz driving. Accordingly, it was estimated that not only 120-Hz driving but also 60-Hz driving is difficult.

<Case where Two Pixels are Concurrently Selected>

Figure 29A:
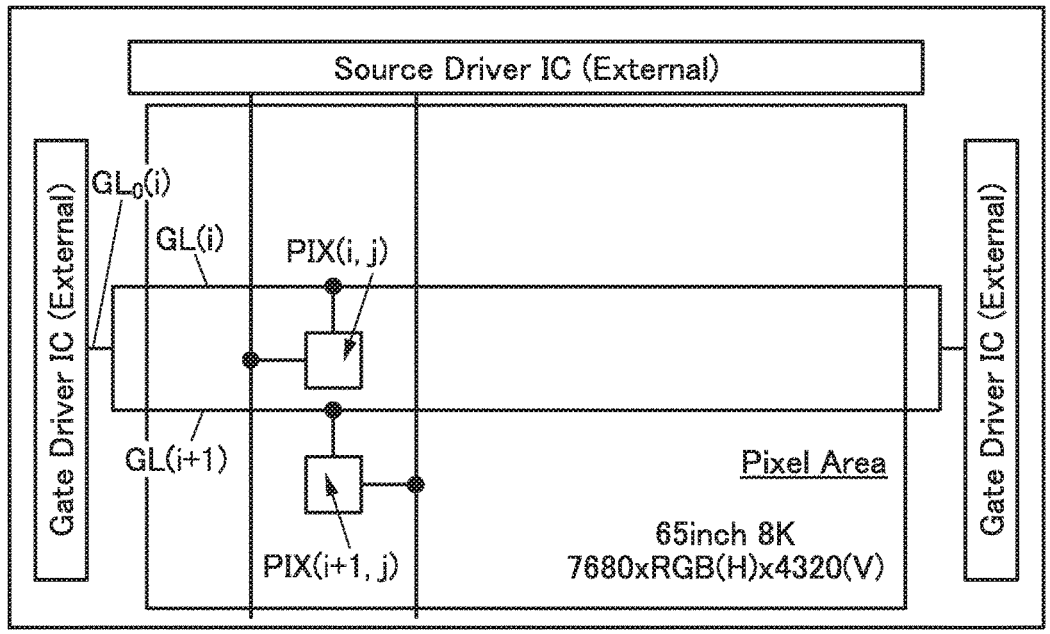
FIG. 29A is a block diagram illustrating a display module in Example 1 and FIG. 29B is a circuit diagram illustrating a pixel in Example 1.

FIG. 29A is a block diagram illustrating a configuration of a display module used in this example. With this configuration, a selection signal is supplied to two gate lines at the same time, and two pixels that adjoin in the column direction are concurrently selected. A gate driver and a source driver are both external circuits. A gate line is supplied with the same signal from two gate driver ICs. The gate line $GL_0(i)$ is electrically connected to the gate line GL(i) and the gate line GL(i+1), and pixels in the i-th row and the (i+1)-th row are concurrently driven. A signal is supplied to a source line from one source driver IC. A pixel region is not divided and has a diagonal of 65 inches. The number of effective pixels is 7680×RGB (H)×4320 (V).

Figure 29B:
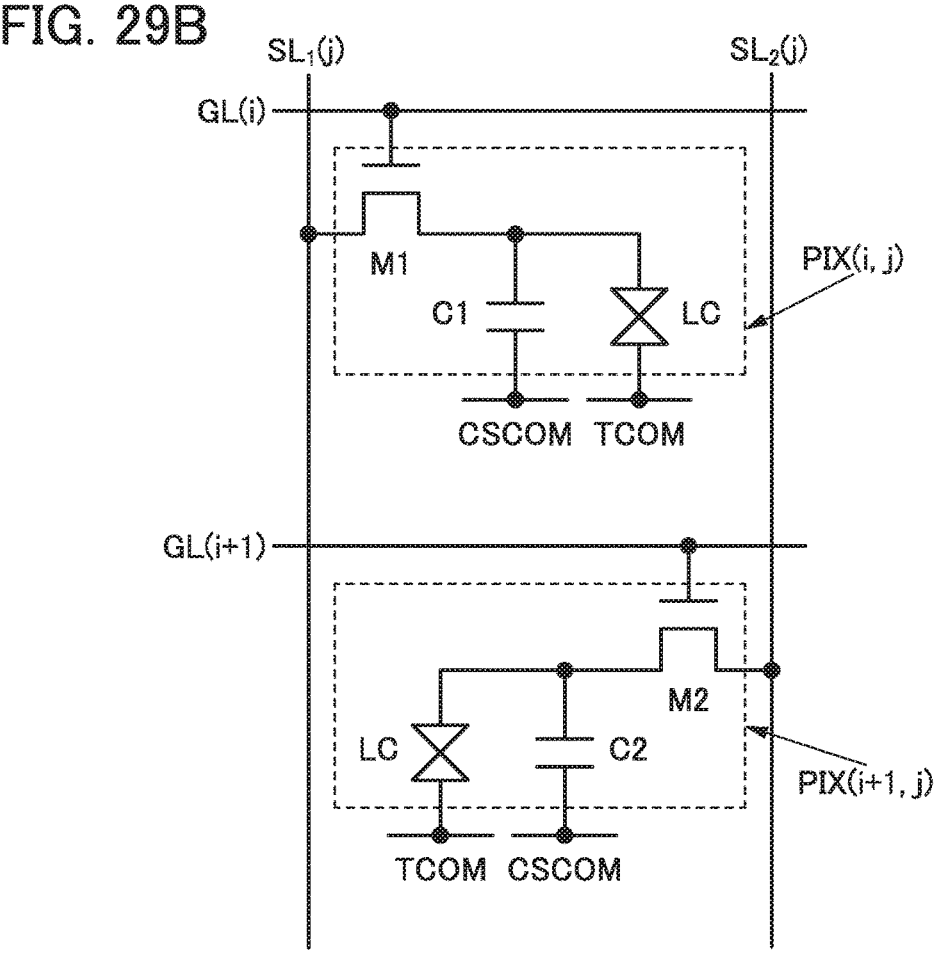

FIG. 29B is a circuit diagram illustrating the pixel PIX(i, j) and a pixel PIX(i+1, j).

First, a configuration of the pixel PIX(i, j) is described. The pixel PIX(i, j) includes the transistor M1, the capacitor C1, and the liquid crystal element LC. The gate of the transistor M1 is connected to the gate line GL(i). One of the source and the drain of the transistor M1 is connected to a source line SL1(j), and the other is connected to one electrode of the capacitor C1 and one electrode of the liquid crystal element LC. The other electrode of the capacitor C1 is connected to a wiring CSCOM. The other electrode of the liquid crystal element LC is connected to a wiring TCOM.

Next, a configuration of the pixel PIX(i+1, j) is described. The pixel PIX(i+1, j) includes a transistor M2, a capacitor C2, and the liquid crystal element LC. A gate of the transistor M2 is connected to the gate line GL(i+1). One of a source and a drain of the transistor M2 is connected to the source line SL$_2$(j), and the other is connected to one electrode of the capacitor C2 and one electrode of the liquid crystal element LC. The other electrode of the capacitor C2 is connected to the wiring CSCOM. The other electrode of the liquid crystal element LC is connected to the wiring TCOM.

Figure 30A:
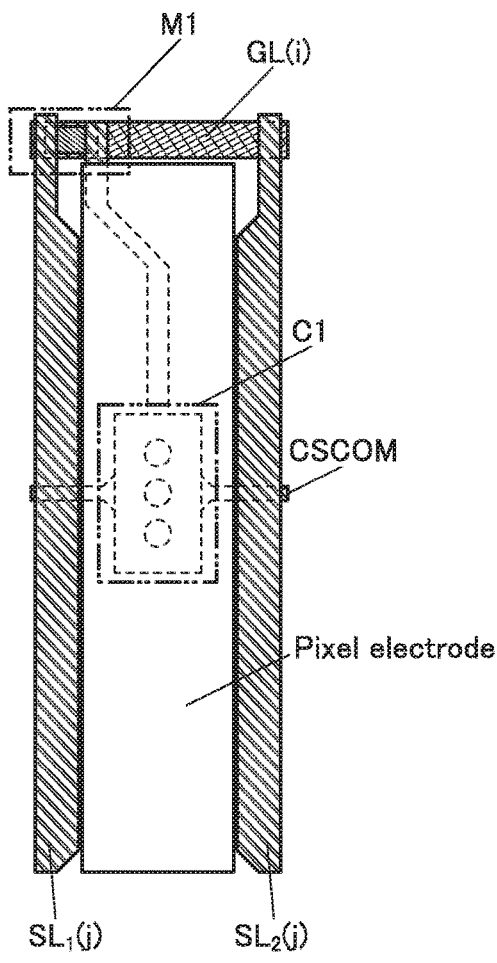
FIGS. 30A and 30B are top views illustrating pixel layouts in Example 1.
Figure 30B:
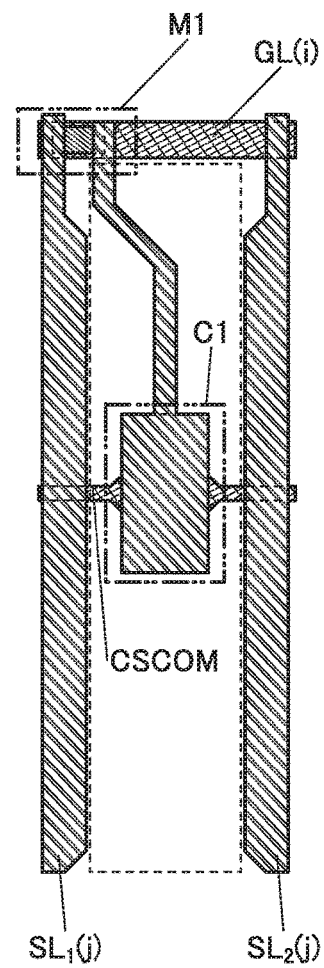

FIGS. 30A and 30B illustrate a pixel layout of a display module in which two pixels are concurrently selected. FIG. 30A is a top view in which a stacked structure including components from the gate line GL(i) to the pixel electrode is seen from the pixel electrode side. FIG. 30B is a top view excepting the pixel electrode in FIG. 30A.

The pixel size is 62.5 µm×187.5 µm. The transistor M1 is a channel-etched transistor with a bottom-gate top-contact structure. The transistor M1 has a channel length L of 4 µm, a channel width W of 8 µm, and an overlap LDD region Lov of 2 µm. The gate line GL(i) has a width of 10 µm, and the wiring CSCOM has a width of 3.5 µm. Each of the source line SL$_1$(j) and the source line SL$_2$(j) has a width of 10 µm, but has a width of 4 µm at a portion crossing the gate line. The aperture ratio is 37.3%.

First, rough estimation of data writing time in the case where metal oxide is used for a semiconductor layer is described with reference to FIG. 31.

A period for charging a gate line and a period for charging a source line and a pixel were roughly estimated in such a manner that the parasitic resistance and the parasitic capacitance were extracted from the pixel layout in FIG. 30A, and only a parameter of the mobility was changed. Here, a normalized value (normalized mobility) under a condition that the field-effect mobility in the case where a stacked layer of metal oxide with an atomic ratio In:Ga:Zn=4:2:3 or the neighborhood thereof is used for a semiconductor layer is 1 was used. The transistor size was not changed. The load of the whole pixel region is described below. A parasitic resistance Rgl of the gate line is 3.60 kΩ, a parasitic capacitance Cgl of the gate line is 364 pF, a parasitic resistance Rsl of the source line is 4.83 kΩ, a parasitic capacitance Csl of the source line is 182 pF, and a parasitic capacitance Cpix of the pixel is 191 fF.

Figure 31:
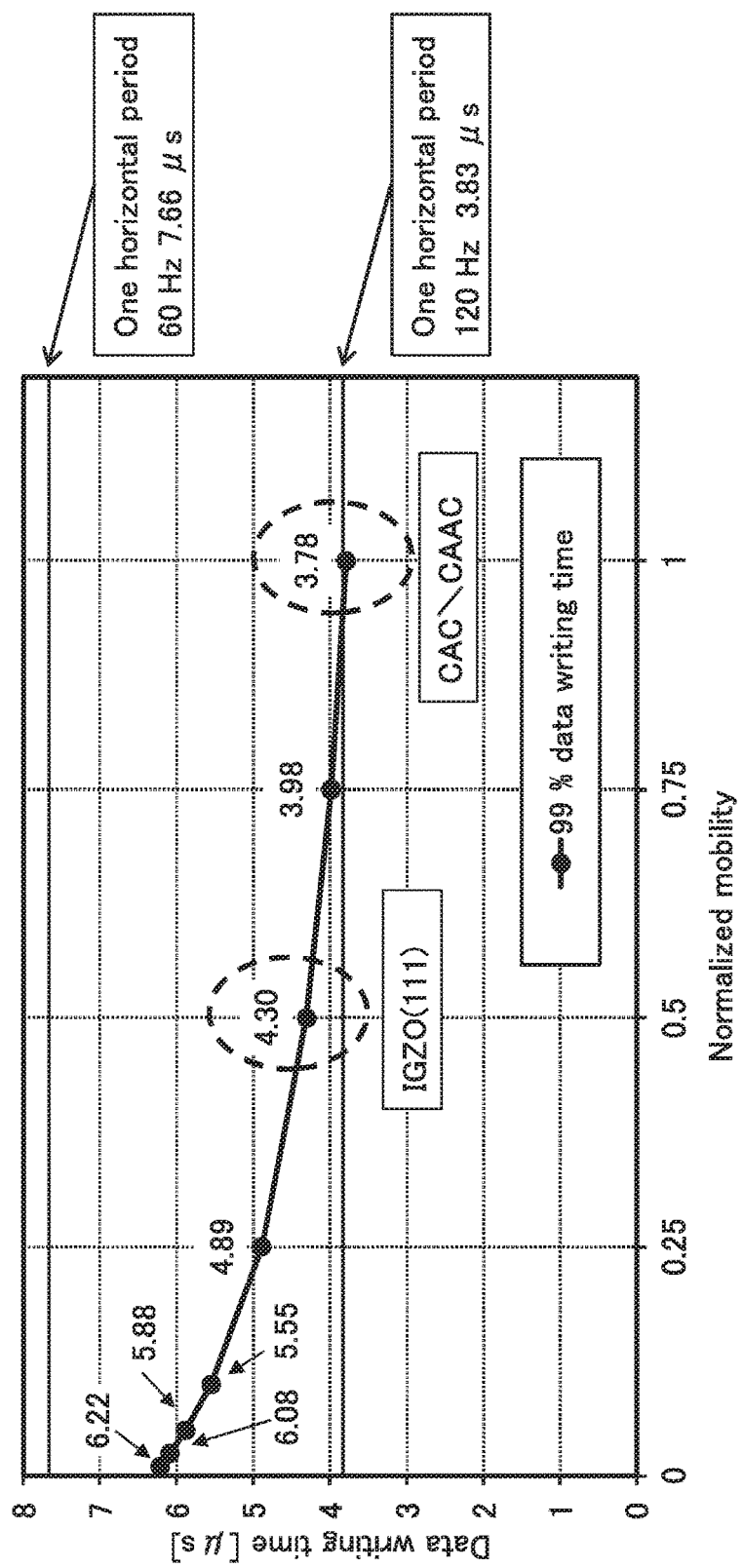
FIG. 31 shows results of rough estimation of data writing time in Example 1.

The result of normalized mobility of 1 in FIG. 31 corresponds to the case where a stacked layer of metal oxide with an atomic ratio In:Ga:Zn=4:2:3 or the neighborhood thereof is used as a semiconductor layer (denoted as "CAC\CAAC" in FIG. 31). In that case, the data writing time is 3.78 µs, which is shorter than one horizontal period 3.83 μs in 120-Hz driving. Accordingly, it was estimated that 120-Hz driving can be performed.

The result of normalized mobility of 0.5 in FIG. 31 corresponds to the case where a single layer of metal oxide with an atomic ratio In:Ga:Zn=1:1:1 or the neighborhood thereof is used as a semiconductor layer (denoted as "IGZO (111)" in FIG. 31). In that case, the data writing time is 4.30 μs, which is shorter than one horizontal period 7.66 μs in 60-Hz driving. Accordingly, it was estimated that 60-Hz driving can be performed. This data writing time is longer than one horizontal period 3.83 μs in 120-Hz driving. Accordingly, it was estimated that 120-Hz driving is difficult.

In FIG. 31, two gate lines are supplied with the same selection signal, so that the length of one horizontal period can be twice the length of one horizontal period in FIG. 27. Accordingly, a high-resolution display device can be operated easily with use of a transistor with low field-effect mobility.

The results in FIG. 27 and FIG. 31 show that in the case where IGZO(111) is used for a semiconductor layer, 60-Hz driving, which is difficult with the configuration in which writing is performed in a pixel one by one, can be achieved with the configuration in which writing is performed in two pixels concurrently.

The results in FIG. 27 and FIG. 31 show that in the case where CAC\CAAC is used for a semiconductor layer, 120-Hz driving, which is difficult with the configuration in which writing is performed in a pixel one by one, can be achieved with the configuration in which writing is performed in two pixels concurrently.

Next, rough estimation of data writing time in the case where amorphous silicon is used for a semiconductor layer is described with reference to FIG. 32.

A period for charging a gate line and a period for charging a source line and a pixel were roughly estimated in such a manner that the parasitic resistance and the parasitic capacitance were extracted from the pixel layout in FIG. 30A, and a design parameter of the field-effect mobility of a transistor was changed from the actually measured value of a transistor fabricated using microcrystalline silicon. The transistor size and storage capacitor were not changed. The load of the whole pixel region is described below. A parasitic resistance Rgl of the gate line is 3.60 kΩ, a parasitic capacitance Cgl of the gate line is 364 pF, a parasitic resistance Rsl of the source line is 4.83 kΩ, a parasitic capacitance Csl of the source line is 182 pF, and a parasitic capacitance Cpix of the pixel is 191 fF.

Figure 32:
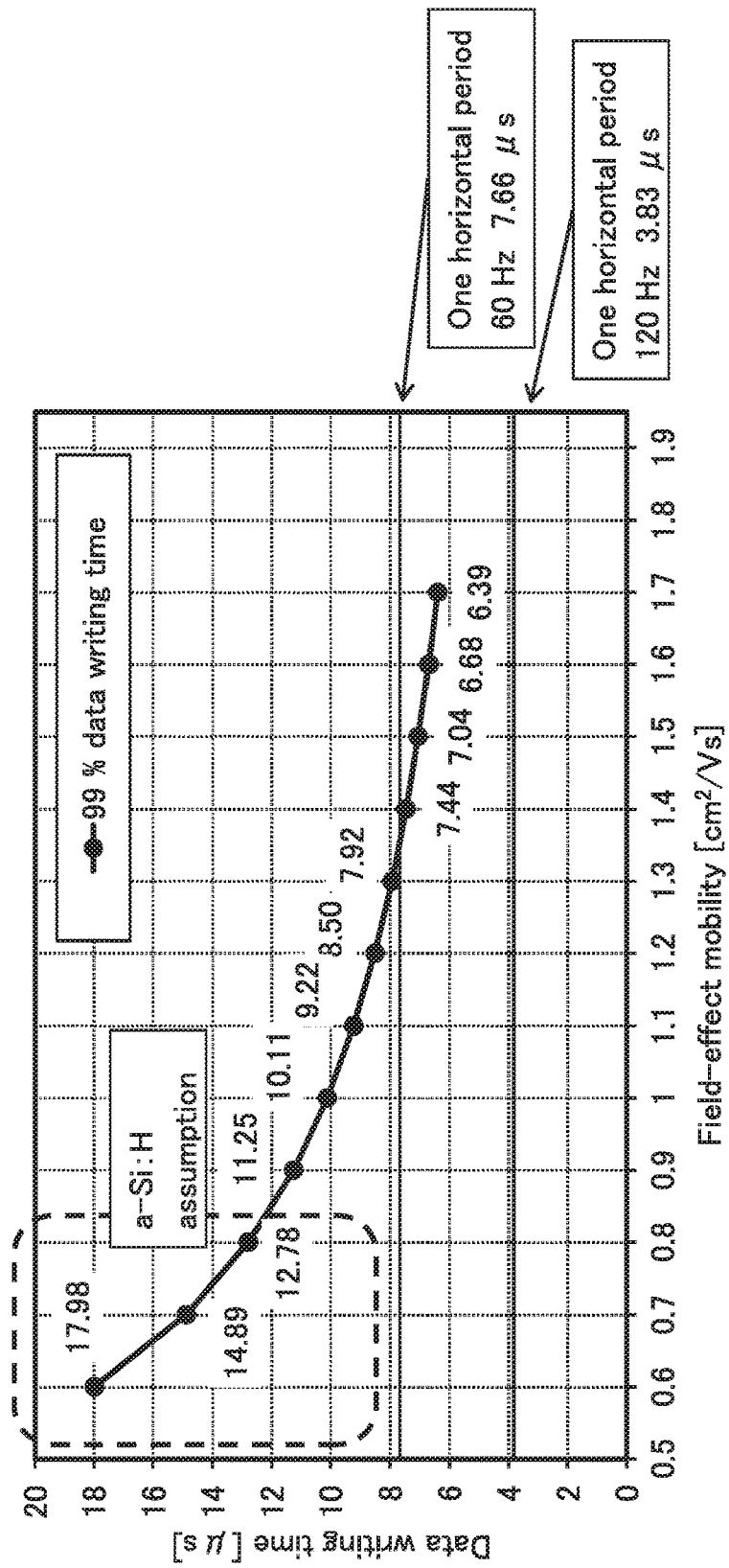
FIG. 32 shows results of rough estimation of data writing time in Example 1.

The results of field-effect mobility of 0.6, 0.7, and 0.8 [cm$^2$/Vs] in FIG. 32 correspond to the case where amorphous silicon is used for a semiconductor layer. In that case, the data writing time at field-effect mobility of 0.6, 0.7, and 0.8 [cm$^2$/Vs] are 17.98 μs, 14.89 μs, and 12.78 μs, respectively, which are longer than one horizontal period 3.83 μs in 120-Hz driving and one horizontal period 7.66 μs in 60-Hz driving. Accordingly, it was estimated that not only 120-Hz driving but also 60-Hz driving is difficult.

According to the result in FIG. 32, it was estimated that in the case where amorphous silicon is used for a semiconductor layer, 60-Hz driving is difficult even with the configuration in which writing is performed in two pixels concurrently. This is different from the case where metal oxide is used for a semiconductor layer (see the result in FIG. 31).

<Case where Four Pixels are Concurrently Selected>

Figure 33A:
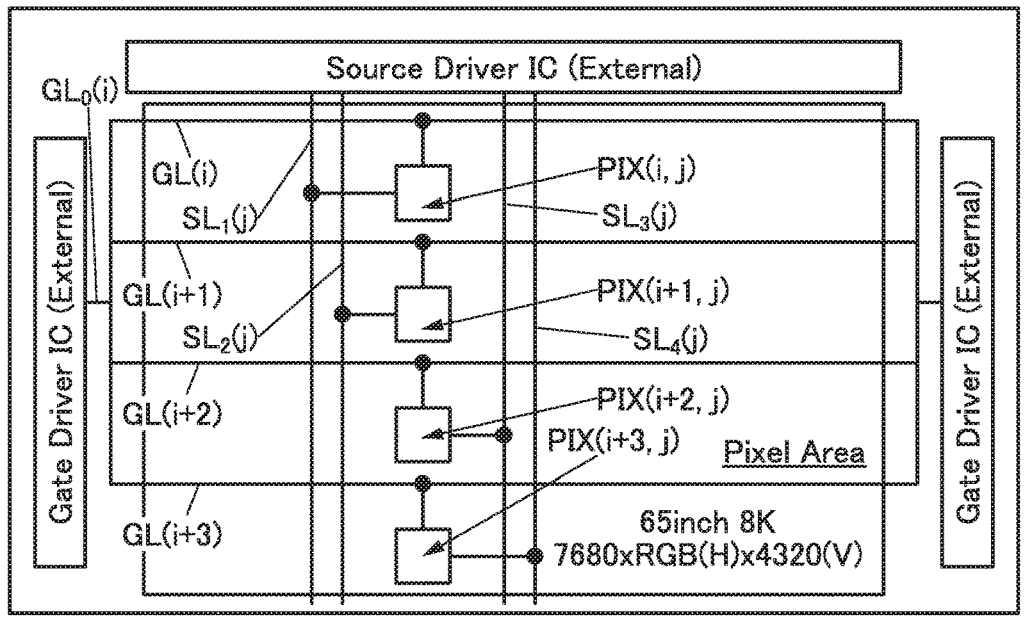
FIG. 33A is a block diagram illustrating a display module in Example 1 and FIG. 33B is a circuit diagram illustrating a pixel in Example 1.

FIG. 33A is a block diagram illustrating a configuration of a display module used in this example. With this configuration, a selection signal is supplied to four gate lines at the same time, and four pixels that adjoin in the column direction are concurrently selected. A gate driver and a source driver are both external circuits. A gate line is supplied with the same signal from two gate driver ICs. The gate line GL$_0$(i) is electrically connected to the gate line GL(i), the gate line GL(i+1), the gate line GL(i+2), and the gate line GL(i+3), and the i-th to the (i+3)-th rows are concurrently driven. A source line is supplied with a signal from one source driver IC. A pixel region is not divided and has a diagonal of 65 inches. The number of effective pixels is 7680×RGB (H)×4320 (V).

Figure 33B:
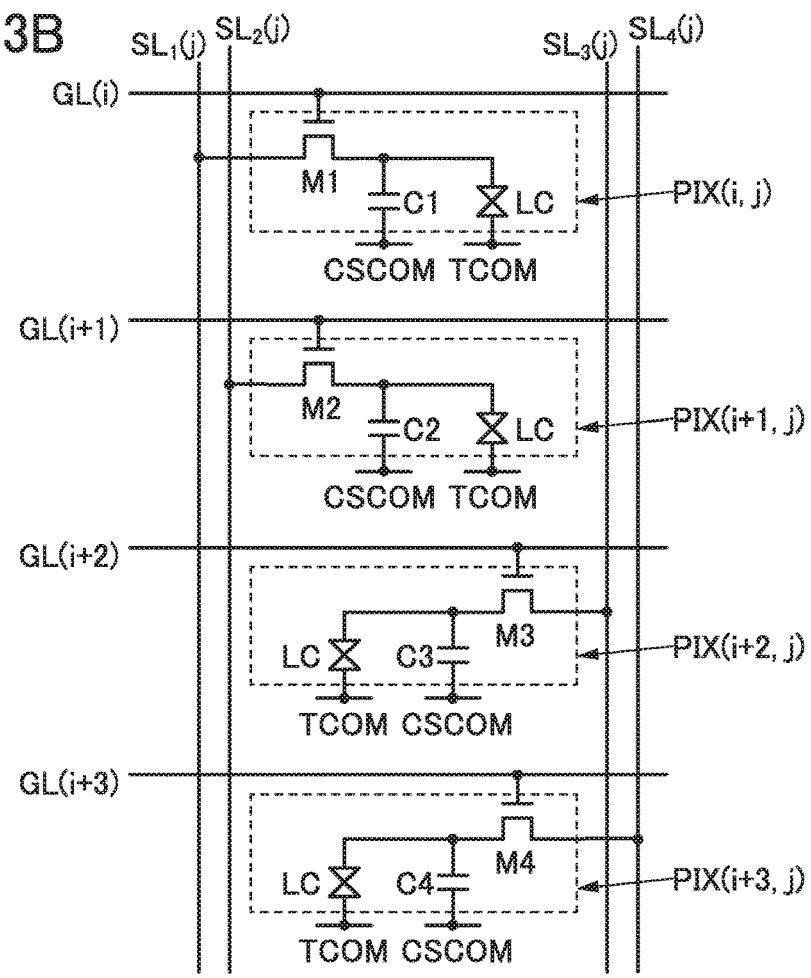

FIG. 33B is a circuit diagram illustrating the pixel PIX(i, j), the pixel PIX(i+1, j), a pixel PIX(i+2, j), and a pixel PIX(i+3, j).

First, the configuration of the pixel PIX(i, j) is described. The pixel PIX(i, j) includes the transistor M1, the capacitor C1, and the liquid crystal element LC. The gate of the transistor M1 is connected to the gate line GL(i). One of the source and the drain of the transistor M1 is connected to the source line SL1(j), and the other is connected to one electrode of the capacitor C1 and one electrode of the liquid crystal element LC. The other electrode of the capacitor C1 is connected to the wiring CSCOM. The other electrode of the liquid crystal element LC is connected to the wiring TCOM.

Next, the configuration of the pixel PIX(i+1, j) is described. The pixel PIX(i+1, j) includes the transistor M2, the capacitor C2, and the liquid crystal element LC. The gate of the transistor M2 is connected to the gate line GL(i+1). One of the source and the drain of the transistor M2 is connected to the source line SL$_2$(j), and the other is connected to one electrode of the capacitor C2 and one electrode of the liquid crystal element LC. The other electrode of the capacitor C2 is connected to the wiring CSCOM. The other electrode of the liquid crystal element LC is connected to the wiring TCOM.

Next, a configuration of the pixel PIX(i+2, j) is described. The pixel PIX(i+2, j) includes a transistor M3, a capacitor C3, and the liquid crystal element LC. A gate of the transistor M3 is connected to the gate line GL(i+2). One of a source and a drain of the transistor M3 is connected to the source line SL$_3$(j), and the other is connected to one electrode of the capacitor C3 and one electrode of the liquid crystal element LC. The other electrode of the capacitor C3 is connected to the wiring CSCOM. The other electrode of the liquid crystal element LC is connected to the wiring TCOM.

Next, a configuration of the pixel PIX(i+3, j) is described. The pixel PIX(i+3, j) includes a transistor M4, a capacitor C4, and the liquid crystal element LC. A gate of the transistor M4 is connected to the gate line GL(i+3). One of a source and a drain of the transistor M4 is connected to the source line SL$_4$(j), and the other is connected to one electrode of the capacitor C4 and one electrode of the liquid crystal element LC. The other electrode of the capacitor C4 is connected to the wiring CSCOM. The other electrode of the liquid crystal element LC is connected to the wiring TCOM.

Figure 34:
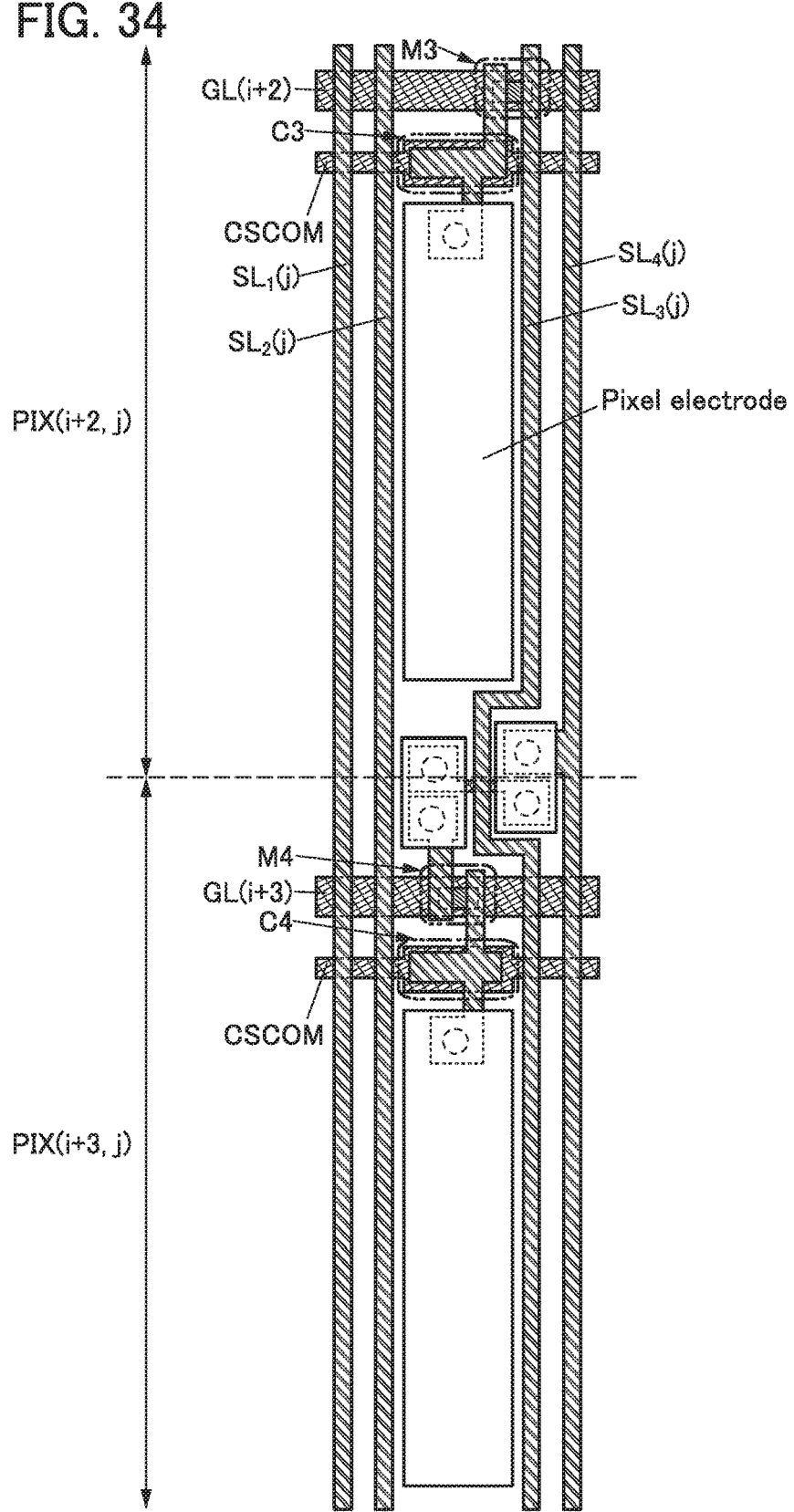
FIG. 34 is a top view illustrating a pixel layout in Example 1.

FIG. 34 illustrates a pixel layout of a display module in which four pixels are concurrently selected. FIG. 34 is a top view in which a stacked structure including components from the gate line to the pixel electrode is seen from the pixel electrode side. Note that FIG. 34 illustrates a layout of the pixel PIX(i+2, j) and the pixel PIX(i+3, j). A layout of the pixel PIX(i, j) and the pixel PIX(i+1, j) is a mirror-reversed image of the layout in FIG. 34.

The pixel size is 62.5 μm×187.5 μm. The transistor M3 and the transistor M4 are channel-etched transistors with a bottom-gate top-contact structure and have the same size. Specifically, each of the two transistors has a channel length L of 4 μm, a channel width W of 8 μm, and an overlap LDD region Lov of 3 μm. Each of the gate line GL(i+2) and the gate line GL(i+3) has a width of 10 μm, and each of the two wirings CSCOM has a width of 5 μm. Each of the source line $SL_1(j)$, the source line $SL_2(j)$, the source line $SL_3(j)$, and the source line $SL_4(j)$ has a width of 4 μm. The aperture ratio is 29%.

First, rough estimation of data writing time in the case where metal oxide is used for a semiconductor layer is described with reference to FIG. 35.

A period for charging a gate line and a period for charging a source line and a pixel were roughly estimated in such a manner that the parasitic resistance and the parasitic capacitance were extracted from the pixel layout in FIG. 34, and only a parameter of the mobility was changed. Here, a normalized value (normalized mobility) under a condition that the field-effect mobility in the case where a stacked layer of metal oxide with an atomic ratio In:Ga:Zn=4:2:3 or the neighborhood thereof is used for a semiconductor layer is 1 was used. The transistor size was not changed. The load of the whole pixel region is described below. A parasitic resistance Rgl of the gate line is 3.53 kΩ, a parasitic capacitance Cgl of the gate line is 518 pF, a parasitic resistance Rsl of the source line is 10.28 kΩ, a parasitic capacitance Csl of the source line is 170 pF, and a parasitic capacitance Cpix of the pixel is 99.7 fF.

Figure 35:
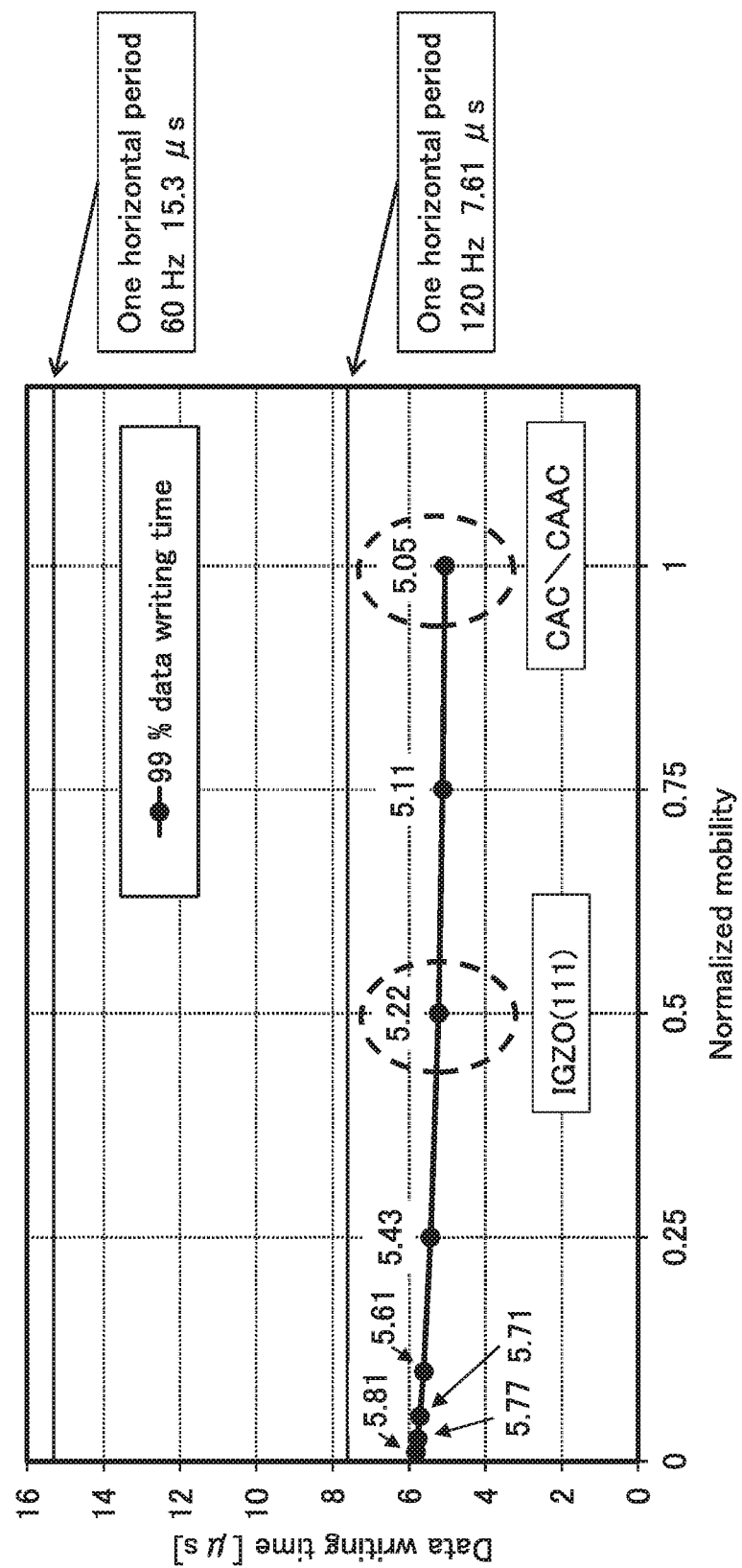
FIG. 35 shows results of rough estimation of data writing time in Example 1.

The result of normalized mobility of 1 in FIG. 35 corresponds to the case where a stacked layer of metal oxide with an atomic ratio In:Ga:Zn=4:2:3 or the neighborhood thereof is used as a semiconductor layer (denoted as "CAC\CAAC" in FIG. 35). In that case, the data writing time is 5.05 μs, which is shorter than one horizontal period 7.61 μs in 120-Hz driving. Accordingly, it was estimated that 120-Hz driving can be performed.

The result of normalized mobility of 0.5 in FIG. 35 corresponds to the case where a single layer of metal oxide with an atomic ratio In:Ga:Zn=1:1:1 or the neighborhood thereof is used as a semiconductor layer (denoted as "IGZO (111)" in FIG. 35). In that case, the data writing time is 5.22 μs, which is shorter than one horizontal period 7.61 μs in 120-Hz driving. Accordingly, it was estimated that 120-Hz driving can be performed.

In FIG. 35, four gate lines are supplied with the same selection signal, so that the length of one horizontal period can be four times the length of one horizontal period in FIG. 27. Accordingly, a high-resolution display device can be operated easily with use of a transistor with low field-effect mobility.

The result in FIG. 35 shows that 120-Hz driving can be achieved with the configuration in which writing is performed in four pixels concurrently, even when IGZO(111) whose mobility is lower than that of CAC\CAAC is used for a semiconductor layer.

Next, rough estimation of data writing time in the case where amorphous silicon is used for a semiconductor layer is described with reference to FIG. 36.

A period for charging a gate line and a period for charging a source line and a pixel were roughly estimated in such a manner that the parasitic resistance and the parasitic capacitance were extracted from the pixel layout in FIG. 34, and a design parameter of the field-effect mobility of a transistor was changed from the actually measured value of a transistor fabricated using microcrystalline silicon. The transistor size and storage capacitor were not changed. The load of the whole pixel region is described below. A parasitic resistance Rgl of the gate line is 3.53 kΩ, a parasitic capacitance Cgl of the gate line is 518 pF, a parasitic resistance Rsl of the source line is 10.28 kΩ, a parasitic capacitance Csl of the source line is 170 pF, and a parasitic capacitance Cpix of the pixel is 99.7 fF.

Figure 36:
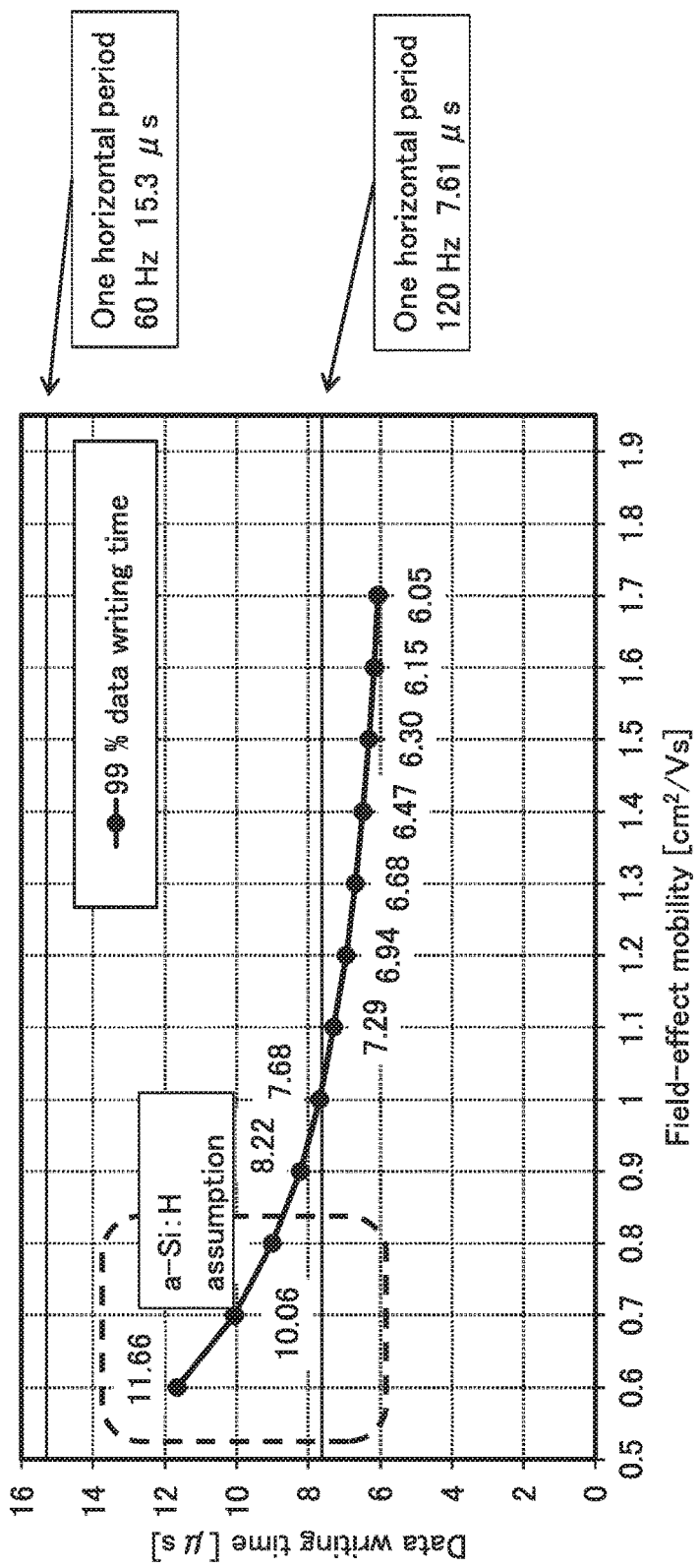
FIG. 36 shows results of rough estimation of data writing time in Example 1.

The results of field-effect mobility of 0.6, 0.7, and 0.8 [$cm^2$/Vs] in FIG. 36 correspond to the case where amorphous silicon is used for a semiconductor layer. In that case, the data writing time is 11.66 μs, 10.06 μs, and 9.01 μs, which is shorter than one horizontal period 15.3 μs in 60-Hz driving. Accordingly, it was estimated that 60-Hz driving can be performed. The data writing time is longer than one horizontal period 7.61 μs in 120-Hz driving. Accordingly, it was estimated that 120-Hz driving is difficult.

The results in FIG. 28, FIG. 32, and FIG. 36 show that 60-Hz driving can be achieved with the configuration in which writing is performed in four pixels concurrently, in the case where amorphous silicon is used for a semiconductor layer.

As described above, a large-sized high-resolution display, such as a display with a diagonal of 65 inches and resolution of 8K4K, can be performed by using one embodiment of the present invention, even when amorphous silicon is used for a semiconductor layer of a transistor.

REFERENCE NUMERALS

10: display device, 11: substrate, 12: substrate, 20: liquid crystal element, 21: conductive layer, 22: liquid crystal, 23: conductive layer, 24a: alignment film, 24b: alignment film, 26: insulating layer, 30: transistor, 31: conductive layer, 31a: conductive layer, 31b: conductive layer, 31at: conductive layer, 31bt: conductive layer, 32: semiconductor layer, 32p: semiconductor layer, 33: conductive layer, 33a: conductive layer, 33b: conductive layer, 33c: conductive layer, 33d: conductive layer, 33e: conductive layer, 33at: conductive layer, 33bt: conductive layer, 33ct: conductive layer, 33dt: conductive layer, 33et: conductive layer, 34: insulating layer, 35: semiconductor layer, 37: semiconductor layer, 38: connection portion, 39a: polarizing plate, 39b: polarizing plate, 41: coloring layer, 42: light-blocking layer, 50: light, 60: capacitor, 81: insulating layer, 82: insulating layer, 83: insulating layer, 84: insulating layer, 85: insulating layer, 86: conductive layer, 87: conductive layer, 88: insulating layer, 90: backlight unit, 600: television device, 601: control portion, 602: memory portion, 603: communication control portion, 604: image processing circuit, 605: decoder circuit, 606: video signal reception portion, 607: timing controller, 608: source driver, 609: gate driver, 610: neural network, 611: input layer, 612: middle layer, 613: output layer, 615: neuron, 620: display panel, 621: pixel, 630: system bus, 812: moving mechanism, 813: moving mechanism, 815: stage, 816: ball screw mechanism, 820: laser oscillator, 821: optical system unit, 822: mirror, 823: microlens array, 824: mask, 825: laser light, 826: laser light, 827: laser beam, 830: substrate, 840: amorphous silicon layer, 841: polycrystalline silicon layer, 7000: display portion, 7100: television device, 7101: housing, 7103: stand, 7111: remote controller, 7200: laptop personal computer, 7211: housing, 7212: keyboard, 7213: pointing device, 7214: external connection port, 7300:

digital signage, 7301: housing, 7303: speaker, 7311: information terminal, 7400: digital signage, 7401: pillar, and 7411: information terminal.

This application is based on Japanese Patent Application Serial No. 2017-002866 filed with Japan Patent Office on Jan. 11, 2017, Japanese Patent Application Serial No. 2017-002870 filed with Japan Patent Office on Jan. 11, 2017, and Japanese Patent Application Serial No. 2017-011395 filed with Japan Patent Office on Jan. 25, 2017, the entire contents of which are hereby incorporated by reference.

The invention claimed is:

1. A display device comprising:
   a first source line;
   a second source line adjacent to the first source line;
   a third source line adjacent to the second source line;
   a first gate line;
   a first transistor; and
   a first conductive layer,
   wherein a gate of the first transistor is electrically connected to the first gate line, one of a source and a drain of the first transistor is electrically connected to the first source line, and the other of the source and the drain of the first transistor is electrically connected to the first conductive layer,
   wherein the first conductive layer overlaps with the second source line and the third source line,
   wherein the first source line, the second source line, and the third source line are supplied with respective signals,
   wherein the first gate line is supplied with a selection signal,
   wherein the first conductive layer is a pixel electrode,
   wherein the first conductive layer does not overlap with the first source line, and
   wherein a distance between the first source line and the second source line is larger than a distance between the second source line and the third source line.

2. The display device according to claim 1, further comprising:
   a liquid crystal over the first conductive layer; and
   a first coloring layer over the liquid crystal.

3. The display device according to claim 1, wherein a semiconductor layer of the first transistor comprises an oxide semiconductor comprising indium, gallium, and zinc.

4. The display device according to claim 1, wherein a semiconductor layer of the first transistor comprises amorphous silicon.

5. The display device according to claim 1, further comprising a capacitor comprising a first electrode and a second electrode,
   wherein the first electrode and the second electrode are between the first source line and the second source line.

6. A display device comprising:
   a first source line;
   a second source line adjacent to the first source line;
   a third source line adjacent to the second source line;
   a first gate line;
   a second gate line adjacent to the first gate line;
   a first transistor;
   a second transistor;
   a first conductive layer; and
   a second conductive layer,
   wherein a gate of the first transistor is electrically connected to the first gate line, one of a source and a drain of the first transistor is electrically connected to the first source line, and the other of the source and the drain of the first transistor is electrically connected to the first conductive layer,
   wherein a gate of the second transistor is electrically connected to the second gate line, one of a source and a drain of the second transistor is electrically connected to the second source line, and the other of the source and the drain of the second transistor is electrically connected to the second conductive layer,
   wherein each of the first conductive layer and the second conductive layer overlaps with the second source line and the third source line,
   wherein the first source line, the second source line, and the third source line are supplied with respective signals,
   wherein the first gate line and the second gate line are supplied with the same selection signal,
   wherein the first conductive layer is a first pixel electrode and the second conductive layer is a second pixel electrode,
   wherein the first conductive layer and the second conductive layer do not overlap with the first source line, and
   wherein a distance between the first source line and the second source line is larger than a distance between the second source line and the third source line.

7. The display device according to claim 6, further comprising:
   a liquid crystal over the first conductive layer; and
   a first coloring layer over the liquid crystal.

8. The display device according to claim 6, wherein a semiconductor layer of the first transistor comprises an oxide semiconductor comprising indium, gallium, and zinc.

9. The display device according to claim 6, wherein a semiconductor layer of the first transistor comprises amorphous silicon.

10. The display device according to claim 6, further comprising a capacitor comprising a first electrode and a second electrode,
    wherein the first electrode and the second electrode are between the first source line and the second source line.

11. A display device comprising:
    a first source line;
    a second source line adjacent to the first source line;
    a third source line adjacent to the second source line;
    a fourth source line adjacent to the third source line;
    a first gate line;
    a second gate line adjacent to the first gate line;
    a third gate line adjacent to the second gate line;
    a fourth gate line adjacent to the third gate line;
    a first transistor;
    a second transistor;
    a third transistor;
    a fourth transistor;
    a first conductive layer;
    a second conductive layer;
    a third conductive layer; and
    a fourth conductive layer,
    wherein a gate of the first transistor is electrically connected to the first gate line, one of a source and a drain of the first transistor is electrically connected to the first source line, and the other of the source and the drain of the first transistor is electrically connected to the first conductive layer,
    wherein a gate of the second transistor is electrically connected to the second gate line, one of a source and a drain of the second transistor is electrically connected to the second source line, and the other of the source and the drain of the second transistor is electrically connected to the second conductive layer, wherein a gate of the third transistor is electrically connected to the third gate line, one of a source and a drain of the third transistor is electrically connected to the third source line, and the other of the source and the drain of the third transistor is electrically connected to the third conductive layer, wherein a gate of the fourth transistor is electrically connected to the fourth gate line, one of a source and a drain of the fourth transistor is electrically connected to the fourth source line, and the other of the source and the drain of the fourth transistor is electrically connected to the fourth conductive layer, and wherein the first gate line, the second gate line, the third gate line, and the fourth gate line are supplied with the same selection signal, wherein the first conductive layer is a pixel electrode, wherein the first conductive layer overlaps with the second source line and the third source line, wherein the first conductive layer does not overlap with the first source line and the fourth source line, wherein a distance between the first source line and the second source line is larger than a distance between the second source line and the third source line, and wherein a distance between the third source line and the fourth source line is larger than the distance between the second source line and the third source line.

12. The display device according to claim 11, wherein a semiconductor layer of the first transistor comprises an oxide semiconductor comprising indium, gallium, and zinc.

13. The display device according to claim 11, wherein a semiconductor layer of the first transistor comprises amorphous silicon.

14. The display device according to claim 11, further comprising a capacitor comprising a first electrode and a second electrode, wherein the first electrode and the second electrode are between the first source line and the second source line.

* * * * *